United States Patent
Miroshnikov et al.

(10) Patent No.: US 12,469,075 B2
(45) Date of Patent: *Nov. 11, 2025

(54) COMPUTING SYSTEM AND METHOD FOR CREATING A DATA SCIENCE MODEL HAVING REDUCED BIAS

(71) Applicant: Capital One Financial Corporation, McLean, VA (US)

(72) Inventors: Alexey Miroshnikov, Evanston, IL (US); Konstandinos Kotsiopoulos, Easthampton, MA (US); Arjun Ravi Kannan, Buffalo Grove, IL (US); Raghu Kulkarni, Buffalo Grove, IL (US); Steven Dickerson, Deerfield, IL (US); Ryan Franks, Deerfield, IL (US)

(73) Assignee: Capital One Financial Corporation, McLean, VA (US)

( * ) Notice: Subject to any disclaimer, the term of this patent is extended or adjusted under 35 U.S.C. 154(b) by 596 days.

This patent is subject to a terminal disclaimer.

(21) Appl. No.: 17/900,753

(22) Filed: Aug. 31, 2022

(65) Prior Publication Data
US 2022/0414766 A1    Dec. 29, 2022

Related U.S. Application Data

(63) Continuation-in-part of application No. 16/891,989, filed on Jun. 3, 2020, now Pat. No. 12,002,258.

(51) Int. Cl.
*G06F 18/21*    (2023.01)
*G06Q 40/03*    (2023.01)

(52) U.S. Cl.
CPC ................... *G06Q 40/03* (2023.01)

(58) Field of Classification Search
CPC ....... G06Q 40/03; G06F 18/214; G06F 18/29; G06F 30/27; G06N 5/01; G06N 7/01;
(Continued)

(56) References Cited

U.S. PATENT DOCUMENTS 8,370,253 B1    2/2013    Grossman
11,030,583 B1    6/2021    Garg et al.
(Continued)

FOREIGN PATENT DOCUMENTS

WO    2021/074491 A1    4/2021

OTHER PUBLICATIONS

Blum et al. Recovering from Biased Data: Can Fairness Constraints Improve Accuracy? Toyota Technological Institute at Chicago arXiv:1912.01094v1 [cs.LG] Dec. 4, 2019, 20 pages.
(Continued)

*Primary Examiner* — Hassan Mrabi
(74) *Attorney, Agent, or Firm* — Lee Sullivan Shea & Smith LLP

(57) ABSTRACT

A computing platform may be configured to (i) train an initial model object for a data science model using a machine learning process, (ii) determine that the initial model object exhibits a threshold level of bias, and (iii) thereafter produce an updated version of the initial model object having mitigated bias by (a) identifying a subset of the initial model object's set of input variables that are to be replaced by transformations, (b) producing a post-processed model object by replacing each respective input variable in the identified subset with a respective transformation of the respective input variable that has one or more unknown parameters, (c) producing a parameterized family of the post-processed model object, and (d) selecting, from the parameterized family of the post-processed model object, one given version of the post-processed model object to use as the updated version of the initial model object for the data science model.

28 Claims, 14 Drawing Sheets

(58) Field of Classification Search
CPC .... G06N 20/00; G06V 10/774; G06V 10/776; G06V 10/82
See application file for complete search history.

(56) References Cited

U.S. PATENT DOCUMENTS

| | | | |
|---|---|---|---|
| 11,636,386 B2* | 4/2023 | Lohia | G06N 7/00 706/12 |
| 12,020,133 B2* | 6/2024 | Goldszmidt | G06F 18/2415 |
| 12,277,455 B2* | 4/2025 | Walters | G06N 3/044 |
| 2011/0270782 A1 | 11/2011 | Trenner et al. | |
| 2014/0229415 A1 | 8/2014 | Martineau et al. | |
| 2018/0285685 A1 | 10/2018 | Singh et al. | |
| 2019/0087744 A1 | 3/2019 | Schiemenz | |
| 2019/0188605 A1 | 6/2019 | Zavesky et al. | |
| 2019/0279111 A1 | 9/2019 | Merrill et al. | |
| 2019/0378210 A1 | 12/2019 | Merrill et al. | |
| 2020/0081865 A1 | 3/2020 | Farrar et al. | |
| 2020/0082299 A1 | 3/2020 | Affonso et al. | |
| 2020/0184350 A1 | 6/2020 | Bhide et al. | |
| 2020/0218987 A1 | 7/2020 | Jiang et al. | |
| 2020/0302309 A1 | 9/2020 | Golding | |
| 2020/0302524 A1 | 9/2020 | Kamkar et al. | |
| 2020/0311486 A1 | 10/2020 | Dey et al. | |
| 2020/0320428 A1 | 10/2020 | Chaloulos et al. | |
| 2020/0372035 A1 | 11/2020 | Tristan et al. | |
| 2020/0372304 A1 | 11/2020 | Kenthapadi et al. | |
| 2020/0372406 A1 | 11/2020 | Wick | |
| 2020/0380398 A1 | 12/2020 | Weirder et al. | |
| 2020/0410129 A1 | 12/2020 | Nadler et al. | |
| 2021/0081828 A1 | 3/2021 | Lopez De Prado | |
| 2021/0133870 A1 | 5/2021 | Kamkar et al. | |
| 2021/0158102 A1* | 5/2021 | Lohia | G06N 7/00 |
| 2021/0173402 A1* | 6/2021 | Chang | G05D 1/0221 |
| 2021/0174222 A1 | 6/2021 | Dodwell et al. | |
| 2021/0224605 A1 | 7/2021 | Zhang et al. | |
| 2021/0224687 A1 | 7/2021 | Goldszmidt et al. | |
| 2021/0241033 A1 | 8/2021 | Yang | |
| 2021/0248503 A1 | 8/2021 | Hickety et al. | |
| 2021/0256832 A1 | 8/2021 | Weisz et al. | |
| 2021/0304039 A1 | 9/2021 | Tang et al. | |
| 2021/0334654 A1 | 10/2021 | Himanshi et al. | |
| 2021/0350272 A1 | 11/2021 | Miroshnikov et al. | |
| 2021/0383268 A1 | 12/2021 | Miroshnikov et al. | |
| 2021/0383275 A1 | 12/2021 | Miroshnikov et al. | |
| 2022/0036203 A1 | 2/2022 | Nachum et al. | |
| 2024/0095605 A1 | 3/2024 | Fylstra et al. | |

OTHER PUBLICATIONS

Varley et al. Fairness in Machine Learning with Tractable Models. School of Informatics, University of Edinburgh, UK arXiv:1905.07026v2 [cs.LG] Jan. 13, 2020, 26 pages.

Hickey et al. Fairness by Explicability and Adversarial SHAP Learning. Experian UK&I and EMEA DataLabs, London, UK arXiv:2003.05330v3 [cs.LG] Jun. 26, 2020, 17 pages.

Manu Joseph. Interpretability Cracking open the black box—Part 11. Machine Learning. Deep & Shallow, Nov. 16, 2019-Nov. 28, 2019, 23 pages.

Bellamy et al. AI Fairness 360: An extensible toolkit for detecting and mitigating algorithmic bias, IBM J. Res. & Dev. vol. 63, No. 4/5, Paper 4. Jul./Sep. 2019. 15 pages.

Lohia et al. Bias Mitigation Post-Processing for Individual and Group Fairness. IBM Research and IBM Watson AI Platform. 978-1-5386-4658-8/18/$31.00. 2019. IEEE. 5 pages.

International Search Report and Written Opinion issued in International Application No. PCT/US2023/031454, mailed on Dec. 12, 2023, 7 pages.

Casalicchio, Giuseppe. Visualizing the Feature Importance for Black Box Models. Machine Learning and Knowledge Discovery in Databases. ECML PKDD 2018. Lecture Notes in Computer Science. vol. 11051. Springer. pp. 655-670 [online], [retrieved on Mar. 28, 2025] Retrieved from the Internet <URL: https://doi.org/10.1007/978-3-030-10925-7_40>.

Aas et al. Explaining Individual Predictions When Features are Dependent: More Accurate Approximations to Shapley Values. arXiv preprint arXiv:1903.10464v3, Feb. 6, 2020, 28 pages.

Balashankar et al. Pareto-Efficient Fairness for Skewed Subgroup Data. In the International Conference on Machine learning AI for Social Good Workshop. vol. 8. Long Beach, United States, 2019, 8 pages.

Banzhaf III. Weighted Voting Doesn't Work: A Mathematical Analysis. Rutgers Law Review, vol. 19, No. 2, 1965, 28 pages.

Barocas et al. Fairness and Machine Learning: Limitations and Opportunities. [online], 253 pages, 1999 [retrieved online on May 26, 2022]. Retrieved from the Internet:<URL:https://fairmlbook.org/>.

Bergstra et al. Algorithms for Hyper-Parameter Optimization. NIPS 11: Proceedings of the 24th International conference on Neural Information Processing Systems. Dec. 2011, 9 pages.

Bousquet et al. Stability and Generalization. Journal of Machine Learning Research 2. Mar. 2002, pp. 499-526.

Chen et al. True to Model or True to the Data? arXiv preprint arXiv:2006.1623v1, Jun. 29, 2020, 7 pages.

Cover et al. Elements of Information Theory. A John Wiley & Sons, Inc., Publication. Second Edition, 2006, 774 pages.

Del Barrio et al. Obtaining Fairness Using Optimal Transport Theory. arXiv preprint arXiv:1806.03195v2. Jul. 19, 2018, 25 pages.

Del Barrio et al. On Approximate Validation of Models: A Kolmogorov-Smirnov Based Approach. arXiv:1903.08687v1, Mar. 20, 2019, 32 pages.

Dickerson et al. Machine Learning. Considerations for fairly and transparently expanding access to credit. 2020, 29 pages [online]. Retrieved online: URL<https://info.h2o.ai/rs/644-PKX-778/images/Machine%20Learning%20-%20Considerations%20for%20Fairly%20and%20Transparently%20Expanding%20Access%20to%20Credit.pdf>.

Dwork et al. Generalization in Adaptive Data Analysis and Holdout Reuse. NIPS'15: Proceedings of the 28th International Conference on Neural Information Processing Systems, vol. 2, Dec. 2015, 9 pages.

Dwork et al. Fairness Through Awareness. Proceedings of the 3rd Innovations in Theoretical Computer Science Conference, 2012, 214-226.

Equal Credit Opportunity Act (ECOA). FDIC Law, Regulations, Related Actions, 9 pages [online]. Retrieved online: URL< https://www.fdic.gov/regulations/laws/rules/6000-1200.html>.

Equal Employment Opportunity Act. 2 pages [online]. Retrieved online: URL<https://www.dol.gov/sites/dolgov/files/ofccp/regs/compliance/posters/pdf/eeopost.pdf>.

Fair Housing Act (FHA). FDIC Law, Regulations, Related Actions, 2022, 3 pages [online]. Retrieved online: URL<https://www.ecfr.gov/current/title-12/chapter-III/subchapter-B/part-338.

Feldman et al. Certifying and Removing Disparate Impact. Proceedings of the 21th ACM SIGKDD International Conference on Knowledge Discovery and Data Mining, 2015, 259-268.

Friedman, Jerome. 1999 Reitz Lecture. Greedy Function Approximation: A Gradient Boosting Machine. Annals of Statistics, vol. 29, No. 6. 2001, pp. 1189-1232.

G. Owen. Modification of the Banzhaf-Coleman index for Games with a Priori Unions. Power, Voting and Voting Power. 1981, pp. 232-238.

Goldstein et al. Peeking Inside the Black Box: Visualizing Statistical Learning with Plots of Individual Conditional Expectation. arXiv:1309.6392v2J. Mar. 20, 2014, 22 pages.

Hall et al. A United States Fair Lending Perspective on Machine Learning. Frontiers in Artificial Intelligence. doi: 10.3389/frai.2021.695301, Jun. 7, 2021, 9 pages.

Hall, Patrick. On the Art and Science of Explainable Machine Learning: Techniques, Recommendations, and Responsibilities. KDD'19 XAI Workshop. arXiv preprint arxiv:1810.02909, Aug. 2, 2019, 10 pages.

(56) References Cited

OTHER PUBLICATIONS

Hardt et al. Equality of Opportunity in Supervised Learning. Advances in Neural Information Processing Systems, 2015, 3315-3323.
Hashimoto et al. Fairness Without Demographics in Repeated Loss Minimization. In ICML, 2018, 10 pages.
Hastie et al. The Elements of Statistical Learning: Data Mining, Interference, and Prediction. Springer. Second edition, Jan. 13, 2017, 764 pages.
Heller et al. A consistent multivariate test of association based on ranks of distances. Biometrika. arXiv:1201.3522v1. Jan. 17, 2012, 14 pages.
Heller et al. Consistent Distribution-Free K-Sample and Independence Tests for Univariate Random Variables. Journal of Machine Learning Research. vol. 17, No. 29. Feb. 2016, 54 pages.
Janzing et al. Feature relevance quantification in explainable AI:A causal problem. arXiv preprint arXiv:1910.13413v2. Nov. 25, 2019, 11 pages.
Jiang et al. Identifying and Correcting Label Bias in Machine Learning. Proceedings of the 23rd International Conference on Artificial Intelligence and Statistics (AISTATS). 2020, 10 pages.
Jiang et al. Smooth Isotonic Regression: A New Method to Calibrate Predictive Models. AMIA Joint Summits on Translational Science proceedings. 2011, pp. 16-20.
Kamiran et al. Classifying without Discriminating. 2009 2nd International Conference on Computer, Control and Communication. doi: 10.1109/IC4.2009.4909197. 2009, pp. 1-6.
Kamiran et al. Data Preprocessing Techniques for Classification Without Discrimination. Knowl. Inf. Syst. DOI 10.1007/s10115-011-0463-8. Dec. 3, 2011, 33 pages.
Kamiran et al. Discrimination Aware Decision Tree Learning. 2010 IEEE International Conference on Data Mining. doi: 10.1109/ICDM.2010.50. 2010, pp. 869-874.
Kamishima et al. Fairness-Aware Classifier with Prejudice Remover Regularizer. Proceedings of the European Conference on Machine Learning and Principles and Practice of Knowledge Discovery in Databases (ECMLPKDD), Part II. 2012, pp. 35-50.
Karush, William. Minima of Functions of Several Variables with Inequalities as Side Constraints. A Dissertation Submitted to the Faculty of the Division of the Physical Sciences in Candidacy for the Degree of Master in Science. Department of Mathematics. University of Chicago. Dec. 1939, 29 pages.
Kearns et al. Algorithmic Stability and Sanity-Check Bounds for Leave-One-Out Cross-Validation. Neural Computation, vol. 11, No. 6. 1999, pp. 1427-1453.
Koralov et al. Theory of Probability and Random Processes. Second Edition. Springer. 1998, 349 pages.
Kovalev et al. A Robust Algorithm for Explaining Unreliable Machine Learning Survival Models Using the Kolmogorov-Smirnov Bounds. Neural Networks. arXiv:2005.02249v1, May 5, 2020. pp. 1-39.
Kuhn et al. Nonlinear programming. In Proceedings of the Second Berkeley Symposium on Mathematical Statistics and Probability. Berkeley, Calif. University of California Press. 90. 1951, pp. 481-492.
Lahoti et al. Fairness without Demographics through Adversarially Reweighted Learning. arXiv preprint arXiv:2006.13114. 2020, 13 pages.
Lipovetsky et al. Analysis of Regression in Game Theory Approach. Applied Stochastic Models Business and Industry. vol. 17. Apr. 26, 2001, pp. 319-330.
Lorenzo-Freire, Silvia. New characterizations of the Owen and Banzhaf-Owen values using the intracoalitional balanced contributions property. Department of Mathematics. 2017, 23 pages.
Lundberg et al. Consistent Individualized Feature Attribution for Tree Ensembles. arXiv preprint arxiv:1802.03888v3. Mar. 7, 2019, 9 pages.
Lundberg et al. A Unified Approach to Interpreting Model Predictions. 31st Conference on Neural Information Processing Systems, 2017, 10 pages.
Markowitz, Harry. Portfolio Selection. The Journal of Finance. vol. 7, No. 1. 1952, pp. 77-91.
Miroshinikov et al. Model-Agnostic Bias Mitigation Methods with Regressor Distribution Control for Wasserstein-Based Fairness Metrics. arXiv:2111.11259v1. Nov. 19, 2021, 29 pages.
Miroshinikov et al. Mutual Information-Based Group Explainers with Coalition Structure for Machine Learning Model Explanations. Computer Science and Game Theory. arXiv:2102.10878v1. Feb. 22, 2021, 46 pages.
Miroshinikov et al. Wasserstein-Based Fairness Interpretability Framework for Machine Learning Models. arXiv:2011.03156v1. Nov. 6, 2020, 34 pages.
Owen, Guillermo. Values of Games with a Priori Unions. In: Essays in Mathematical Economics and Game Theory. Springer, 1977, pp. 76-88.
Pareto. Optimality. In: Multiobjective Linear Programming. Springer International Publishing. DOI 10.1007/978-3-319-21091-9_4. 2016, pp. 85-118.
Wehle et al., "Machine Learning, Deep Learning, and AI: What's the Difference?" Data Scientist Innovation Day (2017).
Wuest et al., "Machine Learning in Manufacturing: Advantages, Challenges and Applications," Production and Manufacturing Research, vol. 4, 23-45 (2016).
Zeng et al. Jackknife approach to the estimation of mutual information. PNAS, vol. 115, No. 40. Oct. 18, 2018. 6 pages.
Zhao et al. Causal Interpretations of Black-Box Models. J Bus., Econ. Stat., DOI:10.1080/07350015.2019.1624293, 2019, 16 pages.
International Search Report and Written Opinion issued in International Application No. PCT/US2022/029670, mailed on Sep. 7, 2022, 10 pages.
Kwak, Nojun et al. Input Feature Selection for Classification Problems. IEEE Transactions on Neural Networks. vol. 13, No. 1. pp. 143-159. 2002. 17 pages.
Lundberg, Scott M., et al. Consistent Individualized Feature Attribution for Tree Ensembles. arXiv preprint arxiv:1802.03888v2. Jun. 18, 2018. 9 pages.
Perrone et al. Fair Bayesian Optimization. AIES '21, May 19-21, 2021, Virtual Event, USA. pp. 854-863.
Rawls, John. Justice as Fairness: A Restatement. Harvard University Press. 2001, 32 pages.
Reshef et al. An Empirical Study of Leading Measures of Dependence. arXiv preprint arXiv:1505.02214. May 12, 2015, 42 pages.
Reshef et al. Detecting Novel Associations in Large Data Sets. Science, vol. 334. Dec. 2011, pp. 1518-1524.
Reshef et al. Measuring Dependence Powerfully and Equitably. Journal of Machine Learning Research, vol. 17. 2016, 63 pages.
Ribeiro et al. "Why Should I Trust You?" Explaining the Predictions of Any Classifier. 22nd Conference on Knowledge Discovery and Data Mining, San Francisco, CA. arXiv:1602.04938v3. Aug. 9, 2016, 10 pages.
Royden et al. Real Analysis. Boston: Prentice Hall, 4th Edition. 2010, 516 pages.
Santambrogio, Filippo. Optimal Transport for Applied Mathematicians. Calculus of Variations, PDEs and Modeling. Springer. May 2015, 356 pages.
Schmidt et al. An Introduction to Artificial Intelligence and Solutions to the Problems of Algorithmic Discrimination. arXiv preprint arXiv:1911.05755. vol. 73, No. 2. 2019, pp. 130-144.
Shapley, L.S. A Value for n-Person Games. Annals of Mathematics Studies. 1953, 13 pages.
Shiryaev, A.N. Probability. Springer, Second Edition. 1980, 22 pages.
Shorack et al. Empirical Processes with Applications to Statistics. Wiley, New York. 1986, 36 pages.
Strumbelji et al. Explaining Prediction Models and Individual Predictions with Feature Contributions. Springer. Knowledge Information System, vol. 41, No. 3. 2014, pp. 647-665.
Sundararajan et al. The Many Shapley Values for Model Explanation. arXiv preprint arXiv:1908.08474v1, Aug. 22, 2019, 9 pages.
Szekely et al. Measuring and Testing Dependence by Correlation of Distances. The Annals of Statistics, vol. 35, No. 6. ArXiv:0803.4101v1, Mar. 28, 2008, 26 pages.

(56) References Cited

OTHER PUBLICATIONS

Thorpe, Matthew, Introduction to Optimal Transport, University of Cambridge, 2018, 56 pages.

Villani, Cedric. Optimal Transport, Old and New. Springer. Jun. 13, 2008, 998 pages.

Wasserman et al. All of Statistics: A Concise Course in Statistical Inference. Springer Texts in Statistics. 2004, 14 pages.

Woodworth et al. Learning Non-Discriminatory Predictors. Proceedings of Machine Learning Research, vol. 65, No. 1-34. 2017, 34 pages.

Young. Monotonic Solutions of Cooperative Games International Journal of Game Theory, vol. 14, Issue 2. 1985. 8 pages.

Zemel et al. Learning Fair Representations. Proceedings of the 30th International Conference on Machine Learning, PMLR vol. 28, No. 3. 2013, pp. 325-333.

Zhang et al. Mitigating Unwanted Biases with Adversarial Learning. In Proceedings of the 2018 AAAI/ACM Conference on AI, Ethics, and Society. Feb. 2-3, 2018, pp. 335-340.

Manu Joseph. Interpretability Cracking open the black box—Part 111. Machine Learning. Deep & Shallow, Nov. 24, 2019-Dec. 30, 2020, 29 pages.

Krivoruchko et al. Using Multivariate Interpolation for Estimating Well Performance, Esri.com, Arcuser. Esri Technology Summer 2014, 13 pages. URL:<URL: https://www.esri.com/abouUnewsroom/arcuser/using-multivariate-interpolation-for-estimating-well-performance/>.

Chen et al. Comparison and Improvement of the predictability and interpretability with ensemble learning models in QSPR applications. Journal of Cheminformatics, Mar. 30, 2020, 50 pages. <URL:https://jcheminf.biomedcentral.com/articles/10.1186/s13321-020-0417-9>.

Ding et al. Comparisons of Two Ensemble Mean Methods in Measuring the Average Error Growth and the Predictability. The Chinese Meteorological Society and Springer-Verlag Berlin Heidelberg, No. 4, vol. 25, Mar. 21, 2011, pp. 395-404 <URL:https://www.researchgate.net/publication/253261791>.

Hu et al. Locally Interpretable Models and Effects based on Supervised Partitioning, Wells Fargo, Jun. 1, 2018, 15 pages <URL: https://arxiv.org/pdf/1806.00663>.

Jiang et al. Wasserstein Fair Classification. Proceedings of the Thirty-Fifth Conference on Uncertainty in Artificial Intelligence, arXiv:1907.12059v1 [stat.ML] Jul. 28, 2019, 15 pages. <URL: chrome-extension://efaidnbmnnnibpcajpcglclefindmkaj/http://proceedings.mlr.press/v115/jiang20a/jiang20a.pdf>.

Wei et al. Optimized Score Transformation for Consistent Fair Classication, arXiv:1906.00066v3 [cs.LG] Oct. 29, 2021, 78 pages <URL: chrome-extension://efaidnbmnnnibpcajpcglclefindmkaj/https://arxiv.org/pdf/1906.00066.pdf>.

Tosifidis et al. FAE: A Fairness-Aware Ensemble Framework, IEEE, arXiv:2002.00695v1 [cs.AI] Feb. 3, 2020, 6 pages. <URL:https://arxiv.org/abs/2002.00695>.

Abduljabbar et al., "Applications of Artificial Intelligence in Transport: An Overview," Sustainability (2019).

Albizuri et al. On Coalitional Semivalues. Games and Economic Behavior 49, Nov. 29, 2002, 37 pages.

Alonso-Meijide et al. Modification of the Banzhaf Value for Games with a Coalition Structure. Annals of Operations Research, Jan. 2002, 17 pages.

Amer et al. The modified Banzhaf value for games with coalition structure: an axiomatic characterization. Mathematical Social Sciences 43, (2002) 45-54, 10 pages.

Apley et al., "Visualizing the Effects of Predictor Variables in Black Box Supervised Learning Models," Ar Xiv (2016).

Aumann et al. Cooperative Games with Coalition Structure. International journal of Game Theory, vol. 3, Issue 4, Jul. 1974, pp. 217-237.

Aurenhammer et al., Voronoi Diagrams And Delaunay Triangulations, pp. 7-13, 41-45, New Jersey, World Scientific Publishing (2013).

Breiman et al. Estimating Optimal Transformations for Multiple Regression and Correlation. Journal of the American Statistical Association. vol. 80, No. 391, Sep. 1985, 19 pages.

Bzdok et al., "Statistics Versus Machine Learning," Nature Methods, vol. 15, 233-234 (Apr. 2018).

Casas-Mendez et al. An extension of the tau-value to games with coalition structures. European Journal of Operational Research, vol. 148, 2003, pp. 494-513.

Dubey et al. Value Theory Without Efficiency. Mathematics of Operations Research. vol. 6, No. 1. 1981, pp. 122-128.

Eggleston, H.G., Convexity, pp. 33-38, Cambridge University Press (1958).

Elshawi et al. On the interpretability of machine learning-based model for predicting hypertension. BMC Medical Informatics and Decision Making. vol. 19, No. 146. 2019, 32 pages.

Explainable Artificial Intelligence (xAI), Defense Advanced Research Projects Agency, DARPA-BAA-16-53 (2016).

FDIC Title VII-Equal Credit Opportunity, FDIC Law, Regulations, Related Acts—Consumer Protection (Dec. 31, 2019).

Gretton et al. A Kernel Statistical Test of Independence. In Advances in Neural Information Processing Systems. 2007, 8 pages.

Gretton et al. A Kernel Two-Sample Test. The Journal of Machine Learning Research. vol. 13, No. 1. Mar. 2012, pp. 723-773.

Gretton et al. Measuring Statistical Dependence with Hilbert-Schmidt Norms. In Algorithmic Learning Theory. Springer-Verlag Berlin Heidelberg. 2005, pp. 63-77.

Hall et al. An Introduction to Machine Learning Interpretability, O'Reilly, Second Edition, Aug. 2019, 62 pages.

Hoeffding, Wassily. A Non-Parametric Test of Independence. The Annals of Mathematical Statistics. 1948, pp. 546-557.

Ji et al. Post-Radiotherapy PET Image Outcome Prediction by Deep Learning Under Biological Model Guidance: A Feasibility Study of Oropharyngeal Cancer Application. Duke University Medical Center. arXiv preprint. 2021, 26 pages.

Jiang et al. Nonparametric K-Sample Tests via Dynamic Slicing. Journal of the American Statistical Association. Harvard Library. Sep. 11, 2015. pp. 642-653.

Jollife et al. Principal Component Analysis. Springer Series In Statistics. Second Edition, 2002, 518 pages.

Kamijo, Yoshio. A two-step Shapley value in a cooperative game with a coalition structure. International Game Theory Review. 2009, 11 pages.

Kraskov et al. Estimating mutual information. The American Physical Society. Physical Review E vol. 69. Jun. 23, 2004, 16 pages.

Leo Breiman. Statistical Modeling: The Two Cultures. Statistical Science, vol. 16, No. 3, 2001, pp. 199-231.

Leo et al., "Machine Learning in Banking Risk Management: A Literature Review," Risks (2019).

Lopez-Paz et al. The Randomized Dependence Coefficient. In Advances in Neural Information Processing Systems. 2013, pp. 1-9.

Lundberg, Scott. Welcome to SHAP Documentation. 2018, 46 pages [online]. Retrieved online URL:< https://shap.readthedocs.io/en/latest/>.

Miroshinikov et al. Wasserstein-based fairness interpretability framework for machine learning models. arXiv:2011.03156v1. Nov. 6, 2020, 34 pages.

Modarres et al. Towards Explainable Deep Learning for Credit Lending: A Case Study. arxiv:1811.06471v2, Nov. 11, 2018, 8 pages.

Paninski, Liam. Estimation of Entropy and Mutual Information. Neural Computation, vol. 15, No. 6. 2003, pp. 1191-1253.

Renyi. On Measures of Dependence. Acta mathematica hungarica, vol. 10, No. 3. 1959, pp. 441-451.

SAS/STAT User's Guide, Version 8, Chapter 68 "The Varclus Procedure" (1999).

Shiryaev, A.N., Graduate Texts in Mathematics: Probability. 2nd ed., pp. 23-43, Springer (1980).

Szekely et al. Brownian Distance Covariance. The Annals of Applied Statistics, vol. 3, No. 4. 2009. 31 pages.

Tibshirani et al. Estimating the No. of clusters in a dataset via the gap statistic. Journal of the Royal Statistical Society, Series B. vol. 63, Part 2. 2001. pp. 411-423.

(56) References Cited

OTHER PUBLICATIONS

Tijs. Bounds for the Core and The Tau-Value. Game Theory and Mathematical Economics. 1981, pp. 123-132.
Vanderbei, Robert J. Linear Programming: Foundations and Extensions, 4th ed., pp. 11-16, 141-144, New York, NY, Springer Science and Business Media (2014).
Vaughan et al., "Explainable Neural Networks based on Additive Index Models," Corporate Model Risk, Wells Fargo, USA (Jun. 2018).
Vidal-Puga, Juan. The Harsanyi paradox and the "right to talk" in bargaining among coalitions. Mathematical Social Sciences. vol. 64. Mar. 27, 2012. 32 pages.
Wang et al. Shapley Flow: A Graph-based Approach to Interpreting Model Predictions arXiv preprint arXiv:2010.14592, 2020, 11 pages.

* cited by examiner

First Set of Explainer Values Associated with Protected Subpopulation

| Sample | X | Y | Z |
|---|---|---|---|
| 1 | $E_{1,X}$ | $E_{1,Y}$ | $E_{1,Z}$ |
| 2 | $E_{2,X}$ | $E_{2,Y}$ | $E_{2,Z}$ |
| 3 | $E_{3,X}$ | $E_{3,Y}$ | $E_{3,Z}$ |
| 4 | $E_{4,X}$ | $E_{4,Y}$ | $E_{4,Z}$ |
| 5 | $E_{5,X}$ | $E_{5,Y}$ | $E_{5,Z}$ |
| ... | ... | ... | ... |
| n | $E_{n,X}$ | $E_{n,Y}$ | $E_{n,Z}$ |

Second Set of Explainer Values Associated with Unprotected Subpopulation

| Sample | X | Y | Z |
|---|---|---|---|
| 1 | $E_{1,X}$ | $E_{1,Y}$ | $E_{1,Z}$ |
| 2 | $E_{2,X}$ | $E_{2,Y}$ | $E_{2,Z}$ |
| 3 | $E_{3,X}$ | $E_{3,Y}$ | $E_{3,Z}$ |
| 4 | $E_{4,X}$ | $E_{4,Y}$ | $E_{4,Z}$ |
| 5 | $E_{5,X}$ | $E_{5,Y}$ | $E_{5,Z}$ |
| ... | ... | ... | ... |
| m | $E_{m,X}$ | $E_{m,Y}$ | $E_{m,Z}$ |

FIG. 7

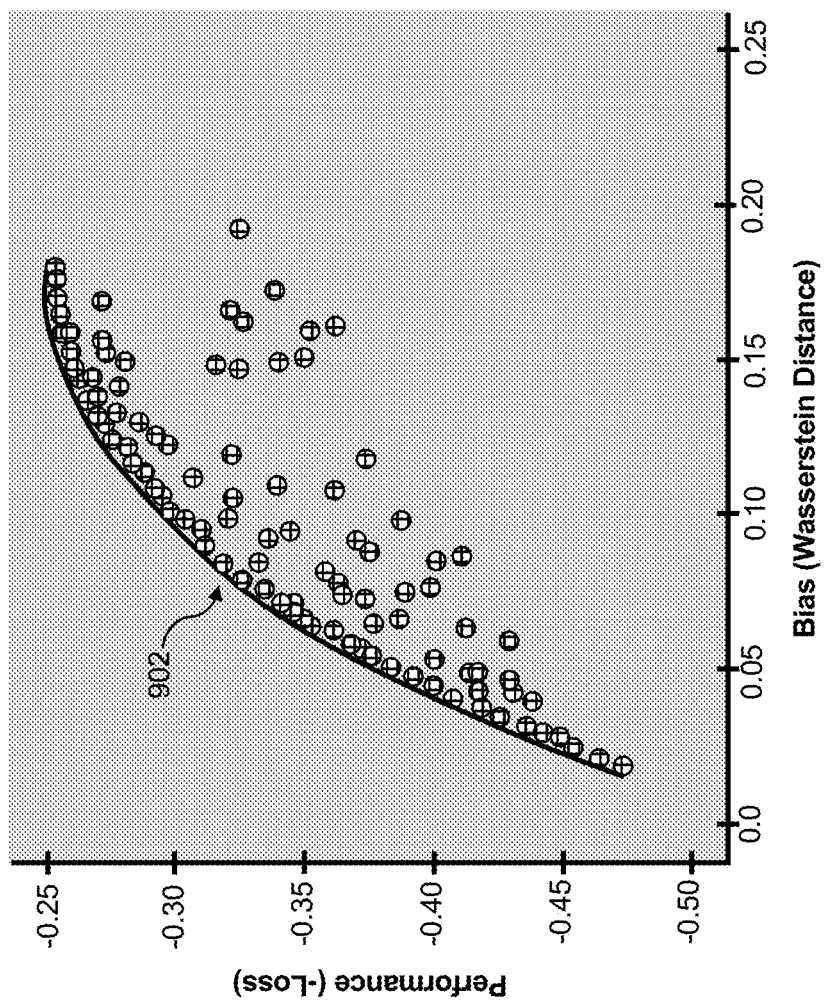

COMPUTING SYSTEM AND METHOD FOR CREATING A DATA SCIENCE MODEL HAVING REDUCED BIAS

CROSS-REFERENCE TO RELATED APPLICATIONS

This application is a continuation-in-part of and claims priority to U.S. Non-Provisional patent application Ser. No. 16/891,989, filed on Jun. 3, 2020 and entitled "SYSTEM AND METHOD FOR MITIGATING BIAS IN CLASSIFICATION SCORES GENERATED BY MACHINE LEARNING MODELS," which is incorporated by reference herein in its entirety.

BACKGROUND

Whenever a company's business requires business decisions to be made with respect to particular individuals, such as decisions as to whether to extend certain services or offer certain financial terms to particular individuals, there is a risk that the company's decision-making practices could incorporate some form of bias, whether intentionally or inadvertently. For instance, a company's decision-making practices may be at risk of incorporating a bias that unfairly favors individuals belonging to one subpopulation over individuals belonging to one or more other subpopulations. The distinction between different subpopulations of individuals (which may sometimes be referred to as different "groups" or "classes" of individuals) may be defined based on any of various attributes, examples of which may include race, age, sex (e.g., gender, sexual orientation, and/or gender identity), religion, marital status, among other possibilities.

In view of this risk of possible bias, various regulations now exist that prohibit companies from engaging in decision-making practices that unfairly favor individuals belonging to one subpopulation over individuals belonging to one or more other subpopulations. In some cases, these regulations may prohibit decision-making practices that unfairly favor any one subpopulation of individuals over another, regardless of the legal status of the subpopulations, while in other cases, these regulations may be specifically focused on protecting certain legally-protected subpopulations of individuals, such as minorities, females, older age groups, etc., as compared to other subpopulations.

One example of such a regulation is the Equal Credit Opportunity Act (ECOA), which prohibits companies that extend credit from discriminating against individuals seeking credit based on attributes such as race, color, religion, national origin, sex, marital status, age, public assistance, or the exercise of any rights under the Consumer Credit Protection Act. Under the ECOA, a company that extends credit must undergo something called a fair lending review during which the company's decision-making practices are evaluated to ensure compliance the anti-discriminatory provisions of the ECOA, and if those decision-making practices incorporate any improper bias, the company must then alter its decision-making practices to mitigate that bias. Along similar lines, a company may need to review its decision-making practices for improper bias (and potentially mitigate that bias) in order to ensure compliance with other applicable regulations and/or internal company policies, among other possibilities.

OVERVIEW

Disclosed herein is new technology for creating a data science model that mitigates the bias of the data science model while still preserving its performance.

In one aspect, the disclosed technology may take the form of a method to be carried out by a computing platform that involves (i) train an initial model object for a data science model using a machine learning process, wherein the initial model object is configured to receive values for a set of input variables and generate an output value, (ii) based on an evaluation of the initial model object's bias, determine that the initial model object exhibits a threshold level of bias with respect to at least one given attribute (e.g., a threshold level of bias with respect to a pair of subpopulations defined based on the given attribute that comprises a protected subpopulation and a non-protected subpopulation), and (iii) after determining that the initial model object exhibits the threshold level of bias, produce an updated version of the initial model object having mitigated bias by: (a) based on an evaluation of the initial model object's set of input variables, identifying a subset of the initial model object's set of input variables that are to be replaced by transformations, (b) producing a post-processed model object by replacing each respective input variable in the identified subset with a respective transformation of the respective input variable that has one or more unknown parameters, (c) producing a parameterized family of the post-processed model object, and (d) selecting, from the parameterized family of the post-processed model object, one given version of the post-processed model object to use as the updated version of the initial model object for the data science model.

The evaluation of the initial model object's bias may take various forms, and in some example embodiments, may involve (a) accessing a historical dataset comprising a first set of historical data records for individuals belonging the protected subpopulation and a second set of historical data records for individuals belonging the non-protected subpopulation, (b) inputting the first set of historical data records into the initial model object and thereby generating a first set of model scores for the protected subpopulation, (c) inputting the second set of historical data records into the initial model object and thereby generating a second set of model scores for the non-protected subpopulation, and (d) based on the first and second sets of model scores, quantifying the bias exhibited by the initial model object for the protected and non-protected subpopulations. And in these example embodiments, quantifying the bias exhibited by the initial model object for the protected and non-protected subpopulations may involve determining at least one of (i) a positive bias metric that quantifies a portion of the initial model object's bias that favors the non-protected subpopulation or (ii) a negative bias metric that quantifies a portion of the initial model object's bias that favors the protected subpopulation, among other possible techniques for quantifying the bias exhibited by the initial model object for the protected and non-protected subpopulations.

Further, the evaluation of the initial model object's set of input variables may take various forms, and in some example embodiments, may involve (a) based on an evaluation of dependencies between the initial model object's set of input variables, dividing the initial model object's set of input variables into a set of variable groups that each comprises one or more input variables and (b) quantifying a respective bias contribution of each respective variable group in defined set of variable groups using an explainability technique and a historical dataset comprising a first set of historical data records for individuals belonging the protected subpopulation and a second set of historical data records for individuals belonging the non-protected subpopulation. And in these example embodiments, quantifying the respective bias contribution of each respective variable group may involve, for each respective variable group, determining at least one of (i) a respective positive bias contribution metric that quantifies the respective variable group's contribution to either increasing a bias favoring the non-protected subpopulation or decreasing a bias favoring the protected subpopulation or (ii) a respective negative bias contribution metric that quantifies the respective variable group's contribution to either increasing a bias favoring the protected subpopulation or decreasing a bias favoring the non-protected subpopulation.

Further yet, the respective transformation of each respective input variable in the identified subset may take various forms, and in some example embodiments, may comprise one of (i) a first type of transformation that compresses or expands the respective input variable in a linear and symmetric manner, (ii) a second type of transformation that compresses or expands the respective input variable in a linear and asymmetric manner, (iii) a third type of transformation that compresses or expands the respective input variable in a non-linear and symmetric manner, or (iv) a fourth type of transformation that compresses or expands the respective input variable in a non-linear and asymmetric manner.

Still further, the function of producing the post-processed model object may take various forms. For instance, as one possibility, the function of producing the post-processed model object by replacing each respective input variable in the identified subset with the respective transformation of the respective input variable may involve replacing each respective input variable in the identified subset with a respective transformation of the respective input variable that is selected based on a determination of the respective input variable's contribution to the initial model object's bias. As another possibility, the function of producing the post-processed model object may further involve calibrating the post-processed model object to align a scale of post-processed model object's output with a scale of the initial model object's output. As yet another possibility, the function of producing the post-processed model object may further involve using a Bayesian optimization technique that functions to evaluate a bias and a performance of different versions of the post-processed model object that are produced by using different combinations of values for the unknown parameters included within the post-processed model object and thereby producing a parameterized family of the post-processed model object based on versions of the post-processed model object that form an efficient frontier for a tradeoff between the post-processed model object's bias and the post-processed model object's performance. As still another possibility, the function of producing the post-processed model object may further involve expanding the parameterized family of the post-processed model object to include additional versions of the post-processed model object, such as by constructing combined versions of the post-processed model object from respective pairs of versions of the post-processed model object that are in the parameterized family of the post-processed model object produced using the Bayesian optimization technique. The function of producing the post-processed model object may take other forms as well.

As a further possibility, the identified subset of the initial model object's set of input variables that are to be replaced by transformations may comprise a first subset of the initial model object's set of input variables consisting of input variables that behave in a numerical manner, and the function of producing the post-processed model object may further involve (i) identifying a second subset of the initial model object's set of input variables for which to incorporate additional compensation into the post-processed model object, wherein the second subset of the initial model object's set of input variables consists of input variables that behave in a categorical manner, and (ii) incorporating, into the post-processed model object, a respective compensation function for each respective input variable in the second subset of the initial model object's set of input variables that serves to compensate for the respective input variable's bias contribution.

In some example embodiments where the data science model comprises a classification model and the initial model object's output value comprises a score for use in making a classification decision, the method may also additionally involve defining at least one score threshold that is to be utilized by the data science model for use in making classification decisions based on the score output by the updated version of the initial model object.

In another aspect, disclosed herein is a computing platform that includes at least one network interface, at least one processor, at least one non-transitory computer-readable medium, and program instructions stored on the at least one non-transitory computer-readable medium that are executable by the at least one processor such that the computing platform is configured to carry out the functions disclosed herein, including but not limited to the functions of the foregoing method.

In yet another aspect, disclosed herein is a non-transitory computer-readable medium comprising program instructions that, when executed by at least one processor, cause a computing platform to carry out the functions disclosed herein, including but not limited to the functions of the foregoing method.

One of ordinary skill in the art will appreciate these as well as numerous other aspects in reading the following disclosure.

BRIEF DESCRIPTION OF THE DRAWINGS

FIG. 7 is a simplified illustration of two sets of explainer values that may be determined for an initial model object's input variables in accordance with the present disclosure.

FIG. 9A is a two-dimensional graph that illustrates a simplified example of how a parameterized family of a post-processed model object may be identified using a Bayesian optimization technique in accordance with the present disclosure.

DETAILED DESCRIPTION

Organizations in various industries have begun to utilize data science models to help make certain business decisions with respect to prospective or existing customers of those companies. For instance, as one possibility, an organization may utilize a data science model to help make decisions regarding whether to extend a service provided by that organization to a particular individual. One example may be an organization that provides financial services such as loans, credit card accounts, bank account, or the like, which may utilize a data science model to help make decisions regarding whether to extend one of these financial services to a particular individual (e.g., by deciding whether to approve or deny an application submitted by the individual). As another possibility, an organization may utilize a data science model to help make decisions regarding whether to target a particular individual when engaging in marketing of a good and/or service that is provided by the company. As yet another possibility, a company may utilize a data science model to help make decisions regarding what terms to offer a particular individual for a service provided by the organization, such as what interest rate level to offer a particular individual for a new loan or a new credit card account. Many other examples are possible as well.

Figure 1:
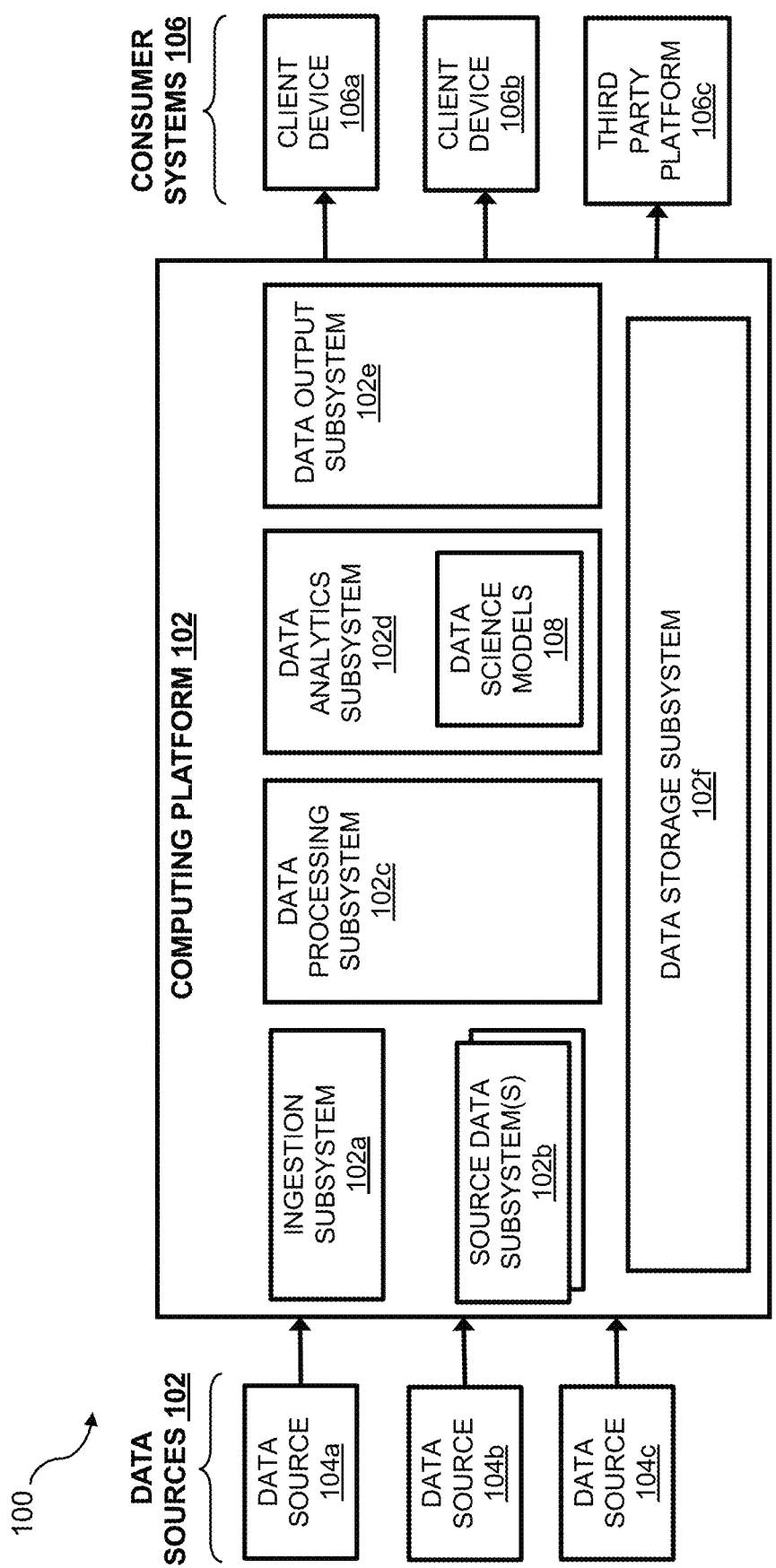
FIG. 1 depicts a simplified block diagram illustrating an example computing environment in which a data science model may be utilized.

One illustrative example of a computing environment 100 in which an example data science model such as this may be utilized is shown in FIG. 1. As shown, the example computing environment 100 may include a computing platform 102 associated with a given organization, which may comprise various functional subsystems that are each configured to perform certain functions in order to facilitate tasks such as data ingestion, data generation, data processing, data analytics, data storage, and/or data output. These functional subsystems may take various forms.

For instance, as shown in FIG. 1, the example computing platform 102 may comprise an ingestion subsystem 102a that is generally configured to ingest source data from a particular set of data sources 104, such as the three representative data sources 104a, 104b, and 104c shown in FIG. 1, over respective communication paths. These data sources 104 may take any of various forms, which may depend at least in part on the type of organization operating the example computing platform 102.

Further, as shown in FIG. 1, the example computing platform 102 may comprise one or more source data subsystems 102b that are configured to internally generate and output source data that is consumed by the example computing platform 102. These source data subsystems 102b may take any of various forms, which may depend at least in part on the type of organization operating the example computing platform 102.

Further yet, as shown in FIG. 1, the example computing platform 102 may comprise a data processing subsystem 102c that is configured to carry out certain types of processing operations on the source data. These processing operations could take any of various forms, including but not limited to data preparation, transformation, and/or integration operations such as validation, cleansing, deduplication, filtering, aggregation, summarization, enrichment, restructuring, reformatting, translation, mapping, etc.

Still further, as shown in FIG. 1, the example computing platform 102 may comprise a data analytics subsystem 102d that is configured to carry out certain types of data analytics operations based on the processed data in order to derive insights, which may depend at least in part on the type of organization operating the example computing platform 102. For instance, in line with the present disclosure, data analytics subsystem 102d may be configured to execute data science models 108 for rendering decisions related to the organization's business, such as a data science model for deciding whether to extend a service being offered by the organization to an individual within a population (e.g., a financial service such as a loan, a credit card account, a bank account, etc.), a data science model for deciding whether to target an individual within a population when engaging in marketing of a good and/or service that is offered by the organization, and/or a data science model for deciding what terms to extend an individual within a population for a service being offered by the organization, among various other possibilities. In practice, each such data science model 108 may comprise a model object that was trained by applying a machine learning process to a training dataset, although it should be understood that a data science model could take various other forms as well.

Referring again to FIG. 1, the example computing platform 102 may also comprise a data output subsystem 102e that is configured to output data (e.g., processed data and/or derived insights) to certain consumer systems 106 over respective communication paths. These consumer systems 106 may take any of various forms.

For instance, as one possibility, the data output subsystem 102e may be configured to output certain data to client devices that are running software applications for accessing and interacting with the example computing platform 102, such as the two representative client devices 106a and 106b shown in FIG. 1, each of which may take the form of a desktop computer, a laptop, a netbook, a tablet, a smartphone, or a personal digital assistant (PDA), among other possibilities. These client devices may be associated with any of various different types of users, examples of which may include individuals that work for or with the organization (e.g., employees, contractors, etc.) and/or individuals seeking to obtain goods and/or services from the organization. As another possibility, the data output subsystem 102e may be configured to output certain data to other third-party platforms, such as the representative third-party platform 106c shown in FIG. 1.

In order to facilitate this functionality for outputting data to the consumer systems 106, the data output subsystem 102e may comprise one or more Application Programming Interface (APIs) that can be used to interact with and output certain data to the consumer systems 106 over a data network, and perhaps also an application service subsystem that is configured to drive the software applications running on the client devices, among other possibilities.

The data output subsystem 102e may be configured to output data to other types of consumer systems 106 as well.

Referring once more to FIG. 1, the example computing platform 102 may also comprise a data storage subsystem 102f that is configured to store all of the different data within the example computing platform 102, including but not limited to the source data, the processed data, and the derived insights. In practice, this data storage subsystem 102f may comprise several different data stores that are configured to store different categories of data. For instance, although not shown in FIG. 1, this data storage subsystem 102f may comprise one set of data stores for storing source data and another set of data stores for storing processed data and derived insights. However, the data storage subsystem 102f may be structured in various other manners as well. Further, the data stores within the data storage subsystem 102f could take any of various forms, examples of which may include relational databases (e.g., Online Transactional Processing (OLTP) databases), NoSQL databases (e.g., columnar databases, document databases, key-value databases, graph databases, etc.), file-based data stores (e.g., Hadoop Distributed File System), object-based data stores (e.g., Amazon S3), data warehouses (which could be based on one or more of the foregoing types of data stores), data lakes (which could be based on one or more of the foregoing types of data stores), message queues, and/or streaming event queues, among other possibilities.

The example computing platform 102 may comprise various other functional subsystems and take various other forms as well.

In practice, the example computing platform 102 may generally comprise some set of physical computing resources (e.g., processors, data storage, communication interfaces, etc.) that are utilized to implement the functional subsystems discussed herein. This set of physical computing resources take any of various forms. As one possibility, the computing platform 102 may comprise cloud computing resources that are supplied by a third-party provider of "on demand" cloud computing resources, such as Amazon Web Services (AWS), Amazon Lambda, Google Cloud Platform (GCP), Microsoft Azure, or the like. As another possibility, the example computing platform 102 may comprise "on-premises" computing resources of the organization that operates the example computing platform 102 (e.g., organization-owned servers). As yet another possibility, the example computing platform 102 may comprise a combination of cloud computing resources and on-premises computing resources. Other implementations of the example computing platform 102 are possible as well.

Further, in practice, the functional subsystems of the example computing platform 102 may be implemented using any of various software architecture styles, examples of which may include a microservices architecture, a service-oriented architecture, and/or a serverless architecture, among other possibilities, as well as any of various deployment patterns, examples of which may include a container-based deployment pattern, a virtual-machine-based deployment pattern, and/or a Lambda-function-based deployment pattern, among other possibilities.

It should be understood that computing environment 100 is one example of a computing environment in which a data science model may be utilized, and that numerous other examples of computing environment are possible as well.

Implementing a computing platform that executes data science models like those described above to help make business decisions may provide various advantages over conventional approaches for making business decisions, such as approaches in which one or more employees of an organization are tasked with reviewing some set of available information about an individual and then making a business decision with respect to that individual. These advantages may include (i) reducing the time it takes to make business decisions, (ii) expanding the scope and depth of the information that can be practically evaluated when making business decisions, which leads to better-informed decisions, (iii) reaching decisions in a more objective, reliable, and repeatable way, and (iv) avoiding any bias that could otherwise be introduced (whether intentionally or subconsciously) by employees that are involved in the decision-making process, among other possibilities.

However, when an organization is utilizing data science models to help make business decisions with respect to particular individuals, this increases the difficulty of evaluating the organization's decision-making practices for improper bias (e.g., as part of a fair lending review under the ECOA) and then mitigating any such bias—particularly as the data science models being utilized become more complex. For instance, one such data science model may take the form of a classification model comprising a trained model object (sometimes called a trained "regressor") that is configured to (i) receive input data for some set of input variables, (ii) evaluate the input data, and (iii) based on the evaluation, output a "score" (e.g., a likelihood value) that is then used make a classification decision, typically by comparing the score to a specified score threshold. There are some existing techniques available for evaluating whether this type of data science model exhibits improper bias that unfairly favor one subpopulation of individuals over others, but if improper bias is detected, it is very difficult to meaningfully evaluate which aspects of the data science model are causing that improper bias—and even more difficult to determine or implement an effective strategy for modifying the data science model so as to mitigate the improper bias.

Given these difficulties, organizations that wish to utilize data science models to help make business decisions are typically forced into a trial-and-error type of approach, where the process of deploying a data science model involves iteratively training and testing multiple different model objects (e.g., model objects with different hyperparameters) until the organization is able to find a model object that satisfies the applicable requirements regarding bias. However, this process of iteratively training and testing multiple different model objects for each data science model that an organization wishes to deploy until the applicable requirements regarding bias are satisfied is time consuming, labor intensive, and costly. Further, mitigating the bias of the model by training a model object with altered hyperparameters typically degrades the performance of the data science model. As such, there is a need for technology that is capable of mitigating the improper bias in a data science model in a more intelligent and efficient way.

To address these and other problems, disclosed herein is new technology for creating a data science model that mitigates the bias of the data science model while still preserving its performance. In line with discussion above, the technology disclosed herein may be utilized any time there is a desire to create a new data science model that is governed by bias requirements, such as a data science model that is subject to a fair lending review under the ECOA.

In accordance with the disclosed technology, a computing platform may begin by training an initial model object for a data science model that is to be deployed by an organization for use in making a particular type of decision with respect to individuals within a population and then evaluating whether the initial model object exhibits a threshold level of bias that warrants mitigation. This bias evaluation may be carried out for any of various attributes (e.g., gender, race, age, etc.), and in at least some implementations, the bias evaluation for a given attribute may involve (i) identifying two subpopulations defined based on the given attribute that are to form the basis for the bias evaluation, one of which may be considered a "protected" subpopulation (e.g., a minority group) and the other of which may be considered a "non-protected" subpopulation (e.g., a majority group), (ii) accessing a historical dataset comprising a first set of historical data records for individuals belonging the protected subpopulation and a second set of historical data records for individuals belonging the non-protected subpopulation, (iii) inputting the first and second subsets of historical data records into the initial model object and thereby generating a first set of model scores for the protected subpopulation and a second set of model scores for the non-protected subpopulation (or if the first and second sets of historical data records were already previously scored with the initial model object, then accessing the previously-output model scores for the first and second sets of historical data records), and then (iv) using the initial model object's first and second sets of model scores to quantify and evaluate the bias exhibited by the initial model object for the two subpopulations in order to determine whether the initial model object exhibits a threshold level of bias that favors one of the two subpopulations over the other.

This bias of the initial model object may be quantified using any of various metrics, examples of which may include (a) a metric that quantifies the total bias exhibited by the initial model object for the two subpopulations, (b) metrics that separate out the total bias exhibited by the initial model object into a "positive" component that quantifies the portion of the bias that favors the non-protected subpopulation and a "negative" component that quantifies the portion of the bias that favors the protected subpopulation, and/or (c) a metric that quantifies the difference between a "positive" component of the bias exhibited by the initial model object and a "negative" component of the bias exhibited by the initial model object, which may be referred to herein as the "net bias" exhibited by the initial model object.

If this bias evaluation results in a determination that the initial model object exhibits a threshold level of bias for at least one attribute, then the computing platform may engage in a process for mitigating the bias of the initial model object and thereby producing an updated model object for the data science model. In accordance with the present disclosure, this mitigation process may begin with the computing platform (i) selecting a given attribute and corresponding subpopulations for which to carry out the bias mitigation, (ii) optionally grouping certain of the initial model object's input variables together based on dependencies between such input variables, and then (iii) quantifying and evaluating the bias contributions of the initial model object's input variables (or variable groups) with respect to the selected subpopulations in order to identify a subset of input variables for which bias mitigation is to be applied (e.g., input variables that are the most significant contributors to the bias exhibited by the initial model object), which may be referred to herein as the "biased" input variables for the initial model object.

These bias contributions of the initial model object's input variables (or variable groups) may be quantified using any of various metrics, examples of which may include (a) a metric that quantifies an input variable's (or variable group's) total contribution to the bias exhibited by the initial model object, (b) metrics that separate out an input variable's (or variable group's) total bias contribution into a "positive" component that quantifies the portion of the input variable's (or variable group's) total bias contribution that contributes to increasing the bias favoring the non-protected subpopulation and/or decreasing the bias favoring the protected subpopulation and a "negative" component that quantifies the portion of the input variable's (or variable group's) total bias contribution that contributes to increasing the bias favoring the protected subpopulation and/or decreasing the bias favoring the non-protected subpopulation, and/or (c) a metric that quantifies the difference between a "positive" component of an input variable's (or variable group's) bias contribution and a "negative" component of the input variable's (or variable group's) bias contribution, referred to herein as the input variable's (or variable group's) "net bias contribution."

After the subset of biased input variables is identified, the computing platform may produce a "post-processed" model object by replacing each biased input variable (or at least each biased input variable that behaves in a numerical manner) with a respective transformation of the biased input variable that has one or more unknown parameters. In accordance with the present disclosure, each such transformation may comprise any of various different types of transformations that can be utilized to transform a biased input variable's value in a way that mitigates the bias contributed by the biased input variable, including but not limited to transformations that compress or expand a biased input variable's value in linear or non-linear ways and/or in symmetric or asymmetric ways. Further, in some implementations, the same type of transformation may be utilized in place of each biased input variable by default, while in other implementations, the respective type of transformation that is utilized in place of each biased input variable may be selected on a variable-by-variable basis based on factors such as the biased input variable's bias contribution information. As described in further detail below, the computing platform may also be configured to handle different biased input variables in different ways when producing the post-processed model object. As part of the function of producing the post-processed model object, the computing platform may also calibrate the post-processed model object in order to align the scale of its output with the scale of the initial model object's output.

After the post-processed model object has been produced, the computing platform may then produce various different versions of the post-processed model object, referred to herein as a "parameterized family" of the post-processed model object, by iterating through various different combinations of values for the unknown parameters included within the post-processed model object. In at least some implementations, this function may be carried out using a Bayesian optimization technique that functions to evaluate the bias and the performance of the post-processed model object across various different combinations of values for the unknown parameters, each defining a different version of the post-processed model object, and thereby identifies the particular versions of the post-processed model object that form an efficient frontier (or sometimes referred to as the "Pareto frontier") of the tradeoff between the post-processed model object's bias and the post-processed model object's performance. Further, in at least some implementations, the computing platform may also be configured to expand the parameterized family of the post-processed model object by constructing additional versions of the post-processed model object (e.g., combined versions from pairs of post-processed model object versions in the initially-produced parameterized family) that are then available for selection.

From this parameterized family of the post-processed model object that is produced, the computing platform may select one particular version of the post-processed model object and then either (i) designate the selected version of the post-processed model as the updated model object for the data science model to be deployed or (ii) use the selected version of the post-processed model as the basis for deriving a new model object that is then used as the updated model object for the data science model to be deployed, among other possibilities.

The disclosed technology provides several advantages over prior techniques for creating a data science model that complies with bias requirements. For instance, the disclosed technology provides an ability to quickly and efficiently produce multiple different versions of a model object for consideration and selection by intelligently adjusting the form of the model object's input variables while re-using the same trained model object. This avoids the need to train and test multiple different model objects in a trial-and-error manner, and is thus able to produce the model object for consideration and selection in a way that requires less historical data, less time, and less compute resources than such trial-and-error techniques. Indeed, in practice, the disclosed functionality for producing multiple different versions of a model object for consideration and selection can be carried out using a historical dataset that is much smaller than the training dataset that would be required to train a different model object (e.g., a number of data records on the order of thousands rather than hundreds of thousands or millions), and may be completed much more quickly than a training process (e.g., on the order of an hour or less rather than many hours).

Further, the disclosed technology provides a framework for further improving the bias-performance tradeoff of the different versions of the model object that are produced for consideration and selection, such as by enabling the biased input variables to be replaced with any of various different types of transformations that can be selected depending on the use case and/or enabling the parameterized family of the post-processed model to be produced using a Bayesian optimization technique that constructs an efficient frontier of the tradeoff between bias and performance, which may in turn improve the bias-performance tradeoff of the data science model that is ultimately deployed.

Further yet, the disclosed technology provides a framework for separating the input variables' bias contributions into positive and negative components and then enabling those positive and negative components to be used to facilitate the mitigation process, which may allow the bias exhibit by the initial model object to be mitigated in an improved way. For example, after separating the input variables' bias contributions into positive and negative components, those positive and negative components can be used to identify the biased input variables in a more intelligent way. As another example, after separating the input variables' bias contributions into positive and negative components, those positive and negative components can be used to make a more intelligent selection of the transformations to utilize in place of the biased input variables when producing the post-processed model object, which may further improve the bias-performance tradeoff of the different versions of the model object that are produced for consideration and selection.

Still further, the disclosed technology provides a framework for producing the different versions of the post-processed model object for consideration and selection that may only replace a particular subset of biased input variables with transformations and may also constrain the number of unknown parameters included within those transformations, which thereby enables the dimensionality of the process for producing the different versions of the post-processed data science model to be constrained. This ability to constrain the dimensionality of the process for producing the different versions of the post-processed data science model (if desired) is important, because as the dimensionality increases and the process becomes more complex, the amount of time and compute resources required to carry out the process may significantly increase, perhaps to the point that it will no longer be practically feasible to carry out the process.

Lastly, because the disclosed technology provides a framework for mitigating the bias of a trained regressor for a classification model without reference to any particular score threshold, as opposed to mitigating the bias of a classification model having one particular score threshold, the disclosed technology enables fairness to be achieved at a regressor level and thereby provides flexibility to adjust the score threshold after the mitigation is completed, which provides advantages over other approaches that perform bias mitigation at a classifier level and thus require the entire bias mitigation process to be repeated (which as noted above may involve training a new regressor) if the score threshold is changed.

The disclosed technology may provide other advantages over existing approaches for creating data science models as well.

Figure 2:
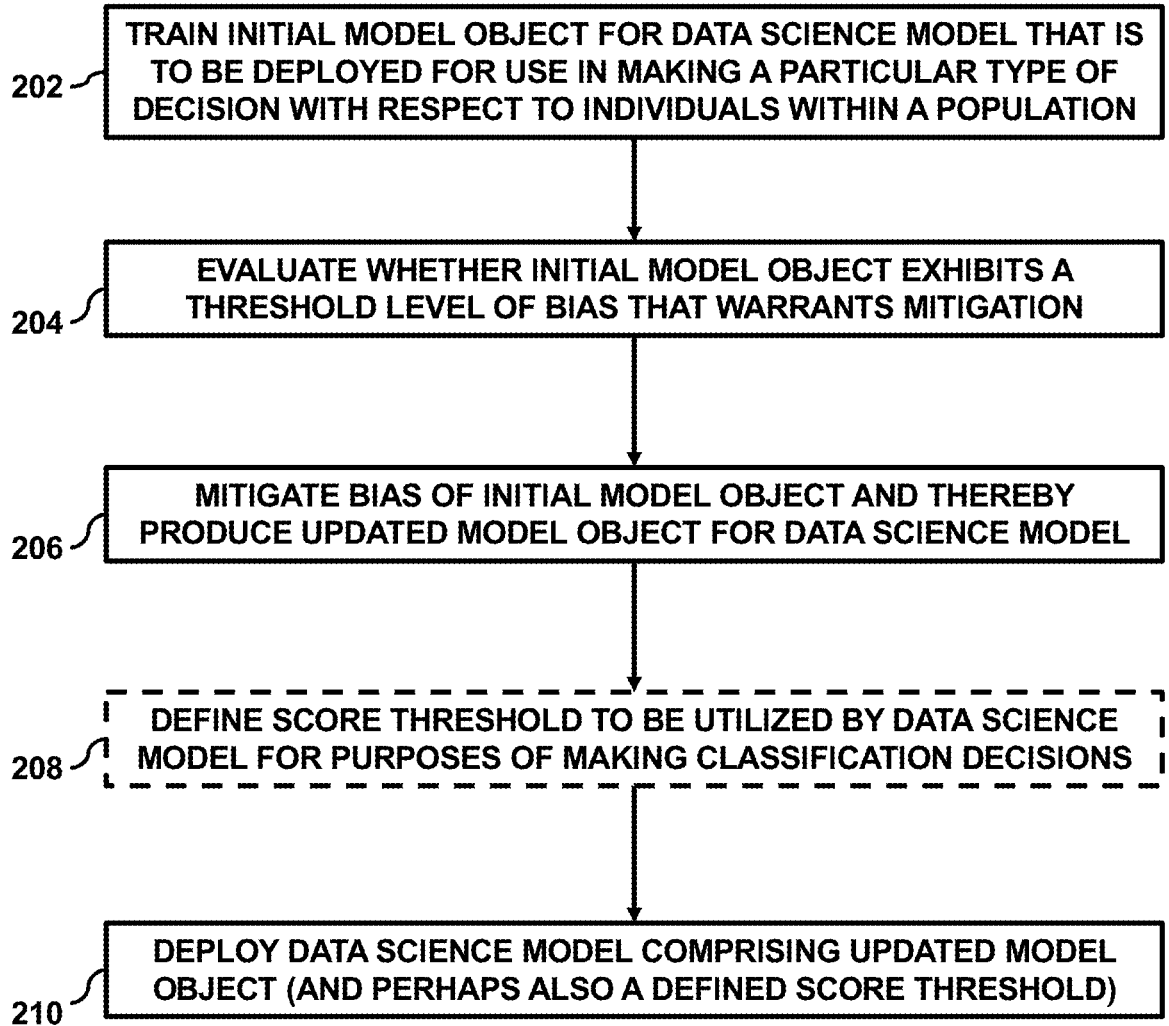
FIG. 2 is a flow chart that illustrates one possible example of a process for creating a data science model having reduced bias in accordance with the present disclosure.

Turning now to FIG. 2, a flow chart is provided that illustrates one possible example of a process 200 for creating a data science model having reduced bias in accordance with the present disclosure. The example process 200 of FIG. 2 may be carried out by any computing platform that is capable of creating a data science model, including but not limited the computing platform 102 of FIG. 1. Further, it should be understood that the example process 200 of FIG. 2 is merely described in this manner for the sake of clarity and explanation and that the example embodiment may be implemented in various other manners, including the possibility that functions may be added, removed, rearranged into different orders, combined into fewer blocks, and/or separated into additional blocks depending upon the particular embodiment.

As shown in FIG. 2, the example process 200 may begin at block 202 with the computing platform training an initial model object for a data science model that is to be deployed by an organization for use in making a particular type of decision with respect to individuals within a population. In general, this initial model object may comprise any model object that is configured to (i) receive input data related to a respective individual within a population for a particular set of input variables (which may also be referred to as the model object's "features" or the model object's "predictors"), (ii) evaluate the received input data, and (iii) based on the evaluation, output a score that is then used make the given type of decision with respect to the respective individual. Further, the specific initial model object model that is trained may take any of various forms, which may depend on the particular data science model that is to be deployed.

For instance, as one possibility, the initial model object that is trained at block 202 may comprise a model object for a data science model to be utilized by an organization to decide whether or not to extend a particular type of service (e.g., a financial service such as a loan, a credit card account, a bank account, or the like) to a respective individual within a population. In this respect, the set of input variables for the initial model object may comprise data variables that are predictive of whether or not the organization should extend the particular type of service to a respective individual (e.g., variables that provide information related to credit score, credit history, loan history, work history, income, debt, assets, etc.), and the score may indicate a likelihood that the organization should extend the particular type of service to the respective individual, which may then be compared to a threshold value in order to reach a decision of whether or not to extend the particular type of service to the respective individual.

As another possibility, the initial model object that is trained at block 202 may comprise a model object for a data science model to be utilized by an organization to decide whether or not to target a respective individual within a population when engaging in marketing of a particular type of good or service that is being offered by the organization. In this respect, the set of input variables for the initial model object may comprise data variables that are predictive of whether or not the organization should target a respective individual when engaging in marketing of the particular type of good or service (e.g., variables that provide information related to credit score, credit history, loan history, work history, income, debt, assets, purchasing history for comparable goods or services, etc.), and the score may indicate a likelihood that the organization should target the respective individual when engaging in marketing of the particular type of good or service, which may then be compared to a threshold value in order to reach a decision of whether or not to target the respective individual.

As yet another possibility, the initial model object that is trained at block 202 may comprise a model object for a data science model to be utilized by an organization to decide what terms to extend to a respective individual for a particular type of service being offered by the organization, such as what interest rate level and/or maximum limit to offer an individual for a new loan or a new credit card account. In this respect, the set of input variables for the initial model object may comprise data variables that are predictive of what terms should be extended to a respective individual for the particular type of service being offered by the organization (e.g., variables that provide information related to credit score, credit history, loan history, work history, income, debt, assets, etc.), and the score may indicate a likelihood that the organization should extend a particular set of terms to the respective individual, which may then be compared to a threshold value in order to reach a decision of whether or not to extend the particular set of terms to the respective individual.

The initial model object that is trained at block 202 may take various other forms as well, including but not limited to the possibility that the initial model object may be configured to output multiple scores associated with multiple different outcomes that are to be compared to one another in order to make a decision with respect to an individual (e.g., multiple different sets of terms for a particular type of service being offered by the organization).

The function of training the initial model object may also take any of various forms, and in at least some implementations, may involve applying a machine learning process to a training dataset that is relevant to the particular type of decision to be rendered by the data science model (e.g., a set of historical data records for individuals that are each labeled with an indicator of whether or not a favorable decision should be rendered based on the historical data record). In this respect, the machine learning process may comprise any of various machine learning techniques, examples of which may include regression techniques, decision-tree techniques, support vector machine (SVM) techniques, Bayesian techniques, ensemble techniques, gradient descent techniques, and/or neural network techniques, among various other possibilities.

At block 204, after training the initial model object for the data science model, the computing platform may then evaluate whether the initial model object exhibits a threshold level of bias that warrants mitigation. This function may take various forms.

Figure 3:
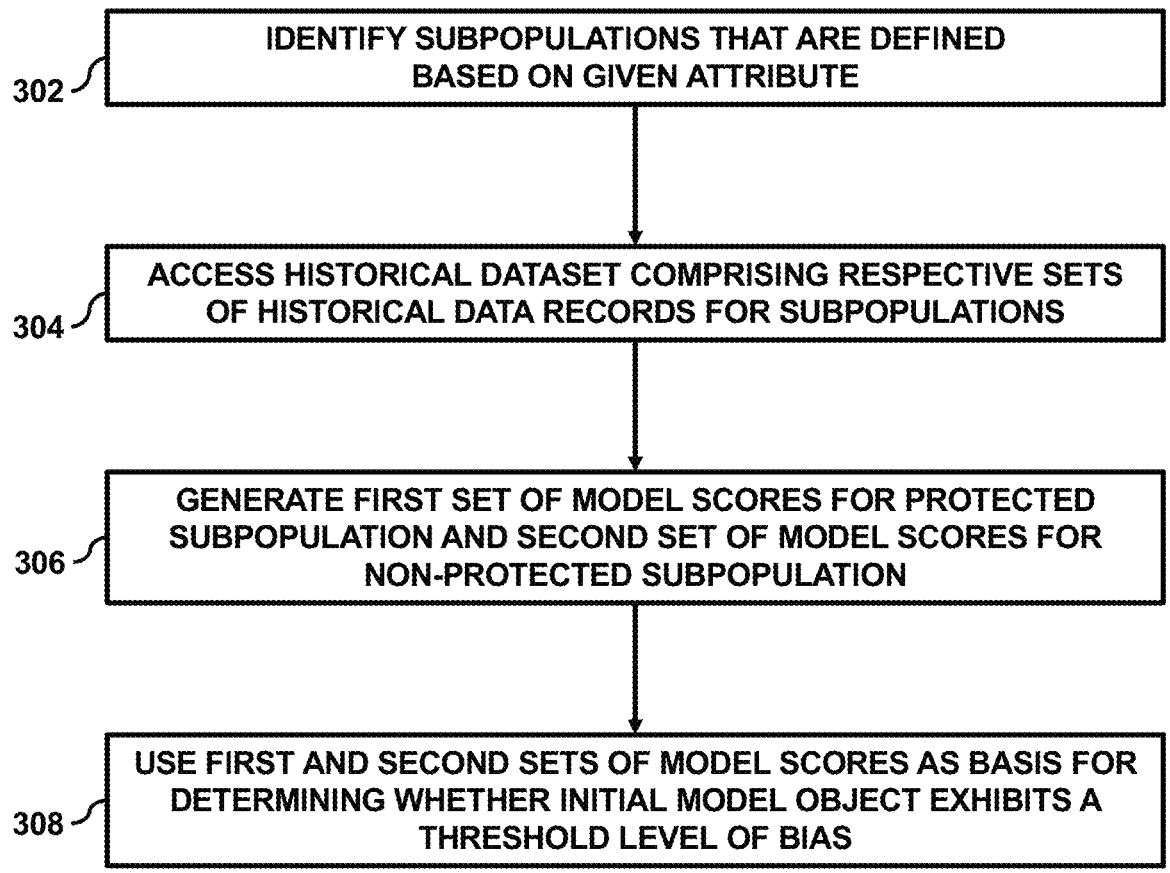
FIG. 3 is a flow chart that illustrates one possible example of a process for evaluating whether an initial model object exhibits a threshold level of bias in accordance with the present disclosure.

As a starting point, the computing platform may be configured to evaluate the initial model object for bias with respect to some predefined set of attributes, which could include any one or more of gender, race, color, national origin, age, sexual orientation, gender identity, religion, marital status, physical or mental status, and/or veteran status, among other possible examples. And for each such attribute, the computing platform may carry out a process for evaluating whether the initial model object exhibits a threshold level of bias that favors one subpopulation defined based on the attribute relative to another. One possible example 300 of a such a process for evaluating whether an initial model object exhibits a threshold level of bias that favors one subpopulation defined based on a given attribute relative to another is shown in FIG. 3. As with the example process 200 of FIG. 2, the example process 300 of FIG. 3 may be carried out by any computing platform that is capable of creating a data science model, including but not limited the computing platform 102 of FIG. 1. Further, it should be understood that the example process 300 of FIG. 3 is merely described in this manner for the sake of clarity and explanation and that the example embodiment may be implemented in various other manners, including the possibility that functions may be added, removed, rearranged into different orders, combined into fewer blocks, and/or separated into additional blocks depending upon the particular embodiment.

As shown in FIG. 3, the example process 300 may begin at block 302 with the computing platform identifying subpopulations defined based on the given attribute that are to form the basis for the bias evaluation. For instance, in at least some implementations, the computing platform may identify (i) a first subpopulation defined based on the given attribute that includes individuals who are to be afforded an increased level of protection against discrimination (e.g., a minority group), which may be referred to herein as a "protected" subpopulation, and (ii) a second subpopulation defined based on the given attribute that includes individuals who are not to be afforded any increased level of protection against discrimination (e.g., a majority group), which may be referred to herein as a "non-protected" subpopulation. As one example to illustrate, if the given attribute is gender, then the protected subpopulation may comprise females and the non-protected subpopulation may comprise males. As another example to illustrate, if the given attribute is race, then the protected subpopulation may comprise one or more racial minorities (e.g., African Americans, Asians, etc.) and the non-protected subpopulation may comprise the racial majority (e.g., White individuals). As yet another example to illustrate, if the given attribute is age, then the protected subpopulation may comprise individuals that are older than a given age cutoff (e.g., 62 years of age or older) and the non-protected subpopulation may comprise individuals that are younger than the given age cutoff. Many other examples are possible as well. Further, in other implementations, the computing platform may identify two subpopulations defined based on the given attribute that are distinguished by something other than whether or not the individuals in the subpopulations are to be afforded differing levels of protection against discrimination However, for purposes of illustration, the discussion that follows will refer to the subpopulations in terms of protected and non-protected subpopulations.

At block 304, the computing platform may access a historical dataset comprising (i) a first set of historical data records (sometimes referred to as "samples") for individuals belonging the protected subpopulation and (ii) a second set of historical data records for individuals belonging the non-protected subpopulation, where each such historical data record includes values related to a particular individual for the initial model object's set of input variables (e.g., values related to a particular individual for variables that provide information related to credit score, credit history, loan history, work history, income, debt, assets, etc.). For example, if the two subpopulations comprise females and males, the computing platform may access a historical dataset comprising one set of historical data records for individuals that are females and another set of historical data records for individuals that are males. As another example, if the two subpopulations comprise a racial minority and a racial majority, the computing platform may access a historical dataset comprising one set of historical data records for individuals in the racial minority and another set of historical data records for individuals in the racial majority. In line with the discussion above, many other examples are possible as well.

At block 306, after accessing the historical dataset, the computing platform may (i) input the first set of historical data records for the protected subpopulation into the initial model object and thereby generate a first set of model scores for the protected subpopulation and (ii) input the second set of historical data records for the non-protected subpopulation into the initial model object and thereby generate a second set of model scores for the non-protected subpopulation. In this respect, the function of inputting each set of historical data records into the initial model object may involve inputting each respective historical data record in the subset into the initial model object and thereby causing the initial model object to output a respective score for the respective historical data record, which may then be compiled together with the respective scores output for the other respective historical data record in the subset in order to produce the respective set of model scores for the set of historical data records.

At block 308, after generating the first set of model scores for the protected subpopulation and the second set of model scores for the non-protected subpopulation, the computing platform may then use the initial model object's first and second sets of model scores as a basis for determining whether the initial model object exhibits a threshold level of bias that favors one of the subpopulations over the other (e.g., the non-protected subpopulation over the protected subpopulation). This function may take various forms.

To begin, the computing platform may use the initial model object's first and second sets of model scores as a basis for quantifying the bias exhibited by the initial model object for the protected and non-protected subpopulations. For instance, in at least some implementations, the computing platform may quantify the bias exhibited by the initial model object for the protected and non-protected subpopulations by determining a difference between (i) an empirical distribution of the first set of model scores for the protected subpopulation, which is referred to below as a first empirical distribution, and (ii) an empirical distribution of the second set of model scores for the non-protected subpopulation, which is referred to below as a second empirical distribution. The computing platform may determine such a difference between the empirical distributions in various ways.

Figure 4A:
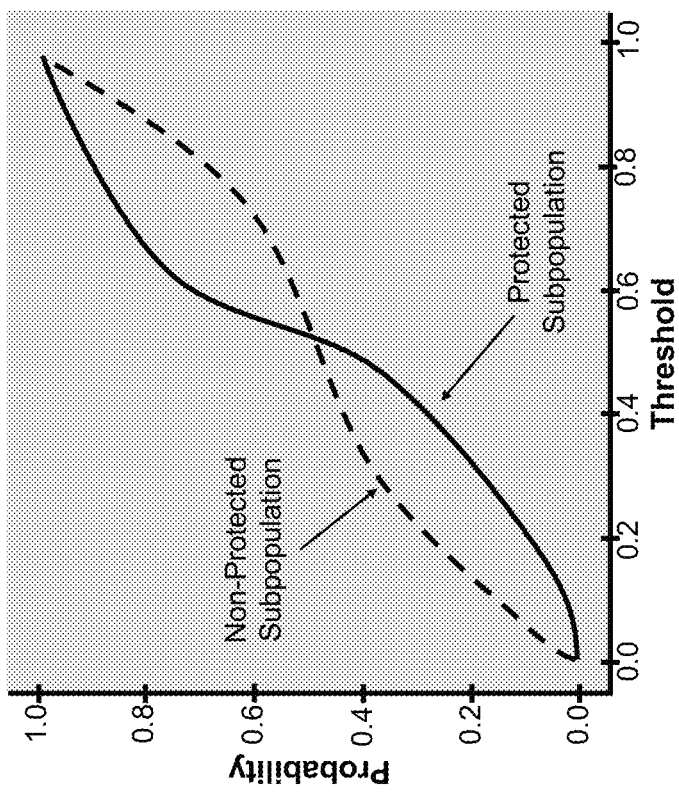
FIG. 4A is a two-dimensional graph that illustrates examples empirical CDFs that may be produced for empirical distributions of model scores for the protected and non-protected subpopulations that may be output by a first example of an initial model object.
Figure 4B:
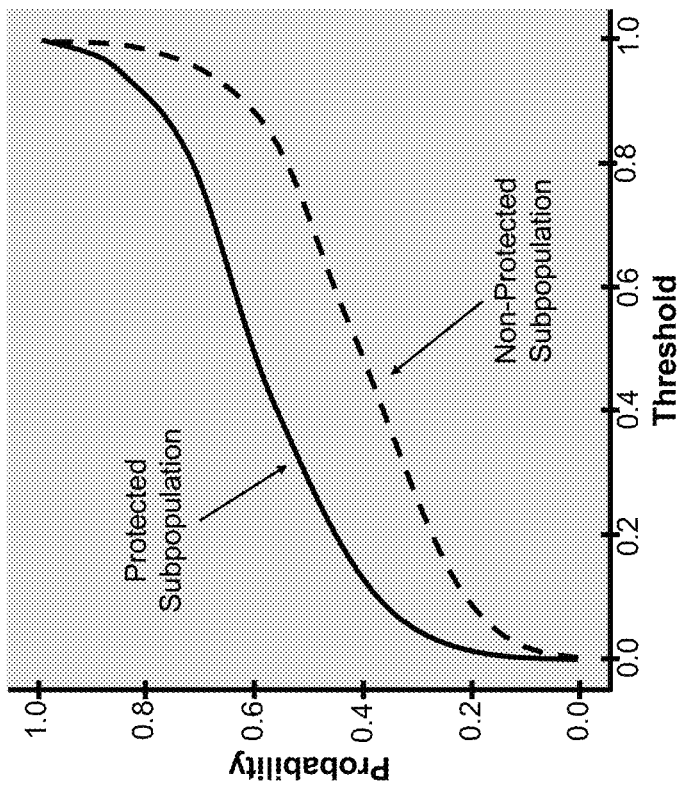
FIG. 4B is a two-dimensional graph that illustrates examples empirical CDFs that may be produced for empirical distributions of model scores for the protected and non-protected subpopulations that may be output by a second example of an initial model object.

As one possibility, the computing platform may determine a Wasserstein distance between the first and second empirical distributions of the initial model object's respective sets of model scores for the protected and non-protected subpopulations. For instance, in order to determine a Wasserstein-1 distance (which sometimes referred to as a "W1" distance for short), the computing platform may begin by producing a first empirical cumulative distribution function (CDF) for the first empirical distribution and producing a second empirical CDF for the second empirical distribution, where each such empirical CDF represents a probability that the model score output by the initial model object for the particular subpopulation has a value of less than or equal to some threshold. FIGS. 4A-4B show illustrative examples of empirical CDFs that may be produced for the empirical distributions of the model scores for the protected and non-protected subpopulations that may be output by two different examples of the initial model object. In each of FIGS. 4A-4B, a two-dimensional graph is shown where the x-axis represents a threshold, the y-axis represents a probability that the model score has a value of less than or equal to the threshold, the solid line represents the first CDF for the protected subpopulation, and the dashed line represents the second CDF for the non-protected population.

FIG. 4A shows that, for the first example of the initial model object, the first CDF for the protected subpopulation falls above the second CDF for the non-protected subpopulation for all values of the threshold. This means that, for all values of the threshold, the probability that the first example model object's score for the protected subpopulation will not exceed the threshold is higher than the probability that the first example model object's score for the non-protected subpopulation will not exceed the threshold. Or in other words, for all values of the threshold, the first example model object's score is more likely to exceed the threshold for the non-protected subpopulation than it is for the protected subpopulation. In this respect, if the threshold in FIG. 4A comprises a threshold for a binary classification model and the first example model object's score exceeding the threshold is considered to be the favorable classification outcome for the binary classification model—which may be the case for any model object that is configured to output a likelihood that an organization should (as opposed to should not) make a decision that is favorable to an individual—then the example of FIG. 4A reflects a scenario where the initial model object is more likely to produce a favorable classification outcome for the non-protected subpopulation than it is for the protected subpopulation (i.e., it exhibits a bias that favors the non-protected subpopulation) for all values of the threshold that may be applied to the initial model object's score.

On the other hand, FIG. 4B shows that, for the second example of the initial model object, the first CDF for the protected subpopulation falls below the second CDF for the non-protected subpopulation for a first range of threshold values (e.g., from 0.0 to around 0.53) and then falls above the second CDF for the non-protected subpopulation for a second range of threshold values (e.g., from around 0.53 to 1.0). This means that (i) within the first range of threshold values, the second example model object's score is more likely to exceed the threshold for the protected subpopulation than it is for the non-protected subpopulation (because the probability that the second example model object's score for the protected subpopulation will not exceed the threshold is lower than the probability that the second example model object's score for the non-protected subpopulation will not exceed the threshold) and (ii) within the second range of threshold values, the second example model object's score is more likely to exceed the threshold for the non-protected subpopulation than it is for the protected subpopulation (because the probability that the second example model object's score for the protected subpopulation will not exceed the threshold is higher than the probability that the second example model object's score for the non-protected subpopulation will not exceed the threshold). In this respect, if the threshold in FIG. 4B comprises a threshold for a binary classification model and the second example model object's score exceeding the threshold is considered to be the favorable classification outcome for the binary classification model—which may be the case for any model object that is configured to output a likelihood that an organization should (as opposed to should not) make a decision that is favorable to an individual—then the example of FIG. 4B reflects a scenario where the initial model object (i) is more likely to produce a favorable classification outcome for the protected subpopulation than it is for the non-protected subpopulation (i.e., it exhibits a bias that favors the protected subpopulation) for any value within the first range of threshold values and (ii) is more likely to produce a favorable classification outcome for the non-protected subpopulation than it is for the protected subpopulation (i.e., it exhibits a bias that favors the non-protected subpopulation) for any value within the second range of threshold values.

The empirical CDFs that may be produced for the first and second empirical distributions of the initial model object's scores for the protected and non-protected subpopulations may take various other forms as well.

After producing the first and second empirical CDFs for the first and second empirical distributions of the initial model object's respective sets of model scores for the protected and non-protected subpopulations, the computing platform may then determine a total Wasserstein-1 distance between the first and second empirical distributions of the initial model object's respective sets of model scores for the protected and non-protected subpopulations by computing the integrated absolute difference between the first and second empirical CDFs across the entire range of threshold values. In this respect, the total Wasserstein-1 distance that is determined may serve as one possible way to quantify a total bias exhibited by the initial model object for the protected and non-protected subpopulations.

Additionally or alternatively, in a scenario such as the one illustrated in FIG. 4B where the initial model object exhibits a bias that favors the protected subpopulation for some threshold values and favors the non-protected subpopulation for other threshold values, the computing platform may split the total Wasserstein-1 distance between the first and second empirical distributions of the initial model object's respective sets of model scores for the protected and non-protected subpopulations into two parts: (i) a first distance component that is determined by computing the integrated absolute difference between the first and second empirical CDFs within any range of threshold values where the first CDF for the protected subpopulation falls below the second CDF for the non-protected subpopulation (which reflects a bias that favors the protected subpopulation for such threshold values in scenarios where exceeding the threshold produces a favorable classification outcome for a binary classification model) and (ii) a second distance component that is determined by computing the integrated absolute difference between the first and second empirical CDFs within any range of threshold values where the first CDF for the protected subpopulation falls above the second CDF for the non-protected subpopulation (which reflects a bias that favors the non-protected subpopulation for such threshold values in scenarios where exceeding the threshold produces a favorable classification outcome for a binary classification model). In this respect, the first distance component serves to quantity the portion of the initial model object's total bias that favors the protected subpopulation, which may be referred to herein as the "negative" component of the bias exhibited by the initial model object for the protected and non-protected subpopulations, while the second distance component serves to quantity the portion of the initial model object's total bias that favors the non-protected subpopulation, which may be referred to herein as the "positive" component of the bias exhibited by the initial model object for the protected and non-protected subpopulations. It will also be understood that the sum of these negative and positive components will equate to the total bias that was discussed above.

Figure 4C:
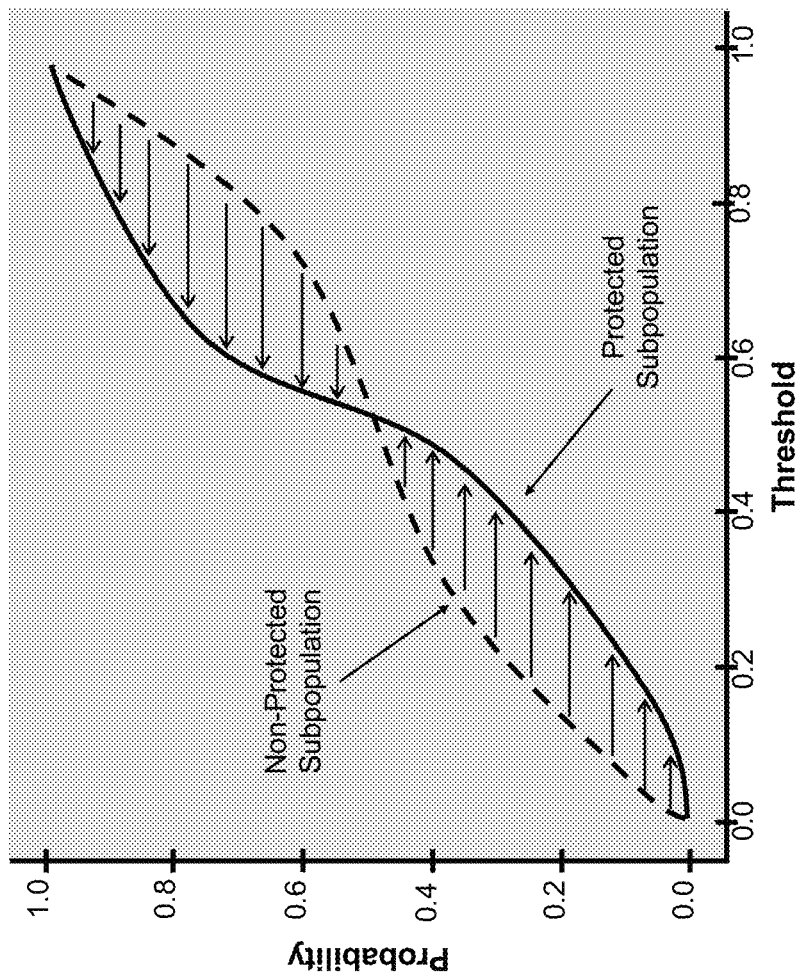
FIG. 4C is a two-dimensional graph that illustrates the concept of transport efforts in the context of FIG. 4B.

Conceptually, this function of splitting the Wasserstein-1 distance between the first and second empirical distributions of the initial model object's respective sets of model scores for the protected and non-protected subpopulations into two parts may be based on an optimal transport framework, where (i) the first distance component that quantifies the negative component of the initial model object's bias is a measure of the transport effort involved in moving points of the second empirical distribution for the non-protected subpopulation in the non-favorable direction and (ii) the second distance component that quantifies the positive component of the initial model object's bias is a measure of the transport effort involved in moving points of the second empirical distribution for the non-protected subpopulation in the favorable direction. This concept of transport efforts is illustrated in FIG. 4C, which is an updated version of FIG.

4B that includes a (i) first set of arrows showing the optimal transport flow of moving the portion of the second empirical distribution falling within the first range of threshold values into the non-favorable direction in order to merge it with the portion of the first empirical distribution falling within the first range of threshold values and (ii) a second set of arrows showing the optimal transport flow of moving the portion of the second empirical distribution falling within the second range of threshold values into the favorable direction in order to merge it with the portion of the first empirical distribution falling within the second range of threshold values.

Additionally yet, in a scenario where the computing platform determines the negative and positive components of the bias exhibited by the initial model object for the protected and non-protected subpopulations, the computing platform may also optionally determine a "net" bias exhibited by the initial model object for the protected and non-protected subpopulations by subtracting the negative component of the bias from the positive component of the bias. In this respect, a net bias having a positive value indicates that the bias favoring the non-protected subpopulation outweighs the bias favoring the protected subpopulation, whereas a net bias having a negative value indicates that the bias favoring the protected subpopulation outweighs the bias favoring the non-protected subpopulation.

The function of determining a Wasserstein distance between the empirical distributions of the initial model object's respective sets of model scores for the protected and non-protected subpopulations may take other forms as well, including but not limited to the possibility that the computing platform may determine a Wasserstein distance other than Wasserstein-1 distance. For instance, the computing platform may determine a Wasserstein-q distance that is represented by the following formula:

$$W_q(\mu, \nu) = \left( \int |F_\mu^{-1}(p) - F_\nu^{-1}(p)|^q dp \right)^{\frac{1}{q}}, \quad \text{(Eq. 1)}$$

where q could be a value greater or equal to 1.

As another possibility, instead of determining a Wasserstein distance between empirical distributions, the computing platform may determine some other metric that serves as a measure of the difference between the empirical distributions of the initial model object's respective sets of model scores for the protected and non-protected subpopulations, which may then be used to quantify the bias exhibited by the initial model object for the protected and non-protected subpopulations. For example, the computing platform may determine some other integral probability metric (IPM) that serves as a measure of the difference between the empirical distributions of the initial model object's respective sets of model scores for the protected and non-protected subpopulations, one example of which may take the form of a Dudley metric. As another example, the computing platform may determine a Kolmogorov-Smirnov distance between the empirical distributions of the initial model object's respective sets of model scores for the protected and non-protected subpopulations. As yet another example, the computing platform may use an (f,γ)-divergence to determine the difference between the empirical distributions of the initial model object's respective sets of model scores for the protected and non-protected subpopulations. The computing platform may determine a difference between the empirical distributions of the initial model object's respective sets of model scores for the protected and non-protected subpopulations in some other manner as well.

In other implementations, instead of quantifying the bias exhibited by the initial model object for the protected and non-protected subpopulations in terms of a difference between the empirical distributions of the initial model object's respective sets of model scores for the protected and non-protected subpopulations, the computing platform may quantify the bias exhibited by the initial model object for the protected and non-protected subpopulations in terms of some other metric that is determined based on the initial model object's respective sets of model scores for the protected and non-protected subpopulations.

For instance, as one possibility, the computing platform could alternatively apply a classification threshold to the initial model object in order to create a binary classification model based on the initial model object and then quantify the bias exhibited by the initial model object for the protected and non-protected subpopulations in terms of a difference between (i) a misclassification error rate associated with the initial model object's first set of model scores for the protected subpopulation (i.e., the extent of individuals in the protected subpopulation that are classified incorrectly) and (ii) a misclassification error rate associated with the initial model object's second set of model scores for the non-protected subpopulation (i.e., the extent of individuals in the non-protected subpopulation that are classified incorrectly). In this respect, the difference in misclassification error rates could be evaluated across all of the possible classification outcomes that can be produced by the classification model, which may be referred to as an assessment of whether the classification model that is based on the initial model object exhibits "equalized odds," or the difference in misclassification error rates could be evaluated only for one "favorable" classification outcome that can be produced by the classification model, which may be referred to as an assessment of whether the classification model that is based on the initial model object exhibits "equalized opportunity," among other possibilities. Further, one possible way that a computing platform may determine a difference in misclassification error rates between the protected and non-protected subpopulations is by (i) expressing the misclassification error rates associated with the initial model object's respective sets of model scores for the protected and non-protected subpopulations in terms of first and second CDFs and then (ii) determining the integrated absolute difference between the first and second CDFs.

The function of quantifying the bias exhibited by the initial model object for the protected and non-protected subpopulations may take various other forms as well.

After quantifying the bias exhibited by the initial model object for the protected and non-protected subpopulations (e.g., using one of the techniques described above), the computing platform may then use this quantified bias as a basis for determining whether the initial model object exhibits a threshold level of bias that favors one subpopulation over the other (e.g., favors the non-protected subpopulation over the protected subpopulation), such that mitigation should be performed for the initial model object. This function may take various forms, which may depend in part on the value(s) utilized to quantify the bias.

As one possible implementation, if the bias exhibited by the initial model object for the protected and non-protected subpopulations is quantified in terms of a total bias value (e.g., a total Wasserstein-1 distance between the empirical distributions of the initial model object's respective sets of model scores for the protected and non-protected subpopulations), the computing platform may compare the total bias value to a threshold and then either (i) determine that the initial model object does exhibit a threshold level of bias that favors one subpopulation over the other if the total bias value meets the threshold or (ii) determine that the initial model object does not exhibit a threshold level of bias that favors one subpopulation over the other if the total bias value does not meet the threshold. This implementation may be best suited for scenarios where the total bias is expected to be composed primarily of one bias component that favors one subpopulation over the other (e.g., positive bias that favors the non-protected sub-population), such that it is not necessary to separately evaluate the positive and negative components of the bias.

As another possible implementation, if the bias exhibited by the initial model object for the protected and non-protected subpopulations is quantified in terms of negative and positive bias values (e.g., a total Wasserstein-1 distance between the empirical distributions of the initial model object's respective sets of model scores for the protected and non-protected subpopulations that has been split into separate distance components), the computing platform may use one or both of these positive and negative bias values as a basis for determining whether the initial model object exhibits a threshold level of bias that warrants mitigation. This implementation may be better suited for scenarios where the total bias may comprise an unknown mix of positive and negative components, such that it may be desirable to separate out the positive component of the bias from the negative component of the bias when determining whether the quantified bias amounts to a threshold level of bias that favors one subpopulation over the other.

For instance, the computing platform may compare the positive bias value to a threshold and then either (i) determine that the initial model object does exhibit a threshold level of bias that favors the non-protected subpopulation over the protected subpopulation if the positive bias value meets the threshold, in which case the computing platform may proceed to mitigate that bias, or (ii) determine that the initial model object does not exhibit a threshold level of bias that favors the non-protected subpopulation over the protected subpopulation if the positive bias value do not meet the threshold. Additionally or alternatively, the computing platform may compare the negative bias value to a threshold and then either (i) determine that the initial model object does exhibit a threshold level of bias that favors the protected subpopulation over the non-protected subpopulation if the positive bias value meets the threshold, in which case the computing platform may proceed to mitigate that bias, or (ii) determine that the initial model object does not exhibit a threshold level of bias that favors the protected subpopulation over the non-protected subpopulation if the positive bias value do not meet the threshold. However, it should be understood that in at least some scenarios, the computing platform may be configured to engage in bias mitigation only with respect to bias that favors the non-protected subpopulation over the protected subpopulation, and not with respect to any bias that favors the protected subpopulation over the non-protected subpopulation. In such scenarios, the computing platform may be configured to make its determination of whether the initial model object exhibits a threshold level of bias that warrants mitigation based solely on the positive bias value, while forgoing any further evaluation of the negative bias value.

As yet another possible implementation, if the bias exhibited by the initial model object for the protected and non-protected subpopulations is quantified in terms of a net bias value (e.g., a differential between a distance component corresponding to a positive bias value and a distance component corresponding to a negative bias value), the computing platform may use the net bias value as a basis for determining whether the initial model object exhibits a threshold level of bias that warrants mitigation. As above, this implementation may also be better suited for scenarios where the total bias may comprise an unknown mix of positive and negative components, such that it may be desirable to separate out the positive component of the bias from the negative component of the bias when determining whether the quantified bias amounts to a threshold level of bias that favors one subpopulation over the other.

For instance, if the net bias value has a positive value—which indicates that the initial model object favors the non-protected subpopulation over the protected subpopulation—the computing platform compare the net bias value to a positive threshold value and then either (i) determine that the initial model object does exhibit a threshold level of bias that favors the non-protected subpopulation over the protected subpopulation if the net bias value is at or above the positive threshold value, in which case the computing platform may proceed to mitigate that bias, or (ii) determine that the initial model object does not exhibit a threshold level of bias that favors the non-protected subpopulation over the protected subpopulation if the net bias value is below the positive threshold value. On the other hand, if the net bias value has a negative value—which indicates that the initial model object favors the protected subpopulation over the non-protected subpopulation—the computing platform compare the net bias value to a negative threshold value and then either (i) determine that the initial model object does exhibit a threshold level of bias that favors the protected subpopulation over the non-protected subpopulation if the net bias value is at or below the negative threshold value, in which case the computing platform may proceed to mitigate that bias, or (ii) determine that the initial model object does not exhibit a threshold level of bias that favors the protected subpopulation over the non-protected subpopulation if the net bias value is above than the negative threshold value. However, it should again be understood that in at least some scenarios, the computing platform may be configured to engage in bias mitigation only with respect to bias that favors the non-protected subpopulation over the protected subpopulation, and not with respect to any bias that favors the protected subpopulation over the non-protected subpopulation. In such scenarios, the computing platform may only perform a further evaluation of whether the net bias value indicates a threshold level of bias if the net bias value is positive, while forgoing any further evaluation of whether the net bias value indicates a threshold level of bias if the net bias value is negative.

The function of using the quantified bias to determine whether the initial model object exhibits a threshold level of bias that favors one subpopulation over the other (e.g., favors the non-protected subpopulation over the protected subpopulation) may take other forms as well.

In line with the discussion above, the computing platform may carry out the functions of blocks 302-308 for different pairs of subpopulations defined based on various different attributes. For instance, the computing platform may carry out the functions of blocks 302-308 for one pair of subpopulations defined based on gender (e.g., females versus males), each of one or more pairs of subpopulations defined based on race (e.g., African American versus White subpopulations, Asian versus White subpopulations, Hispanic versus White subpopulations, etc.), each of one or more pairs of subpopulations defined based on age (e.g., individuals above 62 years of age versus individuals below 62 years of age), and so on. After performing this evaluation across the different pairs of subpopulations, the computing platform may then reach one of two possible conclusions: (1) that the initial model object does not exhibit a threshold level of bias that warrants mitigation for any attribute or (2) that the initial model object does exhibit a threshold level of bias that warrants mitigation for at least one attribute, in which case the computing platform may also identify each specific pair of subpopulations for which the threshold level of bias was determined.

While the foregoing describes an approach in which the computing platform determines whether initial model object for the data science exhibits a threshold level of bias that warrants mitigation on an attribute-by-attribute basis (and more particularly, on an attribute-defined subpopulation-pair-by-subpopulation-pair basis), in alternate implementations, the computing platform may be configured to determine whether initial model object for the data science exhibits a threshold level of bias that warrants mitigation by (i) identifying a single, common non-protected subpopulation that is defined based on multiple attributes of interest (e.g., individuals that are males and part of the White race), (ii) identifying a plurality of protected subpopulations that are based on the multiple attributes of interest (e.g., a first subpopulation comprising individuals that are females and part of the White race, a second subpopulation comprising individuals that are females and part of the African American race, a third subpopulation comprising individuals that are males and part of the African American race, and so on), (iii) quantifying the bias exhibited by the initial model object for each of the protected subpopulations as compared to the common non-protected subpopulation in a manner similar to that described above, and (iv) aggregate the bias exhibited the initial model object across the different protected subpopulations and thereby determine an aggregated bias exhibited by the initial model object for all attributes of interest. In such an implementation, the function of aggregating the bias exhibited the initial model object across the different protected subpopulations may take various forms, and in at least some examples, may involve assigning different weights to the quantified bias for the different subpopulation pairs (e.g., based on whether certain protected subpopulations present a greater concern for bias than others) and then determining a weighted average of the bias exhibited the initial model object across the different protected subpopulations.

The computing platform's evaluation of whether the initial model object exhibits a threshold level of bias that warrants mitigation could take some other form as well.

Further details regarding these and other techniques for quantifying and evaluating a model object's level of bias can be found in (i) a paper entitled "Model-agnostic bias mitigation methods with regressor distribution control for Wasserstein-based fairness metrics" by Miroshnikov et al., which has a submission date of Nov. 19, 2021 and can be found at https://arxiv.org/abs/2111.11259, and (ii) a journal article entitled "Wasserstein-based fairness interpretability framework for machine learning models" by Miroshnikov et al., which was published in the "Machine Learning" journal (2022), Springer, on Jul. 21, 2022 and can be found at https://link.springer.com/article/10.1007/s10994-022-06213-9, each of which is incorporated herein by reference in its entirety.

Figure 5:
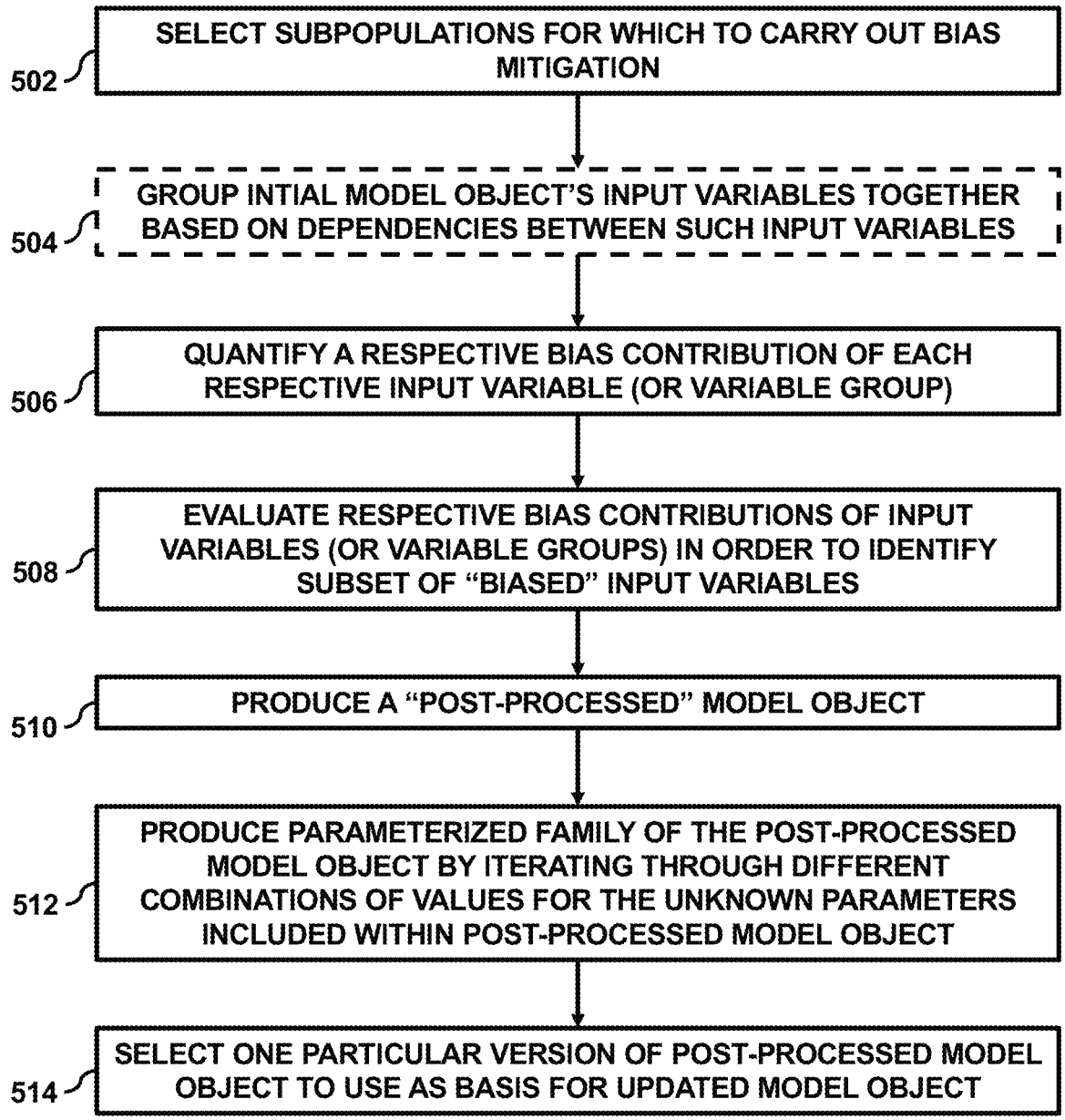
FIG. 5 is a flow chart that illustrates one possible example of a process for mitigating the bias of an initial model object in accordance with the present disclosure.

Returning to FIG. 2, if the computing platform's evaluation at block 204 results in a determination that the initial model object for the data science model exhibits a threshold level of bias that warrants mitigation for at least one attribute, then at block 206, the computing platform may engage in a process for mitigating the bias of the initial model object and thereby producing an updated model object for the data science model. One possible example of a process 500 for mitigating the bias of an initial model object in accordance with the present disclosure is shown in FIG. 5. As with the example processes 200 and 300 of FIGS. 2 and 3, the example process 500 of FIG. 5 may be carried out by any computing platform that is capable of creating a data science model, including but not limited the computing platform 102 of FIG. 1. Further, it should be understood that the example process 500 of FIG. 5 is merely described in this manner for the sake of clarity and explanation and that the example embodiment may be implemented in various other manners, including the possibility that functions may be added, removed, rearranged into different orders, combined into fewer blocks, and/or separated into additional blocks depending upon the particular embodiment.

As shown in FIG. 5, the example process 500 may begin at block 502 with the computing platform selecting the particular subpopulations for which to carry out the bias mitigation, which may govern which data is used to evaluate the output of the initial model object. This function may take various forms.

As one possibility, if the computing platform determined at block 204 that the initial model object is exhibiting a threshold level of bias with respect to only one subpopulation pair that is defined based on one attribute, then the computing platform may select that one subpopulation pair as the particular subpopulations for which to carry out the bias mitigation. For example, if the computing platform determined at block 204 that the initial model object is exhibiting a threshold level of bias for the one subpopulation pair that is defined based gender (e.g., a bias that favors males over females), but is not exhibiting a threshold level of bias for any other subpopulation pair, then the computing platform may select the subpopulation pair comprising the protected female subpopulation versus the non-protected male subpopulation as the subpopulations for which to carry out the bias mitigation.

As another possibility, if the computing platform determined at block 204 that the initial model object is exhibiting a threshold level of bias with respect to multiple different subpopulation pairs of concern, then the computing platform may be configured to select a representative one of those different subpopulation pairs for which to carry out the bias mitigation in the first instance. In this respect, the computing platform may utilize any of various criteria to select the representative one of those different subpopulation pairs for which to carry out the bias mitigation, and in at least some implementations, the computing platform may select the subpopulation pair for which the initial model object is exhibiting a highest level of bias favoring a non-protected subpopulation over a protected subpopulation. For example, if the computing platform determined at block 204 that the initial model object is exhibiting a threshold level of bias for three different subpopulation pairs—such as a first gender-based subpopulation pair comprising female versus male subpopulations, a second race-based subpopulation pair comprising African American versus White subpopulations, and a third race-based subpopulation pair comprising Asian versus White subpopulations—the computing platform may evaluate the respective level of bias that was determined for each of the first, second, and third subpopulation pairs and then select whichever of the first, second, and third subpopulation pairs is associated with a highest level of bias favoring a non-protected subpopulation (e.g., males or whites) over a protected subpopulation (e.g., females, African Americans, or Asians).

In turn, the computing platform may carry out the remaining functions of FIG. 5 (blocks 504-514) with respect to the selected subpopulation pair, which may produce a given post-processed model object that no longer exhibits a threshold level of bias for at least that selected subpopulation pair. As further described below, in at least some implementations, the computing platform may thereafter evaluate whether the given post-processed model object also sufficiently mitigates the bias previously exhibited by the initial model object for the other subpopulation pairs of concern, and depending on the results of that evaluation, the computing platform may either (i) verify that the given post-processed model object can be used as the updated model object for the data science model or (ii) determine that the given post-processed model object does not sufficiently mitigate the bias for the other subpopulation pairs of concern, in which case the computing platform may then attempt to produce a different post-processed model object for the data science model.

As yet another possibility, if the computing platform determined at block 204 that the initial model object is exhibiting a threshold level of bias with respect to multiple different subpopulation pairs, then the computing platform may be configured to select (i) two or more protected subpopulations that are each defined based on a given combination of multiple attributes (e.g., a first protected subpopulation comprising individuals that are females and part of the White race, a second protected subpopulation comprising individuals that are females and part of the African American race, a third protected subpopulation comprising individuals that are males and part of the African American race, and so on) and (ii) one common non-protected subpopulation that is defined based on the given combination of multiple attributes (e.g., individuals that are males and part of the White race). In turn, the computing platform may carry out the remaining functions of FIG. 5 (blocks 504-514) with respect to the two or more protected subpopulations as compared to the one common non-protected subpopulation, which may involve certain additional functionality that is described in further detail below.

Other approaches for selecting the particular attribute and corresponding subpopulations for which to carry out the bias mitigation are possible as well—including but not limited to an alternative embodiment where the computing platform selects two or more different subpopulation pairs for which to carry bias mitigation at block 502, carries out a separate iteration of the remaining functionality of FIG. 5 (blocks 504-514) for each of the two or more different subpopulation pair that are selected in order to produce a respective post-processed model object with respect to each different subpopulation pair, and then produces a model object that comprises a combination of the respective post-processed model objects that are produced with respect to the two or more different subpopulation pairs. This alternative embodiment is described in further detail below.

Turning to block 504, the computing platform may optionally group certain of the initial model object's input variables together based on dependencies between such input variables (e.g., based on the mutual information shared between the input variables). In this respect, the computing platform may utilize any technique now known or later developed to group the model object's input variables together based on such dependencies, including but not limited to any of various possible clustering techniques.

For instance, as one possibility, the computing platform may group the model object's input variables together utilizing a clustering technique that is based on Maximal Information Coefficient (MIC) values, which are a regularized version of mutual information that provide measures of the dependency strengths between different pairs of variables. For example, an MIC value for a pair of input variables that is near or at 0 indicates that there is little or no dependency between the pair of input variables (i.e., the input variables are independent of one another), whereas an MIC value for a pair of input variables that is at or near 1 indicates that there is a strong dependency between the pair of input variables (i.e., the input variables are dependent of one another).

In order to cluster based on these MIC values, the computing platform may begin by determining a respective MIC value for each possible pair of input variables in the initial model object's set of input variables based on an analysis of a training dataset (e.g., the training dataset that was used to train initial model object). Next, the computing platform may (i) translate the MIC values into dissimilarity values (e.g., by taking the complement of the MIC values) and then (ii) inputting those dissimilarity values into an agglomerative clustering algorithm that functions to cluster the input variables in a "bottom up" manner by initially treating each input variable as a single-variable cluster, and then during each iteration of the algorithm, merging a selected pair of clusters (e.g., the pair of clusters having the a smallest intergroup dissimilarity) into a combined cluster. Such an algorithm may continue to iterate until all of the input variables have been merged into one combined cluster, and the result is a dendrogram (also referred to as a partition tree) that encodes the strength of the dependencies between the input variables in terms of hierarchal tree of clusters, where the height of the line that connects two lower-level clusters represents the dissimilarly between the lower-level clusters. After the dendrogram has been produced, the computing platform may apply a threshold dissimilarity value to the dendrogram in order to cut the tree at a given height and thereby define a particular set of input-variable clusters that satisfy the threshold dissimilarity value, which may then be utilized as the variable groups that are defined based on dependencies.

Figure 6:
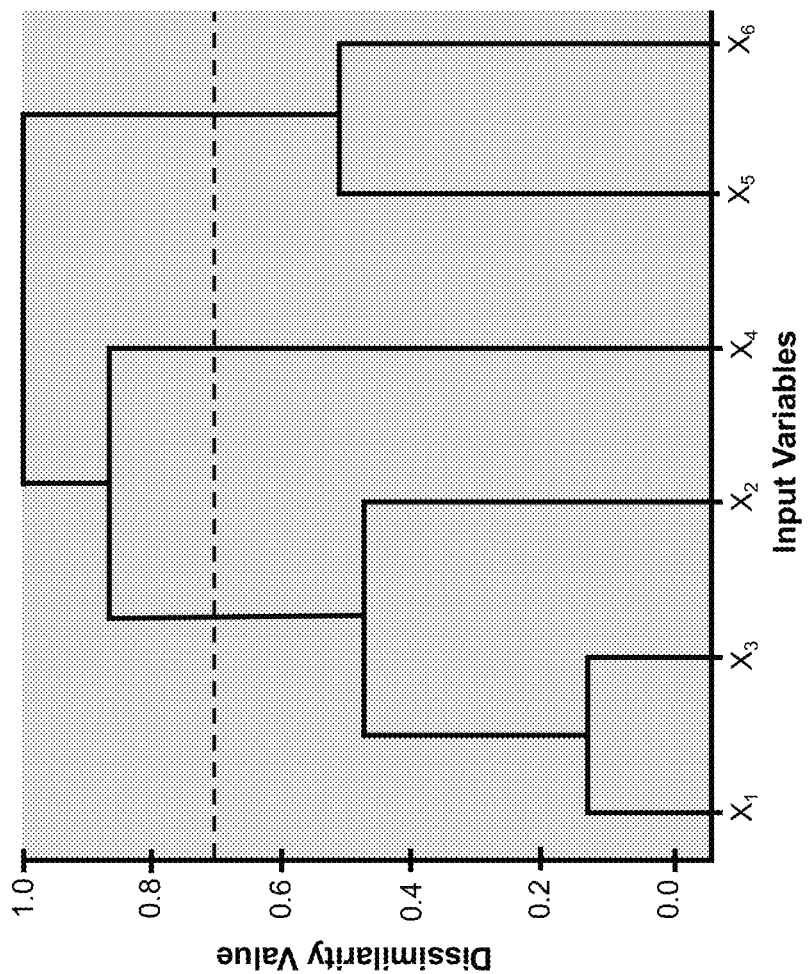
FIG. 6 is a flow chart that illustrates one possible example of a dendrogram that may be produced for an initial model object's input variables in accordance with the present disclosure.

One possible example of such a dendrogram for a given set of input variables comprising $X_1$, $X_2$, $X_3$, $X_4$, $X_5$, and $X_6$ is shown in FIG. 6. As shown in FIG. 6, the given set of input variables have been arranged into a partition tree, and a threshold dissimilarity value of approximately 0.7 has then been applied to the partition tree in order to define a set of three clusters—a first cluster comprising $X_1$, $X_2$, and $X_3$, a second cluster comprising $X_4$, and a third cluster comprising $X_5$, and $X_6$. In such an example, the computing platform may group the initial model object's input variables in accordance with these three clusters and then use these three groups when evaluating the bias contributions in the manner described below.

However, it should be understood that this is just one possible example of an MIC-based clustering technique, and that other MIC-based clustering techniques could also be utilized to group the model object's input variables together based on dependencies—including but not limited to clustering techniques that are based on divisive clustering rather than agglomerative clustering.

As another possibility, the computing platform may group the model object's input variables together utilizing a clustering technique that is based on principal component analysis (PCA) (e.g., the PROC VARCLUS clustering technique developed by SAS®). According to one such PCA-based clustering technique, the computing platform may begin by assigning each of the initial model object's input variables to a single cluster, generating a covariance matrix for the initial model object's input variables based on an analysis of a training dataset (e.g., the training dataset that was used to train initial model object), and then utilizing the generated covariance matrix to split the single cluster of input variables into two clusters of input variables. The computing platform may then iteratively repeat this process in a "top down" manner for each resulting cluster until all clusters include only a single input variable, which forms a tree structure representing the relationships between the input variables. In turn, the computing platform may then combine clusters of input variables within the tree structure together into a group if the correlation between the input variables in the clusters is above a threshold. However, it should be understood that this is just one possible example of a PCA-based clustering technique, and that other PCA-based clustering techniques could also be utilized to group the model object's input variables together based on dependencies.

The computing platform could also utilize other clustering techniques to group the model object's input variables together based on their dependencies.

Further details regarding these and other techniques for grouping a model object's input variables together based on dependencies can be found in (i) U.S. patent application Ser. No. 16/868,019, which was filed on May 6, 2020 and is entitled "SYSTEM AND METHOD FOR UTILIZING GROUPED PARTIAL DEPENDENCE PLOTS AND SHAPLEY ADDITIVE EXPLANATIONS IN THE GENERATION OF ADVERSE ACTION REASON CODES," (ii) U.S. patent application Ser. No. 17/322,828, which was filed on May 17, 2021 and is entitled "SYSTEM AND METHOD FOR UTILIZING GROUPED PARTIAL DEPENDENCE PLOTS AND GAME-THEORETIC CONCEPTS AND THEIR EXTENSIONS IN THE GENERATION OF ADVERSE ACTION REASON CODES," and (iii) a paper entitled "Mutual information-based group explainers with coalition structure for ML model explanations" by Miroshnikov et al., which has a last revised date of Sep. 7, 2021 and can be found at https://arxiv.org/abs/2102.10878, each of which is incorporated herein by reference in its entirety.

In an embodiment where the computing platform groups the model object's set of input variables together based on dependencies as described, the initial model object's set of input variables may then be referred to in terms of a set of "variable groups" that each comprises one or more input variables.

At block 506, the computing platform may then quantify a respective contribution of each respective input variable (or variable group) in at least a subset of the initial model object's set of input variables to the bias exhibited by the initial model object for the selected subpopulations, which may be referred to herein as the "bias contribution" (or "bias explanation") of each such input variable. In this respect, the computing platform may be configured to use any of various explanability techniques for determining explainer values for the initial model object's set of input variables that can then be used to quantify the bias contributions of the input variables, where the explanability technique that is utilized may depend in part on whether the initial model object's set of input variables are arranged into variable groups.

For instance, in a scenario where the initial model object's set of input variables are not arranged into variable groups, the computing platform may be configured to utilize one of (i) a technique for determining partial dependence plot (PDP) values for individual input variables of a model object or (ii) a technique for determining the contributions of individual input variables of a model object using the Shapley value of a particular game, such as a TreeSHAP technique for determining Shapley values of a tree-based game or a model-agnostic technique for determining Shapley values of a marginal game, among other possibilities.

On the other hand, in a scenario where the initial model object's set of input variables are arranged into variable groups, the computing platform may be configured to utilize one of (i) a technique for determining PDP values for variable groups of a model object, (ii) a technique for determining Shapley values for the quotient marginal game of variable groups of a model object, (iii) a technique for determining two-step Shapley values for the marginal game of individual input variables within variable groups of a model object, (iv) a technique for determining Owen values for the marginal game of individual input variables within variable groups of a model object, or (v) a technique for determining Banzhaf values for the marginal game of individual input variables within variable groups of a model object, among other possibilities.

Further details regarding these and other techniques for determining explainer values for a model's input variables can be found in (i) U.S. patent application Ser. No. 16/868, 019, which was filed on May 6, 2020 and is entitled "SYSTEM AND METHOD FOR UTILIZING GROUPED PARTIAL DEPENDENCE PLOTS AND SHAPLEY ADDITIVE EXPLANATIONS IN THE GENERATION OF ADVERSE ACTION REASON CODES," (ii) U.S. patent application Ser. No. 17/322,828, which was filed on May 17, 2021 and is entitled "SYSTEM AND METHOD FOR UTILIZING GROUPED PARTIAL DEPENDENCE PLOTS AND GAME-THEORETIC CONCEPTS AND THEIR EXTENSIONS IN THE GENERATION OF ADVERSE ACTION REASON CODES," (iii) the paper entitled "Mutual information-based group explainers with coalition structure for ML model explanations" by Miroshnikov et al. that has a last revised date of Sep. 7, 2021, (iv) the paper entitled "Model-agnostic bias mitigation methods with regressor distribution control for Wasserstein-based fairness metrics" by Miroshnikov et al. that has a submission date of Nov. 19, 2021, and (v) the journal article entitled "Wasserstein-based fairness interpretability framework for machine learning models" by Miroshnikov et al. that was published in the "Machine Learning" journal (2022), Springer, on Jul. 21, 2022, each of which is incorporated herein by reference in its entirety.

The computing platform may be configured to utilize other techniques for quantifying the bias contributions of the initial model object's set of input variables as well. Further, it should be understood that at least some of the foregoing techniques could determine the explainer values through the use of approximations rather than exact computations, which may allow such explainer values to be determined in a quicker and more efficient manner.

In order to quantify the bias contributions of the initial model object's set of input variables in a scenario where the selected subpopulations for which to carry out the bias mitigation take the form of one given subpopulation pair comprising a protected subpopulation and a non-protected subpopulation defined based on one given attribute, the computing platform may begin by accessing a historical dataset associated with the given subpopulation pair that includes (i) a first set of historical data records for individuals belonging to the protected subpopulation in the given subpopulation pair and (ii) a second set of historical data records for individuals belonging to the non-protected subpopulation in the given subpopulation pair. For example, if the computing platform selected the gender attribute and the corresponding subpopulation pair comprising a female subpopulation and a male subpopulation, the computing platform may access a historical dataset comprising a first set of historical data records for females and a second set of historical data records for males. Or as another example, if the computing platform selected the race attribute and the corresponding subpopulation pair comprising a given racial minority and a given racial majority, the computing platform may access a historical dataset comprising a first set of historical data records for individuals belonging to the given racial minority and a second set of historical data records for individuals belonging to the given racial majority. In this respect, the historical dataset that is accessed at block 504 may be the same as the historical dataset associated with these two subpopulations that was accessed and utilized at block 204 to evaluate the initial model object for bias, or may be different from the historical dataset data associated with these two subpopulations that was accessed and utilized at block 204.

Next, the computing platform may perform the following functions for each historical data record included in the respective set of historical data records for each of the two subpopulations in the given subpopulation pair: (i) input the historical data record into the initial model object and thereby cause the initial model object to output a model score for the historical data record (or if the historical data record was already scored with the initial model object during the step 306, then access the previously-output model score for the historical data record), and (ii) use the chosen explainer technique to determine a respective explainer value for each respective input variable (or variable group) of the initial model object that quantifies the contribution of the respective input variable (or variable group) to the model score that was output by the initial model object for the historical data record. As a result of performing this functionality across the historical data records included in the respective sets of historical data for the two subpopulations in the given subpopulation pair, the computing platform may produce (i) a first set of explainer values for the initial model object's input variables (or variable groups) that are associated with the protected subpopulation in the given subpopulation pair and (ii) a second set of explainer values for the initial model object's input variables (or variable groups) that are associated with the non-protected subpopulation in the given subpopulation pair. In a simplistic example where the initial model object comprises three input variables (or variable groups) X, Y, and Z, the first set of historical data records for the protected subpopulation comprises n historical data records, and the second set of historical data for the non-protected subpopulation comprises m historical data records, these two sets of explainer values may have the form shown in FIG. 7.

In turn, the computing platform may use first set of explainer values associated with the protected subpopulation in the given subpopulation pair and the second set of explainer values associated with the non-protected subpopulation in the given subpopulation pair as a basis for quantifying the respective bias contributions of the input variables (or variable group) of initial model object. In particular, the computing platform may quantify each respective input variable's (or variable group's) bias contribution based on an evaluation of (i) the respective input variable's (or variable group's) explainer values from the first set associated with the protected subpopulation in the given subpopulation pair, which indicate how the respective input variable (or variable group) contributes to the initial model object's score for the protected subpopulation in the given subpopulation pair, and (ii) the respective input variable's (or variable group's) explainer values from the second set associated with the non-protected subpopulation in the given subpopulation pair, which indicate how the respective input variable (or variable group) contributes to the initial model object's score for the non-protected subpopulation in the given subpopulation pair.

For instance, in at least some implementations, the computing platform may quantify the bias contribution of a particular input variable (or variable group) by determining a difference between a first empirical distribution of the input variable's (or variable group's) explainer values from the first set associated with the protected subpopulation and a second empirical distribution of the input variable's (or variable group's) explainer values from the second set associated with the non-protected subpopulation. The computing platform may determine such a difference between empirical distributions in various ways.

As one possibility, the computing platform may determine a Wasserstein distance between the first and second empirical distributions of the input variable's (or variable group's) respective sets of explainer values for the protected and non-protected subpopulations. For instance, in order to determine a Wasserstein-1 distance, the computing platform may begin by producing a first empirical CDF for the first empirical distribution and producing a second empirical CDF for the second distribution, where each such empirical CDF represents a probability that the input variable's (or variable group's) respective sets of explainer values for the particular subpopulation has a value of less than or equal to some threshold. FIGS. 7A-7D show illustrative examples of empirical CDFs that may be produced for the empirical distributions of explainer values for four different examples of input variables (or variable groups). In each of FIGS. 7A-7D, a two-dimensional graph is shown where the x-axis represents a threshold, the y-axis represents a probability that the example input variable's (or variable group's) explainer value has a value of less than or equal to the threshold, the solid line represents the first CDF for the protected subpopulation, and the dashed line represents the second CDF for the non-protected population.

Figure 8B:
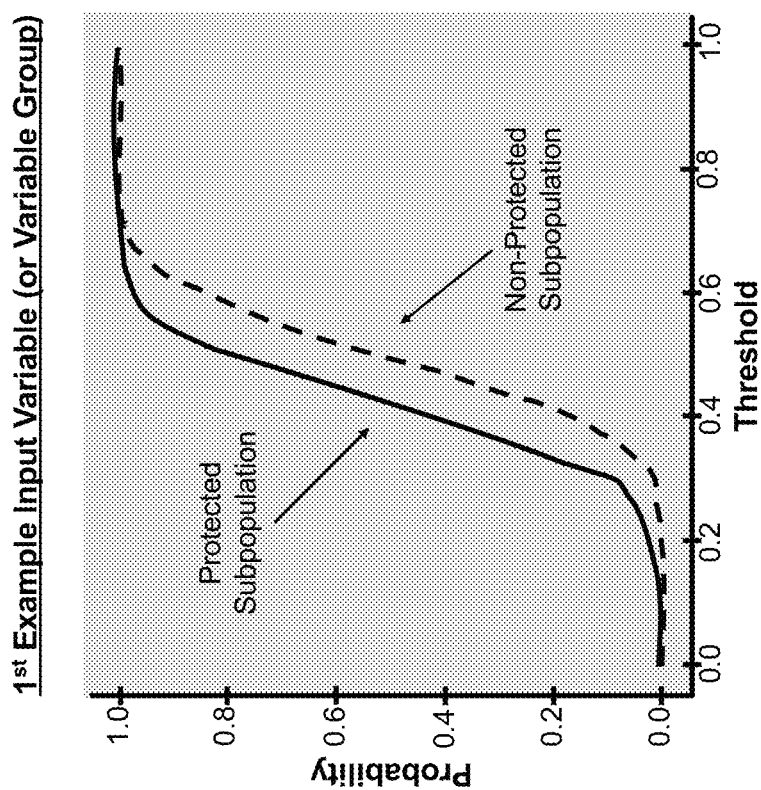
FIG. 8B is a two-dimensional graph that illustrates examples empirical CDFs that may be produced for empirical distributions of explainer values for a second example input variable (or variable group) in accordance with the present disclosure.
Figure 8A:
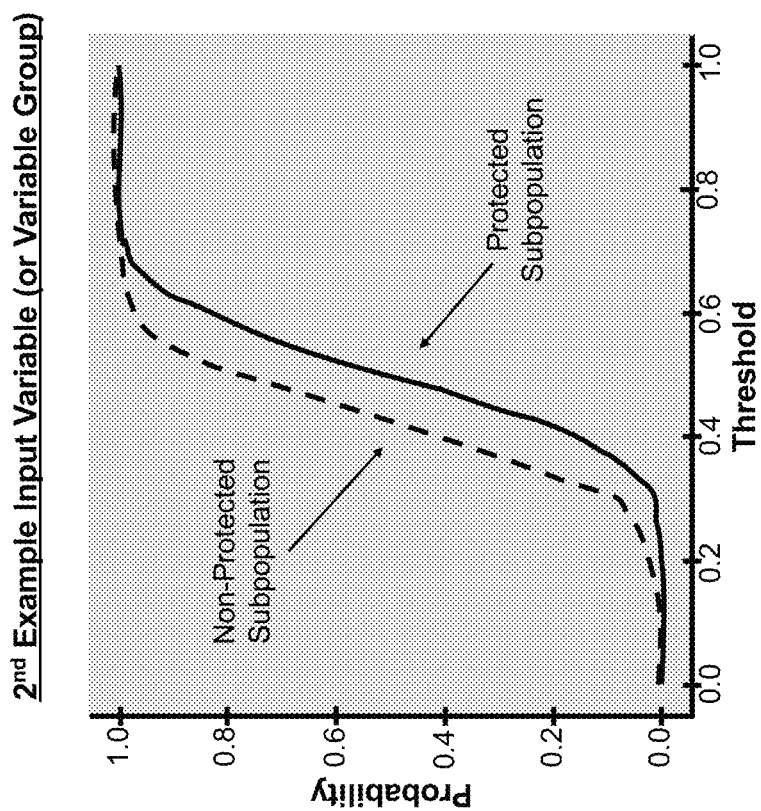
FIG. 8A is a two-dimensional graph that illustrates examples empirical CDFs that may be produced for empirical distributions of explainer values for a first example input variable (or variable group) in accordance with the present disclosure.

FIG. 8A shows that, for the first example input variable (or variable group), the first CDF for the protected subpopulation falls above the second CDF for the non-protected subpopulation for all values of the threshold. This means that, for all values of the threshold, the probability that the first example input variable's (or variable group's) explainer value for the protected subpopulation will not exceed the threshold is higher than the probability that the first example input variable's (or variable group's) explainer value for the non-protected subpopulation will not exceed the threshold. Or in other words, for all values of the threshold, the first example input variable's (or variable group's) explainer value is more likely to exceed the threshold for the non-protected subpopulation than it is for the protected subpopulation. In this respect, if exceeding the threshold corresponds to aa favorable outcome for a binary classification model (which as noted above may be the case for any model object that is configured to output a likelihood that an organization should make a decision that is favorable to an individual), then the example of FIG. 8A reflects a scenario where the input variable (or variable group) has a bias contribution that favors the non-protected subpopulation for all values of the threshold that may be applied to the explainer value.

FIG. 8B shows that, for the second example input variable (or variable group), the first CDF for the protected subpopulation falls below the second CDF for the non-protected subpopulation for all values of the threshold. This means that, for all values of the threshold, the probability that the second example input variable's (or variable group's) explainer value for the protected subpopulation will not exceed the threshold is lower than the probability that the second example input variable's (or variable group's) explainer value for the non-protected subpopulation will not exceed the threshold. Or in other words, for all values of the threshold, the second example input variable's (or variable group's) explainer value is more likely to exceed the threshold for the protected subpopulation than it is for the non-protected subpopulation. In this respect, if exceeding the threshold corresponds to a favorable outcome for a binary classification model, then the example of FIG. 8B reflects a scenario where the input variable (or variable group) has a bias contribution that favors the protected subpopulation for all values of the threshold that may be applied to the explainer value.

Figures 8C, 8D:
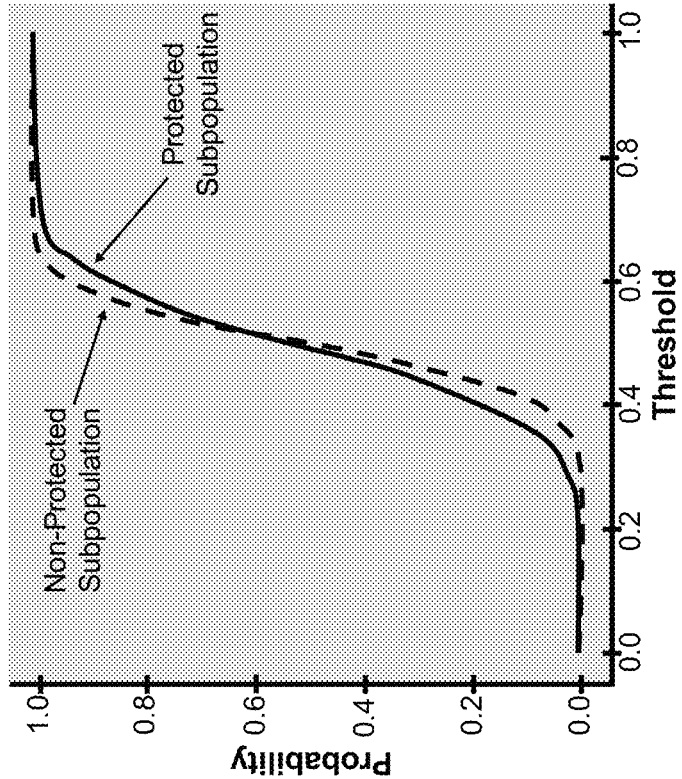
FIG. 8C is a two-dimensional graph that illustrates examples empirical CDFs that may be produced for empirical distributions of explainer values for a third example input variable (or variable group) in accordance with the present disclosure.
FIG. 8D is a two-dimensional graph that illustrates examples empirical CDFs that may be produced for empirical distributions of explainer values for a fourth example input variable (or variable group) in accordance with the present disclosure.

FIG. 8C shows that, for the third example input variable (or variable group), the first CDF for the protected subpopulation falls below the second CDF for the non-protected subpopulation for a first range of threshold values (e.g., from 0.0 to around 0.38) and then falls above the second CDF for the non-protected subpopulation for a second range of threshold values (e.g., from around 0.38 to 1.0). This means that (i) within the first range of threshold values, the third example input variable's (or variable group's) explainer value is more likely to exceed the threshold for the protected subpopulation than it is for the non-protected subpopulation (because the probability that the explainer value for the protected subpopulation will not exceed the threshold is lower than the probability that the explainer value for the non-protected subpopulation will not exceed the threshold) and (ii) within the second range of threshold values, the third example input variable's (or variable group's) explainer value is more likely to exceed the threshold for the non-protected subpopulation than it is for the protected subpopulation (because the probability that the explainer value for the protected subpopulation will not exceed the threshold is higher than the probability that the explainer value for the non-protected subpopulation will not exceed the threshold). In this respect, if exceeding the threshold corresponds to a favorable outcome for a binary classification model, then the example of FIG. 8C reflects a scenario where the input variable (or variable group) has a bias contribution that favors the protected subpopulation for any threshold within the first range of threshold values and favors the non-protected subpopulation for any threshold within the second range of threshold values.

Lastly, FIG. 8D shows that, for the fourth example input variable (or variable group), the first CDF for the protected subpopulation falls above the second CDF for the non-protected subpopulation for a first range of threshold values (e.g., from 0.0 to around 0.51) and then falls below the second CDF for the non-protected subpopulation for a second range of threshold values (e.g., from around 0.51 to 1.0). This means that (i) within the first range of threshold values, the fourth example input variable's (or variable group's) explainer value is more likely to exceed the threshold for the non-protected subpopulation than it is for the protected subpopulation (because the probability that the explainer value for the protected subpopulation will not exceed the threshold is higher than the probability that the explainer value for the non-protected subpopulation will not exceed the threshold) and (ii) within the second range of threshold values, the fourth example input variable's (or variable group's) explainer value is more likely to exceed the threshold for the protected subpopulation than it is for the non-protected subpopulation (because the probability that the explainer value for the protected subpopulation will not exceed the threshold is lower than the probability that the explainer value for the non-protected subpopulation will not exceed the threshold). In this respect, if exceeding the threshold corresponds to a favorable outcome for a binary classification model, then the example of FIG. 8D reflects a scenario where the input variable (or variable group) has a bias contribution that favors the non-protected subpopulation for any threshold within the first range of threshold values and favors the protected subpopulation for any threshold within the second range of threshold values.

The empirical CDFs that may be produced for the first and second empirical distributions of an input variable's (or variable group's) respective sets of explainer values for the protected and non-protected subpopulations may take various other forms as well.

After producing the first and second empirical CDFs for the first and second empirical distributions of an input variable's (or variable group's) respective sets of explainer values for the protected and non-protected subpopulations, the computing platform may then determine a total Wasserstein-1 distance between the first and second empirical distributions of the input variable's (or variable group's) respective sets of explainer values for the protected and non-protected subpopulations by computing the integrated absolute difference between the first and second empirical CDFs across the entire range of threshold values. In this respect, the total Wasserstein-1 distance that is determined may serve as one possible way to quantify a total bias contribution of the input variable (or variable group).

Additionally or alternatively, in a scenario such as the ones illustrated in FIGS. 7C-7D where an input variable (or variable group) has a bias contribution that favors the protected subpopulation for some threshold values and favors the non-protected subpopulation for other threshold values, the computing platform may split the total Wasserstein-1 distance between the first and second empirical distributions of the input variable's (or variable group's) respective sets of explainer values for the protected and non-protected subpopulations into two parts: (i) a first distance component that is determined by computing the integrated absolute difference between the first and second empirical CDFs within any range of threshold values where the first CDF for the protected subpopulation falls below the second CDF for the non-protected subpopulation (which reflects a bias contribution that favors the protected subpopulation for such threshold values) and (ii) a second distance component that is determined by computing the integrated absolute difference between the first and second empirical CDFs within any range of threshold values where the first CDF for the protected subpopulation falls above the second CDF for the non-protected subpopulation (which reflects a bias contribution that favors the non-protected subpopulation for such threshold values). In this respect, the first distance component serves to quantify the portion of the input variable's (or variable group's) total bias contribution that contributes to increasing the bias favoring the protected subpopulation and/or decreasing the bias favoring the non-protected subpopulation, which may be referred to herein as the "negative" component of the input variable's (or variable group's) bias contribution for the protected and non-protected subpopulations, while the second distance component serves to quantify the portion of the input variable's (or variable group's) total bias contribution that contributes to increasing the bias favoring the non-protected subpopulation and/or decreasing the bias favoring the protected subpopulation, which may be referred to herein as the "positive" component of the input variable's (or variable group's) bias contribution for the protected and non-protected subpopulations. It will also be understood that the sum of these negative and positive components will equate to the input variable's (or variable group's) total bias contribution that was discussed above.

Figure 8E:
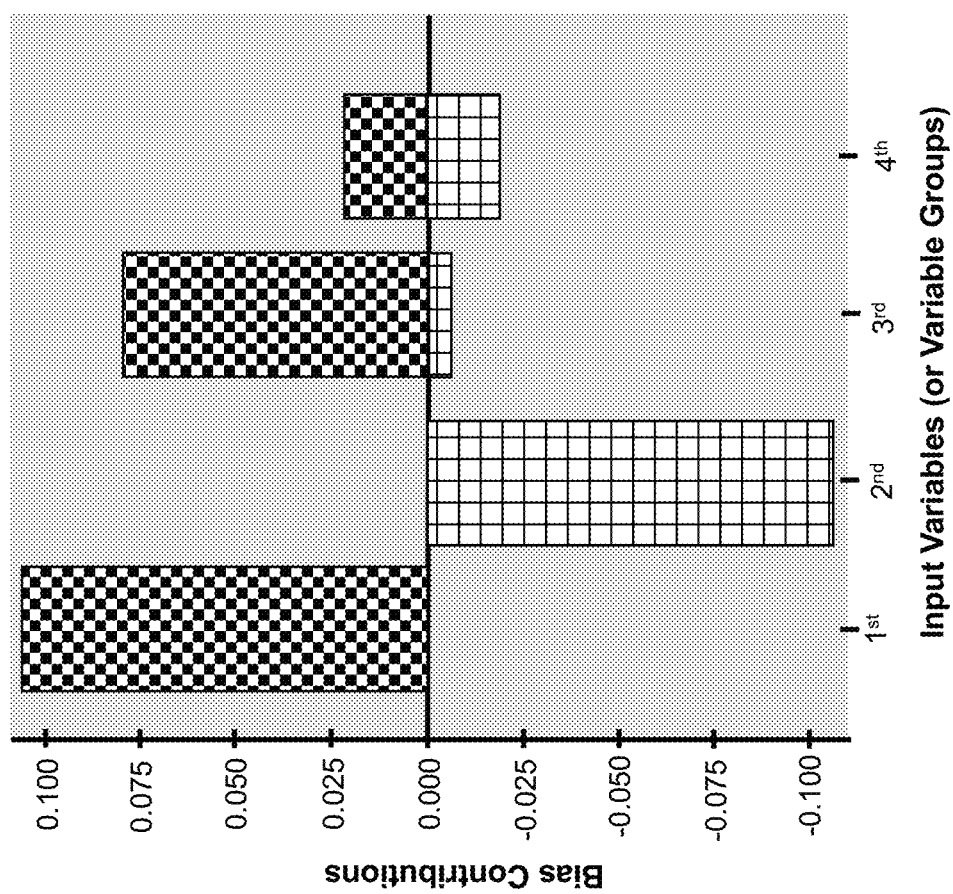
FIG. 8E is a bar graph showing positive and negative bias contribution that may be determined for the four example input variables (or variable groups) discussed with reference to FIGS. 8A-8D.

To illustrate with an example, FIG. 8E is a bar graph showing positive and negative bias contribution that may be determined for the four example input variables (or variable groups) discussed above with reference to FIGS. 8A-8D. As shown in FIG. 8E, the first example input variable of FIG. 7A has a large positive bias contribution and no measurable negative bias contribution, the second example input variable of FIG. 8B has a large negative bias contribution and no measurable positive bias contribution, the third example input variable of FIG. 8C has a larger positive bias contribution and a smaller negative bias contribution, and the fourth example input variable of FIG. 8D has a positive bias contribution and a negative bias contribution that have a similar magnitude.

Additionally yet, in a scenario where the computing platform determines the negative and positive components of an input variable's (or variable group's) bias contribution for the protected and non-protected subpopulations, the computing platform may also optionally determine a "net" bias contribution of the input variable (or variable group) by subtracting the negative component of the bias contribution from the positive component of the bias contribution. In this respect, a net bias contribution having a positive value indicates that the component of the bias contribution favoring the non-protected subpopulation outweighs the component of the bias contribution favoring the protected subpopulation, whereas a net bias having a negative value indicates that the component of the bias contribution favoring the protected subpopulation outweighs the component of the bias contribution favoring the non-protected subpopulation.

The function of determining a Wasserstein distance between the empirical distributions of an input variable's (or variable group's) respective sets of explainer values for the protected and non-protected subpopulations may take other forms as well, including but not limited to the possibility that the computing platform may determine a Wasserstein distance other than Wasserstein-1 distance. For instance, the computing platform may determine a Wasserstein-q distance that is represented by the formula set forth above in Equation 1.

As another possibility, instead determining a Wasserstein distance between empirical distributions, the computing platform may determine some other metric that serves as a measure of the difference between the empirical distributions of an input variable's (or variable group's) respective sets of explainer values for the protected and non-protected subpopulations, which may then be used to quantify the bias contribution of the input variable (or variable group) for the protected and non-protected subpopulations. For example, the computing platform may determine some other IPM that serves as a measure of the difference between the empirical distributions of an input variable's (or variable group's) respective sets of explainer values for the protected and non-protected subpopulations, one example of which may take the form of a Dudley metric. As another example, the computing platform may determine a Kolmogorov-Smirnov distance between the empirical distributions of an input variable's (or variable group's) respective sets of explainer values for the protected and non-protected subpopulations. As yet another example, the computing platform may use an (f,γ)-divergence to determine the difference between the empirical distributions of an input variable's (or variable group's) respective sets of explainer values for the protected and non-protected subpopulations. The computing platform may determine a difference between empirical distributions of an input variable's (or variable group's) respective sets of explainer values for protected and non-protected subpopulations in some other manner as well.

The function of quantifying a bias contribution of an input variable (or variable group) for the protected and non-protected subpopulations may take other forms as well.

In line with the discussion above, the computing platform may carry out the foregoing functionality for each respective input variable (or variable group) in at least a subset of the initial model object's set of input variables in order to quantify each such input variable's (or variable group's) respective bias contribution, where the quantification of such input variable's (or variable group's) bias contribution indicates the extent to which the input variable (or variable group) contributes to the bias exhibited by the initial model object for the protected and non-protected subpopulations in the given subpopulation pair. After generating this bias contribution information, the computing platform may then be able to compare and evaluate the respective contributions of the input variables (or variable groups) in at least the subset of the initial model object's set of input variables to the bias exhibited by the initial model object for the given subpopulation pair comprising the protected and non-protected subpopulations.

While the foregoing outlines functionality for quantifying the respective contributions of the input variables (or variable groups) to the bias exhibited by the initial model object for one given subpopulation pair comprising a single protected subpopulation and a single non-protected subpopulation, as noted above, it is possible that the selected subpopulations for which to carry out the bias mitigation may take the form of two or more different protected subpopulations and one common non-protected subpopulation that are each defined based on a given combination of multiple attributes. As one possible example to illustrate, the two or more different protected subpopulations could comprise a first protected subpopulation of individuals that are both females and part of the White race, a second protected subpopulation of individuals that are both females and part of the African American race, a third protected subpopulation of individuals that are both males and part of the African American race, and so on, while the one common non-protected subpopulation could comprise individuals that are both males and part of the White race. In this respect, the two or more different protected subpopulations and one common non-protected subpopulation that are defined based on the multi-attribute combination may be thought of as two or more different subpopulation pairs, each of which comprises a respective one of the two or more different protected subpopulations and the one common non-protected subpopulation.

In such a scenario, the computing platform may be configured to carry out the foregoing functionality for each of these different subpopulation pairs defined based on the multi-attribute combination in order to quantify the contributions of the initial model object's input variables (or variable groups) to the bias exhibited by the initial model object for each of the two or more different protected subpopulations as compared to the one common non-protected subpopulation. This functionality may result in a first set of bias contributions of the initial model object's input variables (or variable groups) being determined for the first subpopulation pair comprising the first protected subpopulation as compared to the one common non-protected subpopulation, a second set of bias contributions of the initial model object's input variables (or variable groups) being determined for the second subpopulation pair comprising the second protected subpopulation as compared to the one common non-protected subpopulation, and so on.

In turn, the computing platform may aggregate the bias contributions of the initial model object's input variables (or variable groups) across these different subpopulation pairs and thereby determine an aggregated bias contribution of each of the initial model object's input variables (or variable groups). In such an implementation, the function of aggregating the bias contributions of the initial model object's input variables (or variable groups) across these different subpopulation pairs defined based on the multi-attribute combination may take various forms, and in at least some examples, may involve (i) assigning different weights to the respective bias contribution information for the different subpopulation pairs, and then (ii) for each input variable (or variable group) in at least the subset of the initial model object's set of input variables, determining a weighted average of the input variable's (or variable group's) bias contributions across the different protected subpopulations. Further, in such an implementation, the weight that is assigned to the respective bias contribution information for the different subpopulation pairs defined based on the multi-attribute combination may be dictated by any of various factors, examples of which may include the respective level of bias that is exhibited by the initial model object for each of the different subpopulation pairs (e.g., higher weights for subpopulation pairs associated with relatively higher bias and lower weights for subpopulation pairs associated with relatively lower bias) and/or the nature of the respective protected subpopulation that is included in each of the different subpopulation pairs (e.g., higher weights for certain protected subpopulations that present a greater concern for bias than others), among other possible factors.

Further details regarding these and other techniques for quantifying and evaluating the bias contributions of a model object's input variables can be found in (i) the paper entitled "Model-agnostic bias mitigation methods with regressor distribution control for Wasserstein-based fairness metrics" by Miroshnikov et al. that has a submission date of Nov. 19, 2021, and (ii) the journal article entitled "Wasserstein-based fairness interpretability framework for machine learning models" by Miroshnikov et al. that was published in the "Machine Learning" journal (2022), Springer, on Jul. 21, 2022, each of which is incorporated herein by reference in its entirety.

Other approaches for quantifying and evaluating the respective bias contributions of the input variables (or variable groups) in at least the subset of the initial model object's set of input variables are possible as well.

At block 508, after quantifying the respective bias contribution of each input variable (or variable group) in at least the subset of the initial model object's set of input variables, the computing platform may then evaluate the respective bias contributions of the input variables (or variable groups) in order to identify a subset of input variables for which bias mitigation is to be applied (e.g., the input variables that are the most significant contributors to the bias exhibited by the initial model object for the selected subpopulations), which as noted above may be referred to herein as the "biased" input variables for the initial model object. This function may take various forms, which may depend at least in part on the value(s) utilized to quantify the bias contributions.

As one possible implementation, if the bias contribution of each input variable (or variable group) is quantified in terms of a total bias contribution value (e.g., a total Wasserstein-1 distance between the empirical distributions of respective sets of explainer values for the protected and non-protected subpopulations), the computing platform may identify the subset of biased input variables for the initial model object by evaluating the total bias contribution values of the initial model object's input variables (or variable groups) using a threshold-based approach, a ranking-based approach, or a hybrid thereof, among other possibilities.

For example, under a threshold-based approach, the computing platform may compare each input variable's (or variable group's) total bias contribution value to a threshold and then identify any input variable having a total bias contribution value that meets the threshold (or any input variable within a variable group having a total bias contribution value that meets the threshold) as a biased input variable. As another example, under a ranking-based approach, the computing platform may rank the initial model object's input variables (or variable groups) based on their total bias contribution values and then identify some predefined number of input variables at the top of the ranking as biased input variables, such as the top 5 input variables (or the input variables within the top 3 variable groups), among various other possible cutoffs. As yet another example, under a hybrid approach, the computing platform may start by preliminarily identifying any input variable having a total bias contribution value that meets a threshold (or any input variable within a variable group having a total bias contribution value that meets the threshold), and if there is less than a threshold number of input variables that are preliminarily identified, the computing platform may then identify each such input variable as a biased input variable, whereas if there is more than a threshold number of input variables that are preliminarily identified, the computing platform may then rank the input variables that are preliminarily identified based on their total bias contribution values and then identify some predefined number of input variables at the top of the ranking as the biased input variables. The function of identifying the subset of biased input variables based on the total bias contribution values of the initial model object's input variables (or variable groups) may take other forms as well.

In line with the discussion above regarding evaluation of the bias exhibited by the initial model object, this implementation may be best suited for scenarios where each input variable's (or variable group's) total bias contribution is expected to be composed primarily of one particular component that favors one particular subpopulation (e.g., positive bias contribution that favors the non-protected subpopulation), such that it is not necessary to separately evaluate the positive and negative components of the bias.

As another possible implementation, if the bias contribution of each input variable (or variable group) is quantified in terms of negative and positive contribution bias values (e.g., a total Wasserstein-1 distance between the empirical distributions of respective sets of explainer values for the protected and non-protected subpopulations that has been split into separate distance components), the computing platform may identify the subset of biased input variables for the initial model object by evaluating the positive and/or negative bias contribution values of the initial model object's input variables (or variable groups) using a threshold-based approach, a ranking-based approach, or a hybrid thereof, among other possibilities.

For example, under a threshold-based approach, the computing platform may compare each input variable's (or variable group's) positive bias contribution value, negative bias contribution value, or both a threshold and then identify any input variable having a positive bias contribution value, a negative bias contribution value, or both that meets the threshold (or any input variable within a variable group having a positive bias contribution value, negative bias contribution value, or both that meets the threshold) as a biased input variable. As another example, under a ranking-based approach, the computing platform may rank the initial model object's input variables (or variable groups) based on their positive bias contribution values, negative bias contribution values, or both and then identify some predefined number of input variables at the top of each such ranking as biased input variables, such as the top 5 input variables (or the input variables within the top 3 variable groups), among various other possible cutoffs. As yet another example, under a hybrid approach, the computing platform may start by preliminarily identifying any input variable having a positive bias contribution value, negative bias contribution value, or both that meets a threshold (or any input variable within a variable group having a positive bias contribution value, negative bias contribution value, or both that meets the threshold), and if there is less than a threshold number of input variables that are preliminarily identified, the computing platform may then identify each such input variable as a biased input variable, whereas if there is more than a threshold number of input variables that are preliminarily identified, the computing platform may then rank the input variables that are preliminarily identified based on their positive bias contribution values, negative bias contribution values, or both and then identify some predefined number of input variables at the top of each such ranking as the biased input variables. The function of identifying the subset of biased input variables based on the positive and/or negative bias contribution values of the initial model object's input variables (or variable groups) may take other forms as well.

In line with the discussion above regarding evaluation of the bias exhibited by the initial model object, this implementation may be better suited for scenarios where the total bias contribution of at least some input variables (or variable groups) may comprise an unknown mix of positive and negative components, such that it may be desirable to separate out the positive component of each input variable's (or variable group's) bias contribution from the negative component of its bias contribution when identifying which input variables to include in the subset of biased input variables. In this respect, depending on the use case, the computing platform could be configured to identify the subset of biased input variables based exclusively on positive bias contribution, based exclusively on negative contribution, or based on both positive bias contribution and negative bias contribution.

As yet another possible implementation, if the bias exhibited by the initial model object for the protected and non-protected subpopulations is represented in terms of a net bias contribution value (e.g., a differential between a distance component corresponding to a positive bias contribution value and a distance component corresponding to a negative bias contribution value), the computing platform may identify the subset of biased input variables for the initial model object by evaluating the net bias contribution values of the initial model object's input variables (or variable groups) using a threshold-based approach, a ranking-based approach, or a hybrid thereof, among other possibilities.

For example, under a threshold-based approach, the computing platform may compare each input variable's (or variable group's) net bias contribution value to at least one threshold (e.g., a positive threshold, a negative threshold, or both) and then identify any input variable having a net bias contribution value that meets the at least one threshold (or any input variable within a variable group having a net bias contribution value that meets the at least one threshold) as a biased input variable. As another example, under a ranking-based approach, the computing platform may rank the initial model object's input variables (or variable groups) based on their net bias contribution values and then identify some predefined number of input variables at the top and/or bottom of the ranking as biased input variables, such as the top and/or bottom 5 input variables (or the input variables within the top and/or bottom 3 variable groups), among various other possible cutoffs. As yet another example, under a hybrid approach, the computing platform may start by preliminarily identifying any input variable having a net bias contribution value that meets at least one threshold (or any input variable within a variable group having a net bias contribution value that meets the at least one threshold), and if there is less than a threshold number of input variables that are preliminarily identified, the computing platform may then identify each such input variable as a biased input variable, whereas if there is more than a threshold number of input variables that are preliminarily identified, the computing platform may then rank the input variables that are preliminarily identified based on their net bias contribution values and then identify some predefined number of input variables at the top and/or bottom of the ranking as the biased input variables. The function of identifying the subset of biased input variables based on the net bias contribution values of the initial model object's input variables (or variable groups) may take other forms as well.

In line with the discussion above regarding evaluation of the bias exhibited by the initial model object, this implementation may also be better suited for scenarios where the total bias contribution of at least some input variables (or variable groups) may comprise an unknown mix of positive and negative components, such that it may be desirable to separate out the positive component of each input variable's (or variable group's) bias contribution from the negative component of its bias contribution when identifying which input variables to include in the subset of biased input variables. In this respect, depending on the use case, the computing platform could be configured to identify the subset of biased input variables based exclusively on positive net bias contribution, based exclusively on negative net bias contribution, or based on both positive net bias contribution and negative net bias contribution.

The function of identifying the subset of biased input variables for the initial model object may take various other forms as well.

At block 510, after identifying the subset of biased input variables for the initial model object, the computing platform may produce a "post-processed" model object, which may generally comprise a transformed version of the initial model object that is intended to mitigate the bias contributed by the biased input variables. In order to produce this post-processed model object, the computing platform may begin by replacing each biased input variable in the identified subset with a respective transformation of the biased input variable that has one or more unknown parameters. In general, each respective transformation that is used in place of a biased input variable could take any of various forms.

For instance, one possible category of transformations available for use in place of a biased input variable may take the form of "compressive" or "expansive" transformations that serve to compress or expand the input variable relative to a particular reference value (e.g., an expected or median value). In practice, this category of compressive or expansive transformations could be represented as a map $t \rightarrow T(t; t_*)$ such that $T(t_*; t_*) = t_*$, where (i) the map is "compressive" if it is strictly increasing and it moves any point t closer to $t_*$, that is, if $|T(t; t_*) - t_*| < |t - t_*|$ for all $t \neq t_*$ and (ii) the map is "expansive" if it is strictly increasing and it moves any point $t \neq t_*$ further away from $t_*$, that is, if $|T(t; t_*) - t_*| > |t - t_*|$ for all $t \neq t_*$.

In this category of compressive or expansive transformations, each transformation may be classified as either (i) "linear," in the sense that the transformation compresses or expands the input variable relative to a reference value in a linear manner, or (ii) "non-linear," in the sense that the transformation compresses or expands the input variable relative to a reference value in a linear manner (e.g., a transformation that behaves in a linear manner near the reference point but behaves as identity away from the reference point). Additionally, in this category of compressive or expansive transformations, each transformation may be classified as either (i) "symmetric," in the sense that the transformation compresses or expands the input variable in the same manner across all of the input variable's possible values, or (ii) "asymmetric," in the sense that the transformation compresses or expands the input variable in a different manner within different ranges of the input variable's possible values that correspond to the positive and negative bias contributions of the input variable (e.g., by compressing in one range and expanding in another range, by compressing in different ways within different ranges, and/or by expanding in different ways within different ranges).

Based on these classifications, the category of compressive or expansive transformations could include transformations of up to 4 different types: (1) a first type of transformation that compresses or expands an input variable in a linear and symmetric manner, which tends to be the least complex type of transformation within this category and typically requires the lowest number of unknown parameters (e.g., 1-2 unknown parameters), (2) a second type of transformation that compresses or expands an input variable in a linear and asymmetric manner (which may also be referred to as "piecewise linear"), which tends to be the more complex and typically requires more parameters than the first type of transformation (e.g., 2-3 unknown parameters) but allows for different ranges of the input variable's values to be compressed or expanded in a different manner, (3) a third type of transformation that compresses or expands an input variable in a non-linear and symmetric manner, which tends to be the even more complex and typically requires even more parameters than the second type of transformation but provides an even more granular and flexible approach for transforming the input variable in multiple different manners within multiple different ranges of the input variable's values, and (4) a fourth type of transformation that compresses or expands an input variable in a non-linear and asymmetric manner, which tends to be the most complex type of transformation within this category and typically requires the highest number of unknown parameters but provides the most granular and flexible approach for transforming the input variable in multiple different manners within multiple different ranges of the input variable's values. However, it should be understood that this category of compressive or expansive transformations may include transformations that are distinguished based on other factors and/or take various other forms as well.

A first possible example of a compressive transformation C(X) that compresses an input variable towards a reference point in a linear and symmetric manner may have the following form:

$$C(t; a, t_*) = \frac{t - t_*}{a} + t_*, \quad \text{(Eq. 2)}$$

where $t \in \mathbb{R}$ is a scalar that represents the input variable being transformed, $t_*$ represents the example transformation's reference point (e.g., the median value of t), and a represents the transformation's unknown parameter.

A second possible example of a compressive transformation C(X) that compresses an input variable towards a reference point in a linear and asymmetric manner may have the following form:

$$C(t; a_+, a_-, t_*) = \frac{(t - t_*)_-}{a_-} + \frac{(t - t_*)_+}{a_+} + t_*, \quad \text{(Eq. 3)}$$

where $t \in \mathbb{R}$ is a scalar that represents the input variable being transformed, $t_*$ represents the example transformation's reference point (e.g., the median value of t), and $a_-$ and $a_+$ represent the example transformation's unknown parameters.

A third possible example of a compressive transformation C(X) that compresses an input variable towards a reference point in a non-linear and symmetric manner may have the following form:

$$C(t; t_*, a, \sigma) = t - (t - t_*)(1 - a^{-1})\exp\left\{-\frac{(t - t_*)^2}{2\sigma^2}\right\}, \quad \text{(Eq. 4)}$$

where $t \in \mathbb{R}$ is a scalar that represents the input variable being transformed, $t_*$ represents the transformation's reference point, a and $\sigma$ represent the example transformation's unknown parameters, $$|t - t_*| \leq \sigma \Rightarrow C(t) \approx \frac{t - t_*}{a}, \text{ and } |t - t_*| \gg \sigma \Rightarrow C(t) \approx t.$$

Many other examples of compressive or expansive transformations are possible as well.

In accordance with the present disclosure, the computing platform may also be configured to replace a biased input variable with any other suitable type of transformation.

Further, depending on the implementation, the function of replacing each biased input variable in the identified subset with a respective transformation of the biased input variable that has one or more unknown parameters may take any of various forms.

For instance, in one implementation, the computing platform may be configured to replace each biased input variable in the identified subset with one common type of transformation. As one example of such an implementation, the computing platform may be configured to replace each biased input variable in the identified subset with a compressive transformation having the same form, such as a linear and symmetric transformation having the form of Equation 1, a linear and asymmetric transformation having the form of Equation 2, or a non-linear and symmetric transformation having the form of Equation 3. In this respect, the one common type of transformation that is utilized in place of each biased input variable either could be predefined or could be selected in an ad-hoc manner by the computing platform based on factors such as the particular type of the data science model being created, the bias exhibited by the initial model object, and/or the bias contributions of the biased input variables, among other possible factors.

In another implementation, the computing platform may be configured to evaluate which type of transformation to utilize for a biased input variable on a variable-by-variable basis and then replace each biased input variable in the identified subset with a respective transformation of the type that has been selected for that particular biased input variable. For instance, for each of the biased input variables in the identified subset, the computing platform may be configured to (i) evaluate the biased input variable's bias contribution information (e.g., total, positive, negative, and/or net bias contribution values associated with the input variable), perhaps among other information, and then (ii) based on that evaluation, select a respective type of transformation to be utilized in place of the input variable for the post-processed model object.

In this way, the computing platform has the flexibility to intelligently select whichever type of transformation appears to be best suited for an input variable based on its particular bias contribution profile, which may be advantageous in scenarios where the input variables of the initial model object may have a unknown mix of different bias contribution profiles (e.g., some variables with a bias contribution that is more positive than negative, other variables with a bias contribution that is more negative than positive, and still other variables with a comparable amount of positive and negative bias contribution). Indeed, in such scenarios, selecting the transformations to utilize in place of the biased input variables on a variable-by-variable basis based on the particular bias contribution profiles of the biased input variables may further reduce the bias exhibited by the post-processed model object. However, when selecting the transformations, the computing platform may also be configured to constrain the overall number of unknown parameters that are included within the post-processed model object, because as the dimensionality of the unknown parameters included within the post-processed model object increases, the amount of time and/or compute resources needed to produce the different versions of the post-processed model object at block 512 likewise increases. Thus, when selecting the transformations, the computing platform may be configured to balance between the advantages of using more complex transformations having multiple unknown parameters and the desire to constrain the dimensionality of the unknown parameters included within the post-processed model object to a level that still allows the different versions of the post-processed model object to be produced within an acceptable amount of time.

As one possible example of this implementation, the computing platform may be configured to utilize (i) a first type of transformation for any the input variable that primarily contributes to positive bias, which may be referred to as a "positively-biased input variable," (ii) a second type of transformation if the input variable primarily contributes to negative bias, which may be referred to as a "negatively-biased input variable," and (iii) a third type of transformation if the input variable contributes to both positive and negative bias, which may be referred to as a "mixed-bias input variable." In this respect, the particular types of transformations utilized for the first, second, and third types of transformations may vary depending on the bias profile of the initial model object.

For instance, if the bias exhibited by the initial model object is comprised of a positive component that is significant and a negative component that is insignificant, which may be referred to as a "positively-biased" model object, then the computing platform may be configured to utilize (i) a first type of transformation for each positively-biased input variable that functions to compress the positively-biased input variable in a linear and symmetric way, which serves to reduce the initial model object's positive bias, (ii) a second type of transformation for each negatively-biased input variable that functions to expand negatively-biased input variable in a linear and symmetric way, which serves to increase the initial model object's negative bias and thereby offset its positive bias, and (iii) a third type of transformation for each mixed-bias input variable that functions to asymmetrically compress the input variable in a linear way within one range of values corresponding to the input variable's positive bias contribution and expand the input variable in a linear way within another range of values corresponding to the input variable's negative bias contribution, which serves to both reduce the initial model object's positive bias and also increase the initial model object's negative bias so as to further offset its positive bias. In this respect, expanding the input variables having a negative bias contribution in the manner described above may achieve bias reduction in a way that better preserves the initial model object's performance than a bias reduction strategy that solely focuses on compressing input variables having a positive bias contribution.

On the other hand, if the bias exhibited by the initial model object is comprised of a negative component that is significant and a positive component that is insignificant, which may be referred to as a "negatively-biased" model object, then the computing platform may be configured to utilize (i) a first type of transformation for each negatively-biased input variable that functions to compress the negatively-biased input variable in a linear and symmetric way, which serves to reduce the initial model object's negative bias, (ii) a second type of transformation for each positively-biased input variable that functions to expand positively-biased input variable in a linear and symmetric way, which serves to increase the initial model object's positive bias and thereby offset its negative bias, and (iii) a third type of transformation for each mixed-bias input variable that functions to asymmetrically compress the input variable in a linear way within one range of values corresponding to the input variable's negative bias contribution and expand the input variable in a linear way within another range of values corresponding to the input variable's positive bias contribution, which serves to both reduce the initial model object's negative bias and also increase the initial model object's positive bias so as to further offset its negative bias. However, it should also be understood that in a scenario such as this where the initial model object is determined to be a negatively-biased model object having a negative bias component that is significant and a positive bias component that is insignificant—which means that the initial model object favors the protected subpopulation over the non-protected subpopulation—the computing platform may alternatively determine that no bias mitigation is necessary and forgo the bias mitigation at block 206.

This implementation of evaluating which type of transformation to utilize for a biased input variable on a variable-by-variable basis and then replacing each biased input variable in the identified subset with a respective transformation of the type that has been selected for that particular biased input variable may take various other forms as well.

In yet another implementation, the computing platform may be configured to replace a particular input variable with multiple different types of transformations, in which case multiple different post-processed model objects would be produced at this point in the process and the computing platform may then utilize each of these multiple different post-processed model objects when carrying out the functions of blocks 512-514.

The function of replacing each biased input variable in the identified subset with a respective transformation of the biased input variable that has one or more unknown parameters may take various other forms as well.

Further, in alternate embodiments, the computing platform may be configured to handle different biased input variables in different ways when producing the post-processed model object. For example, in some alternate embodiments, the function of producing the post-processed model may be preceded by the computing platform evaluating and separating out the identified subset of biased input variables into (i) a first grouping of biased input variables that generally behave in a numerical manner (ii) a second grouping of biased input variables that generally behave in a categorical manner, which for purposes of this embodiment may include both (a) biased input variables that are technically categorical in nature and also (b) biased input variables that are technically numerical in nature but can only have a limited set of discrete numeric values such that they behave like categorical variables. In turn, the computing platform's function of producing the post-processed model may involve replacing each bias input variable in the first grouping of "numerical" biased input variables with a respective transformation of the biased input variable in the manner described above. On the other hand, the computing platform may be configured so as not to replace the biased input variables in the second grouping of "categorical" biased input variables with respective transformations in the manner described above, because replacing "categorical" input variables with the types of transformations described above may not be as effective at mitigating model bias while also preserving model performance (or in some cases may not even be possible). Instead, the computing platform's function of producing the post-processed model may involve handling the biased input variables in the second grouping of "categorical" biased input variables in a different way that is better suited for input variables that behave in a categorical way.

For instance, according to one implementation, the computing platform's function of producing the post-processed model could involve incorporating a respective "compensation" function for each respective biased input variable in the second grouping of "categorical" biased input variables into the post-processed model object (or sometimes referred to as a "penalization" function) that serves to compensate for (i.e., offset) the bias being contributed by the biased input variable. In one example, the respective compensation function for each respective biased input variable $x_i$ for $i \in K$ in the second grouping of "categorical" input variables may comprise a symmetrical compensation function that can be represented as follows:

$$(1-\alpha_i)w_i(x_i) \qquad \text{(Eq. 5)}$$

where $w_i(x_i)$ represents a respective weighting function for a respective biased input variable $x_i$ and $\alpha_i$ represents a respective tuning parameter for a respective biased input variable $x_i$. And in such an example, the post-processed model object that is produced by this functionality may then be represented as follows:

$$\tilde{f}(x; \alpha_K) = f(x) - \Sigma_{i \in K}(1-\alpha_i)w_i(x_i) \qquad \text{(Eq. 6)}$$

where f(x) represents the transformed model object that is produced from replacing the initial model object's biased input variables in the first grouping of "numerical" input variables with respective transformations and $(1-\alpha_i)w_i(x_i)$ represents the respective compensation function for each respective biased input variable $x_i$ for $i \in K$ in the second grouping of "categorical" input variables. Thus, as shown in Equation 6, the respective compensation functions for the respective biased input variables $x_i$ for $i \in K$ in the second grouping of "categorical" input variables are incorporated into the post-processed model object by virtue if summing the compensation functions together and then subtracting that sum from the transformed model object f(x).

In another example, the respective compensation function for each respective biased input variable $x_i$ for $i \in K$ in the second grouping of "categorical" input variables may comprise any asymmetrical compensation function that can be represented as follows:

$$(1-\alpha_i^-)w_i(x_i) \cdot 1_{\{w_i(x_i)<w^*\}} + (1-\alpha_i^+)w_i(x_i) \cdot 1_{\{w_i(x_i)>w^*\}} \qquad \text{(Eq. 7)}$$

where $w_i(x_i)$ represents a respective weighting function for a respective biased input variable $x_i$, $\alpha_i$ represents a respective tuning parameter for a respective biased input variable $x_i$, and w* can be set as either the median, mode, or expected value of $w_i(X_i)$, $i \in K$. And in such an example, the post-processed model object that is produced by this functionality may then be represented as follows:

$$\tilde{f}(x; \alpha_K) = f(x) - \Sigma_{i \in K}(1-\alpha_i^-)w_i(x_i) \cdot 1_{\{w_i(x_i)<w^*\}} - \Sigma_{i \in K}(1-\alpha_i^+)w_i(x_i) \cdot 1_{\{w_i(x_i)>w^*\}} \qquad \text{(Eq. 8)}$$

where f(x) represents the transformed model object that is produced from replacing the initial model object's biased input variables in the first grouping of "numerical" input variables with respective transformations and $(1-\alpha_i^-)w_i(x_i) \cdot 1_{\{w_i(x_i)<w^*\}} + 1_{\{w_i(x_i)>w^*\}}$ represents the respective compensation function for each respective biased input variable $x_i$ for $i \in K$ in the second grouping of "categorical" input variables. Thus, as shown in Equation 8, the respective compensation functions for the respective biased input variables $x_i$ for $i \in K$ in the second grouping of "categorical" input variables are incorporated into the post-processed model object by virtue if summing the compensation functions together in two parts and then subtracting those two sums from the transformed model object f(x).

In the foregoing examples, the weighting function $w_i(x_i)$ for a respective biased input variable $x_i$ may generally comprise any function that provides a quantification of the respective biased input variable's bias contribution to the post-processed model object's output. For instance, as one possibility, the respective weighting function $w_i(x_i)$ for a respective biased input variable $x_i$ may take the form of an explainability function that outputs an explainer value for the biased input variable $x_i$. Such a function may take various forms, examples of which may include (i) an explainability function for determining a PDP value for the biased input variable $x_i$ (e.g., a partial dependence function having a form of $\mathbb{E}[f(x_i, X_{-i})]$) or (ii) an explanability function for determining a shifted Shapley value for the biased input variable $x_i$ (e.g., a shifted Shapley value of a marginal game having a form of $v^{ME}(\bullet, x; X, f)$), among other possibilities. The weighting function $w_i(x_i)$ for a respective biased input variable $x_i$ may take other forms as well.

Further, in the foregoing examples, the tuning parameter $\alpha_i$ for a respective biased input variable $x_i$ may be set to have any value.

Further yet, although not shown in Equations 5-8 above, it should be understood that other parameters may be included in the respective compensation functions for the respective biased input variables $x_i$ and/or the post-processed model object as well. For example, when the respective weighting function for each respective biased input variable $x_i$ takes certain forms, a positive or negative adjustment constant could be appended to the respective weighting function as well (e.g., an adjustment constant for producing a "centered" PDP value).

The compensation function that is incorporated into the post-processed model object for a given biased input variable in the second grouping of "categorical" biased input variables could take other forms as well.

In another implementation, the computing platform's function of producing the post-processed model could involve replacing each respective biased input variable in the second grouping of "categorical" biased input variables with a respective fixed value for the respective biased input variable, such as an expected, median, or mode value for the respective biased input variable.

In yet another implementation, the computing platform's function of producing the post-processed model could involve foregoing any compensation or transformation of the biased input variables in the second grouping of "categorical" biased input variables for the post-processed model object, although in such an implementation, the computing platform could still optionally incorporate compensation for the second grouping of "categorical" biased input variables into the updated model object for the data science model, as described further below.

Other alternate embodiments where the computing platform is configured to handle different biased input variables in different ways when producing the post-processed model object are possible as well.

As part of the function of producing the post-processed model object, the computing platform may also calibrate the post-processed model object in order to align the scale of the post-processed model object's output with the scale of the initial model object's output. In at least some implementations, this function of calibrating the post-processed model object may involve transforming the post-processed model object monotonically using a calibrating map that arises in the process of isotonic regression of either the initial model object or the model's response variable onto the post-processed model object. In this respect, the isotonic regression technique that is utilized to perform the calibration may take any of various forms, and may involve linear regression of the initial model object onto the post-processed model object based on a link function, logistic regression of the model's response variable onto the post-processed model object, or non-smooth isotonic regression, among other possibilities. The function of calibrating the post-processed model object may take other forms as well.

Further details regarding example techniques for producing a post-processed model object can be found in the paper entitled "Model-agnostic bias mitigation methods with regressor distribution control for Wasserstein-based fairness metrics" by Miroshnikov et al. that has a submission date of Nov. 19, 2021, which is incorporated herein by reference in its entirety.

At block 512, the computing platform may then produce various different versions of the post-processed model object, referred to herein as a "parameterized family" of the post-processed model object, by iterating through various different combinations of values for the unknown parameters included within the post-processed model object. This function of iterating through various different combinations of values for the unknown parameters included within the post-processed model object may take various forms.

In one implementation, the computing platform may be configured to use a Bayesian optimization technique (or sometimes referred to as "Bayesian search") to produce the parameterized family of the post-processed model object. At a high level, such a Bayesian optimization technique functions to evaluate the bias and the performance of the post-processed model object across various different combinations of values for the unknown parameters, each defining a different version of the post-processed model object, and thereby identifies the particular versions of the post-processed model object that form an efficient frontier (or sometimes referred to as the "Pareto frontier") of the tradeoff between the post-processed model object's bias and the post-processed model object's performance (e.g., the version of the post-processed model object having the lowest level of bias at each level of performance, or vice versa).

In practice, the bias and the performance of the different versions the post-processed model object to be evaluated by the Bayesian optimization technique may be quantified using a historical dataset (e.g., a subset of the training dataset and/or a test dataset) that comprises a first set of historical data records for individuals belonging to the protected subpopulation within the given subpopulation pair and a second set of historical data records for individuals belonging to the non-protected subpopulation within the given subpopulation pair. For instance, the computing platform may use this historical dataset to quantify the bias of each respective version of the post-processed model object to be evaluated by determining a difference (e.g., a Wasserstein distance) between (i) a first empirical distribution of the model scores output by the respective version of the post-processed model object for the first set of historical data records and (ii) a second empirical distribution of the model scores output by the respective version of the post-processed model object for the second set of historical data records. Further, the computing platform may use this historical dataset to quantify the performance of each respective version of the post-processed model object to be evaluated by applying a loss function to the model scores output by the respective version of the post-processed model object for the historical dataset and using a negative of the loss function's output as a performance value for the respective version of the post-processed model object. In this respect, the loss function that is applied to the model scores output by the respective version of the post-processed model object may take any of various forms, examples of which may include an exponential loss function or a cross-entropy loss function.

However, it should be understood that the bias and the performance of the different versions the post-processed model object to be evaluated by the Bayesian optimization technique may be quantified in various other manners as well—including but not limited the possibility that other metrics may be used to quantify the bias and/or the performance of the different versions the post-processed model object (e.g., a different type of metric for measuring the difference between empirical model-score distributions for bias, such as an Kolmogorov—Smirnov distance, and an invariant metric for performance, such as Area under the ROC Curve (AUC)).

FIG. 9A illustrates one simplified example of how a parameterized family of the post-processed model object may be produced using a Bayesian optimization technique in accordance with the present disclosure. In FIG. 9A, a two-dimensional graph is shown with an x-axis that represents bias (e.g., in terms of Wasserstein distance) and a y-axis that represents performance (e.g., in terms of -Loss), and each different version of the post-processed model object that is evaluated by the Bayesian optimization technique is shown as a point within the two-dimensional graph. Based on these different versions of the post-processed model object that are evaluated, the Bayesian optimization technique may identify an efficient frontier 902 comprising a subset of these versions of the post-processed model object, and this efficient frontier 902 of versions may then be used by the computing platform to produce the parameterized family of the post-processed model object.

Notably, using a Bayesian optimization technique to evaluate the bias and the performance of various different versions of the post-processed model object and thereby identify the particular versions of the post-processed model object that form the efficient frontier of bias-performance tradeoff may provide various advantages over other techniques for evaluating different versions of a model object. First, unlike other search techniques, a Bayesian optimization technique is generally capable of identifying a parameterized family of the post-processed model object that is "optimized" for bias-performance tradeoff, in the sense that the version of the post-processed model object having the lowest level of bias at each level of performance (or vice versa) is identified. Second, a Bayesian optimization technique is generally capable of identifying the parameterized family of the post-processed model object that is "optimized" for bias-performance tradeoff in a way that requires less historical data, less time, and less compute resources than other techniques that could theoretically be used to perform this task. Indeed, in practice, a Bayesian optimization technique can be carried out using a historical dataset that is much smaller than the training dataset that would be required to train a different model object (e.g., a number of data records on the order of thousands rather than hundreds of thousands or millions), and may be completed much more quickly than a training process (e.g., on the order of an hour or less rather than many hours).

However, in other implementations, the computing platform may be configured to use some other technique to produce the parameterized family of the post-processed model object. For example, instead of using a Bayesian optimization technique, the computing platform may be configured to utilize a random search technique that functions to evaluate the bias and the performance of the post-processed model object for certain random combinations of values for the unknown parameters, each defining a different version of the post-processed model object, and then builds the parameterized family of the post-processed model object from these different versions of the post-processed model object that are evaluated.

The function of producing the parameterized family of the post-processed model object may take other forms as well.

Further details regarding example techniques for producing a parameterized family of a post-processed model object can be found in the paper entitled "Model-agnostic bias mitigation methods with regressor distribution control for Wasserstein-based fairness metrics" by Miroshnikov et al. that has a submission date of Nov. 19, 2021, which is incorporated herein by reference in its entirety.

In some alternative embodiments, after producing the parameterized family of the post-processed model object in one of the manners described above, the computing platform may also be configured to expand that parameterized family of the post-processed model object in order to provide a larger and more granular universe of different versions of the post-processed model object that can thereafter be evaluated in order to define the updated model object for the data science model, which may potentially allow for the selection of a version of the post-processed model object having a more desirable bias-performance tradeoff than those included in the initially-produced parameterized family. The computing platform could be configured to expand the parameterized family of the post-processed model object in any of various ways.

For instance, as one possibility, the computing platform may be configured to expand the parameterized family of the post-processed model object by constructing new, combined versions of the post-processed model object from various different pairs of post-processed model object versions in the initially-produced parameterized family. In this respect, the function of constructing a new, combined version of the post-processed model object from a given pair of the post-processed model object versions in the initially-produced parameterized family may take any of various forms.

According to a first possible technique, the function of constructing a new, combined version of the post-processed model object from a given pair of the post-processed model object versions in the initially-produced parameterized family may involve constructing a linear combination of the two versions of the post-processed model object in the given pair. In this respect, one example of such a linear combination may be represented as follows:

$$f_\lambda(x) = \lambda f_1(x) + (1-\lambda) f_2(x), \lambda \in (0,1) \quad \text{(Eq. 9)}$$

where $f_1(x)$ represents the first version of the post-processed model object in the given pair, $f_2(x)$ represents the second version of the post-processed model object in the given pair, $\lambda$ represents a tuning parameter, and $f_\lambda(x)$ represents the new, combined version of the post-processed model object. In such an example, the computing platform could be configured to use a single value of the tuning parameter $\lambda$ for each pair of post-processed model object versions, in which case a single combined version of the post-processed model object may be constructed for each pair, or alternatively could be configured to use multiple different values of the tuning parameter $\lambda$ for each pair of post-processed model object versions, in which case multiple different combined versions of the post-processed model object may be constructed for each pair.

A similar approach for constructing a linear combination of two versions of the post-processed model object could also be utilized to combine more than two versions of the post-processed model object. This could be represented as:

$$f_\lambda(x) = \Sigma_K \lambda_k f_k(x), \quad \text{(Eq. 10)}$$

where the $\lambda_k$ values are non-negative and sum up to 1.

Turning to a second possible technique, if each of the post-processed model object versions in a given pair produces a distribution of a continuous random variable and the support of the distribution is a connected set, the function of constructing a new, combined version of the post-processed model object from the given pair may involve (i) producing a respective CDF for each of the two post-processed model object versions in the given pair, (ii) taking the inverse of the respective CDF for each of the two post-processed model object versions in the given pair, which produces a respective "quantile function" CDF for each of the two post-processed model object versions in the given pair, (iii) constructing a combined quantile function (i.e., the inverse of a combined CDF) by taking a linear combination of the respective quantile functions for the two post-processed model object versions in the given pair, and then (iv) constructing the combined version of the post-processed model object by taking the composition of (a) the combined quantile function and (b) the respective CDF for a given one of the two post-processed model object versions in the given pair as applied to that given one of the two post-processed model object versions. In this way, the combined version of the post-processed model object may effectively function to "move" the scores output by the given one of the two post-processed model object versions towards the combined CDF that is constructed from the CDFs of the two post-processed model object versions in the given pair.

To further illustrate this second technique, the combined quantile function that is constructed by taking a linear combination of the respective quantile functions for the two post-processed model object versions in the given pair may be represented as follows:

$$G_\lambda^{-1}(p) = \lambda F_1^{-1}(p) + (1-\lambda) F_2^{-1}(p), \lambda \in (0,1])  \quad \text{(Eq. 11)}$$

where $F_1^{-1}(p)$ represents the quantile function for the first version of the post-processed model object in the given pair, $F_2^{-1}(p)$ represents the quantile function for the second version of the post-processed model object in the given pair, $\lambda$ represents a turning parameter, and $G_\lambda^{-1}(p)$ represents the combined quantile function. In turn, the combined version of the post-processed model object that is constructed by composing the combined quantile function with the respective CDF for one of the two post-processed model object versions in the given pair may be represented as follows:

$$f_\lambda(x) = G_\lambda^{-1} \cdot F_1(f_1(x)) \text{ or } f_\lambda(x) = G_\lambda^{-1} \cdot F_2(f_2(x)) \quad \text{(Eq. 12)}$$

where $G_\lambda^{-1}(p)$ represents the combined quantile function, $F_1(f_1(x))$ represents the respective CDF of the first version of the post-processed model object $f_1(x)$ in the given pair as applied to the first version of the post-processed model object $f_1(x)$, $F_2(f_2(x))$ represents the respective CDF of the second version of the post-processed model object $f_2(x)$ in the given pair as applied to the second version of the post-processed model object $f_2(x)$, and $f_\lambda(x)$ represents the new, combined version of the post-processed model object.

In such an example, the computing platform could be configured to use a single value of the tuning parameter $\lambda$ for each pair of post-processed model object versions, in which case a single combined version of the post-processed model object may be constructed for each pair, or alternatively could be configured to use multiple different values of the tuning parameter $\lambda$ for each pair of post-processed model object versions, in which case multiple different combined versions of the post-processed model object may be constructed for each pair.

Turning next to a third possible technique, if each of the post-processed model object versions in a given pair produces a distribution of a continuous random variable and the support of the distribution is a connected set, the function of constructing a new, combined version of the post-processed model object from a given pair of the post-processed model object versions in the initially-produced parameterized family may involve (i) constructing a linear combination of the two versions of the post-processed model object in the given pair, as in the first technique described above, (ii) constructing a combined quantile function by taking a linear combination of the respective quantile functions for the two post-processed model object versions in the given pair, as in the second technique described above, and then (iii) constructing the combined version of the post-processed model object by taking the composition of (a) the combined quantile function and (b) a CDF of the linear combination of the two post-processed model object versions in the given pair as applied to the linear combination of the two post-processed model object versions. In this respect, the combined version of the post-processed model object that is constructed by taking the composition of the combined quantile function and the CDF of the linear combination of the two post-processed model object versions in the given pair as applied to the linear combination of the two post-processed model object versions may be represented as follows:

$$f_\lambda(x) = G_\lambda^{-1} \cdot H_\lambda(h_\lambda(x)) \quad \text{(Eq. 13)}$$

where $G_\lambda^{-1}(p)$ represents the combined quantile function, $H_\lambda(h_\lambda(x))$ represents the CDF of the linear combination $h_\lambda(x)$ of the two post-processed model objects in the given pair as applied to the linear combination $h_\lambda(x)$ of the two post-processed model objects, $\lambda$ represents a tuning parameter, and $f_\lambda(x)$ represents the new, combined version of the post-processed model object.

As with the first and second techniques, in such an example, the computing platform could be configured to use a single value of the tuning parameter $\lambda$ for each pair of post-processed model object versions, in which case a single combined version of the post-processed model object may be constructed for each pair, or alternatively could be configured to use multiple different values of the tuning parameter $\lambda$ for each pair of post-processed model object versions, in which case multiple different combined versions of the post-processed model object may be constructed for each pair.

The function of constructing a new, combined version of the post-processed model object from a given pair of post-processed model object versions in the initially-produced parameterized family may take other forms as well.

As another possibility, the computing platform may be configured to expand the parameterized family of the post-processed model object by constructing new, combined versions of the post-processed model object from various different pairings of the initial model object with different post-processed model object versions in the initially-produced parameterized family. In this respect, the function of creating a new, combined version of the post-processed model object from a given pair that includes the initial model object and a given version of the post-processed model object in the initially-produced parameterized family may be carried out using any of various techniques, including but not limited to any of the various techniques described above.

The optional function of expanding the parameterized family of the post-processed model object may take various other forms as well.

At block 514, after producing the parameterized family of the post-processed model object, the computing platform may then select one particular version of the post-processed model object, which could then be used as the basis for the updated model object of the data science model to be deployed. This function of selecting a particular version of the post-processed model object may take various forms.

In one implementation, the computing platform may be configured to select the particular version of the post-processed model object to use for the data science model by applying certain model-object selection logic to the bias and performance values that were determined at block 512 for the different versions of the post-processed model object included in the parameterized family. This model-object selection logic may take any of various forms.

As one possibility, the model-object selection logic may encode a threshold level of acceptable bias for a model object and define a selection process whereby the computing platform limits its analysis to the versions of the post-processed model object that do not exceed the threshold level of acceptable bias and selects whichever of those versions has the best performance. For instance, in a scenario where the parameterized family of the post-processed model object forms an efficient frontier, then in accordance with this model-object selection logic, the computing platform may be configured to identify whichever version of the post-processed model object along the efficient frontier has a bias that is closest to the threshold level of acceptable bias without exceeding it, as that is expected to be the version of the post-processed model object below the threshold level of bias that has the best performance.

Figure 9C:
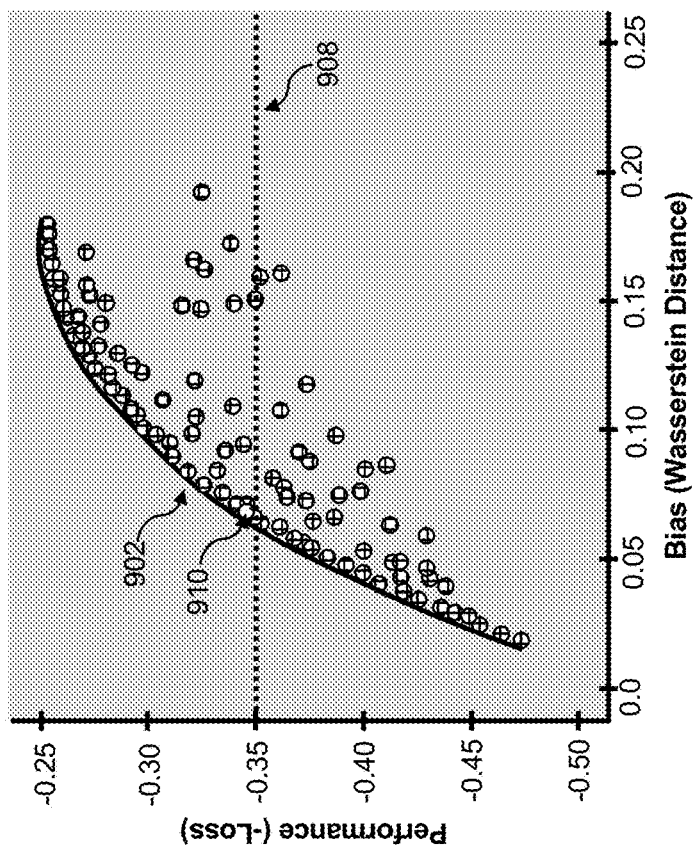
FIG. 9C illustrates another possible example of how model-object selection logic may be applied to the efficient fronter of FIG. 9A.
Figure 9B:
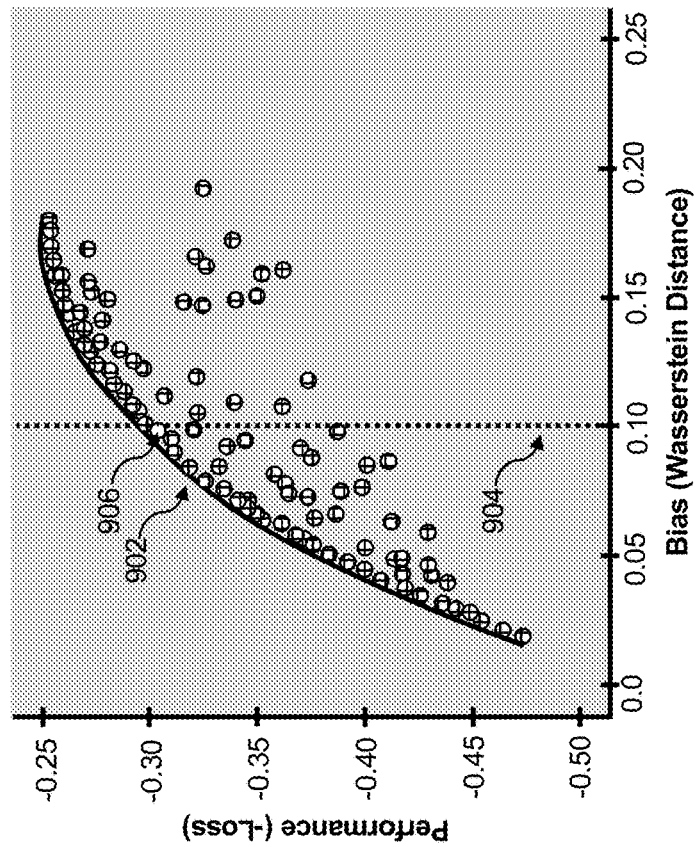
FIG. 9B illustrates one possible example of how model-object selection logic may be applied to the efficient fronter of FIG. 9A.

FIG. 9B illustrates one possible example of how this type of model-object selection logic may be applied to the efficient fronter 902 of FIG. 9A. In FIG. 9B, the threshold level of acceptable bias is represented by vertical line 904, and the computing platform may be configured to identify whichever version of the post-processed model object along the efficient frontier 902 has a bias that is closest to the threshold level of acceptable bias represented by line 904 without exceeding it, which is illustrated as point 906.

As another possibility, the model-object selection logic may encode a threshold level of acceptable performance for a model object and define a selection process whereby the computing platform limits its analysis to the versions of the post-processed model object that do not fall below the threshold level of acceptable performance and selects whichever of those versions has the least bias. For instance, in a scenario where the parameterized family of the post-processed model object forms an efficient frontier, then in accordance with this model-object selection logic, the computing platform may be configured to identify whichever version of the post-processed model object along the efficient frontier has a performance that is closest to the threshold level of acceptable performance without falling below it, as that is expected to be the version of the post-processed model object above the threshold level of performance that has the least bias.

FIG. 9C illustrates one possible example of how this type of model-object selection logic may be applied to the efficient fronter 902 of FIG. 9A. In FIG. 9C, the threshold level of acceptable performance is represented by vertical line 908, and the computing platform may be configured to identify whichever version of the post-processed model object along the efficient frontier 902 has a performance that is closest to the threshold level of acceptable performance represented by line 908 without falling below it, which is illustrated as point 810.

Further details regarding example techniques for selecting a particular version of a post-processed model object can be found in the paper entitled "Model-agnostic bias mitigation methods with regressor distribution control for Wasserstein-based fairness metrics" by Miroshnikov et al. that has a submission date of Nov. 19, 2021, which is incorporated herein by reference in its entirety.

The model-object selection logic that is applied by the computing platform in order to select the particular version of the post-processed model object to use for the data science model may take various other forms as well, including but not limited to the possibility that the model-object selection logic may evaluate other factors in addition to bias and performance.

In at least some scenarios, the selected version of the post-processed model object could then be designated for use as the updated model object of the data science model to be deployed, while in other scenarios, the computing platform may engage in additional functionality in order to define a different updated model object for the data science model.

For instance, in a scenario where the computing platform determined at block 204 that the initial model object was exhibiting a threshold level of bias with respect to only one subpopulation pair defined based on one attribute (e.g., only gender) and carried out the bias mitigation functionality at blocks 502-514 with respect to that one subpopulation pair, then the computing platform may be configured to designate the selected version of the post-processed model object as the updated model object for the data science model without any further evaluation of the selected version of the post-processed model object. However, in practice, the computing platform could also optionally validate that the selected version of the post-processed model object does not exhibit a threshold level of bias for that one subpopulation pair using functionality similar to that described above with reference to block 204 before designating the selected version of the post-processed model object as the updated model object for the data science model.

Alternatively, in a scenario where the computing platform determined at block 204 that the initial model object was exhibiting a threshold level of bias with respect to multiple different subpopulation pairs of concern and carried out the bias mitigation functionality at blocks 502-514 with respect to a representative one of those different subpopulation pairs, then before designating the selected version of the post-processed model object as the updated model object for the data science model, the computing platform may evaluate whether the selected version of the post-processed model object sufficiently mitigates the bias previously exhibited by the initial model object for the other subpopulation pairs of concern. For instance, the computing platform may evaluate the level of bias exhibited by the selected version of the post-processed model object for each of the other subpopulation pairs of concern using functionality similar to that described above with reference to block 204, and based on that evaluation, the computing platform may either (i) determine that the selected version of the post-processed model object exhibits an acceptable level of bias for each of the other subpopulation pairs of concern or (ii) determine that the selected version of the post-processed model object still exhibits an unacceptable level of bias for at least one of the other subpopulation pairs of concern.

If the computing platform determines that the selected version of the post-processed model object does exhibit an acceptable level of bias for each of the other subpopulation pairs of concern, the computing platform may then verify that the selected version of the post-processed model object can be designated for use as the updated model object for the data science model. On the other hand, if the computing platform determines that the selected version of the post-processed model object still exhibits an unacceptable level of bias for at least one of the other subpopulation pairs of concern, the computing platform may then repeat certain of the bias mitigation functionality of FIG. 5 in order to produce a different post-processed model that can potentially be used as the updated model object for the data science model. For example, the computing platform could repeat the functionality of block 514 one or more times in order to select a different version of the post-processed model object that provides an acceptable bias-performance tradeoff for the representative subpopulation pair while also providing an acceptable level of bias for each of the other subpopulation pairs of concern. As another example, the computing platform could repeat the functionality of block 510 in order to produce a different post-processed model object comprising different transformations and then repeat blocks 512-514 in order to produce a parameterized family of the different post-processed model object and then select a particular version of the different post-processed model object, which could provide an acceptable bias-performance tradeoff for the representative subpopulation pair while also providing an acceptable level of bias for each of the other subpopulation pairs of concern. In a scenario where the computing platform determines that the selected version of the post-processed model object still exhibits an unacceptable level of bias for at least one of the other subpopulation pairs of concern, the computing platform may perform other remedial functions as well.

Alternatively yet, in a scenario where the computing platform determined at block 204 that the initial model object was exhibiting a threshold level of bias with respect to multiple different subpopulation pairs of concern and carried out the bias mitigation functionality at blocks 502-514 with respect to two or more different subpopulation pairs that each comprise a respective one of two or more different protected subpopulations defined based on a multi-attribute combination and one common non-protected subpopulation defined based on the multi-attribute combination, then before designating the selected version of the post-processed model object as the updated model object for the data science model, the computing platform may evaluate whether the selected version of the post-processed model object exhibits an acceptable level of bias for each of these different subpopulation pairs. For instance, the computing platform may evaluate the level of bias exhibited by the selected version of the post-processed model object for each of the different subpopulation pairs defined based on the multi-attribute combination using functionality similar to that described above with reference to block 204, and based on that evaluation, the computing platform may either (i) determine that the selected version of the post-processed model object exhibits an acceptable level of bias for each of the different subpopulation pairs, in which case the computing platform may verify that the selected version of the post-processed model object can be designated for use as the updated model object for the data science model or (ii) determine that the selected version of the post-processed model object exhibits an unacceptable level of bias for at least one of the different subpopulation pairs, in which case the computing platform may repeat certain of the bias mitigation functionality of FIG. 5 in order to produce a different post-processed model that can potentially be used as the updated model object for the data science model.

As noted above, in a scenario where the computing platform determined at block 204 that the initial model object was exhibiting a threshold level of bias with respect to multiple different subpopulation pairs of concern, an alternative embodiment may involve the computing platform selecting two or more different subpopulation pairs for which to carry out bias mitigation at block 502, carrying out a separate iteration of the remaining bias mitigation functionality of FIG. 5 (blocks 504-514) for each of the two or more different subpopulation pair that are selected in order to produce a respective post-processed model object with respect to each different subpopulation pair, and then producing a model object that comprises a combination of the respective post-processed model objects that are produced for the two or more different subpopulation pairs.

For instance, the iteration of the bias mitigation for each respective subpopulation pair of concern may involve the computing platform (i) producing a parameterized family of a respective post-processed model object that is produced for the respective subpopulation pair and (ii) selecting one particular version of the respective post-processed model object for the respective subpopulation pair. In this alternative embodiment, the particular version of the respective post-processed model object that is selected for each respective subpopulation pair may be considered an "intermediate" model object for the respective subpopulation pair, and the selection logic that is utilized to select the particular version of the respective post-processed model object for each respective subpopulation pair may be configured to apply similar selection criteria such that the selected versions of the different post-processed models can be combined in a logical manner. For instance, as one possibility, the computing platform may be configured to apply the same performance threshold to the parameterized families of the respective post-processed model objects and thereby select whichever version of each respective post-processed model object is closest to that performance threshold. Other selection criteria is possible as well.

In turn, the computing platform may use any of various techniques to combine the intermediate model objects for the two or more subpopulation pairs of concern into a single, combined model object, which could then be used as the updated model object for the data science model to be deployed. For instance, as one possibility, the computing platform may construct a linear combination of the intermediate model objects for the two or more subpopulation pairs of concern. In a scenario where there are two intermediate model objects produced for two subpopulation pairs, one example of such a linear combination may be represented as follows:

$$f_w(x)=wf_1(x)+(1-w)f_2(x), w \in (0,1) \quad \text{(Eq. 14)}$$

where $f_1(x)$ represents the intermediate model object produced for the first subpopulation pair, $f_2(x)$ represents the intermediate model object produced for the second subpopulation pair, w represents a weighting factor, and $f_w(x)$ represents the combined model object. In such an example, the computing platform may then determine a value for the weighting factor that minimizes the bias of the combined model object and then use that weighted factor value to select the particular version of the combined model object that is used as the updated model object.

A similar approach for constructing a linear combination of intermediate objects could also be utilized to combine more than two intermediate model objects.

The computing platform may combine the intermediate model objects for the two or more subpopulation pairs of concern using various other techniques as well—including but not limited to a technique that transforms the values of one intermediate model object by moving its distribution along the Wasserstein geodesics towards that of another intermediate model object.

As discussed above, in some alternative embodiments, the computing platform's function of producing the post-processed model object could also involve separating out the identified subset of biased input variables into a first grouping of "numerical" biased input variables and a second grouping of "categorical" biased input variables and then replacing only the first grouping of "numerical" biased input variables with respective transformations having no unknown parameters, while foregoing any transformation or compensation of the second grouping of "categorical" biased input variables within the post-processed model object itself (among the other possible ways to handle the "categorical" biased input variables that are described above). In these alternative embodiments, the computing platform could then optionally be configured to incorporate a respective compensation function for each respective biased input variable in the second grouping of "categorical" biased input variables into the updated model object for the data science model that is produced based on the post-processed model object in one of the manners described above. For instance, after selecting a particular version of the post-processed model object from the produced parameterized family to use as an updated model object for the data science model and/or otherwise defining an updated model object for the data science model in one of the manners described above, the computing platform could be configured to further update that model object by incorporating a respective compensation function for each respective biased input variable in the second grouping of "categorical" biased input variables. In this respect, the respective compensation function that is incorporated into the updated model object may take any of various forms, including but not limited to any of the forms described above in connection with the functionality of incorporating compensation functions into the post-processed model object.

The manner in which the particular version of the post-processed model object selected at block 214 is evaluated and used to define the updated model object for the data science model may take various other forms as well.

Returning to FIG. 2, if the data science model to be deployed takes the form of a classification model, then at block 208, the computing platform may also define a particular score threshold that is to be utilized by the data science model for purposes of making classification decisions based on the model score output by the selected version of the post-processed model object. In this respect, the computing platform may be configured to define the particular score threshold for the data science model based on user input, evaluation of historical data using any technique now known or later developed for defining a classification model's score threshold based on historical data, or some combination thereof, among other possibilities. Further, in some implementations, the computing platform could also be configured to define multiple different score thresholds that are to be utilized by the data science model for purposes of making classification decisions in different scenarios (e.g., a first threshold for use by the data science model when the input data satisfies one set of criteria, a second threshold for use by the data science model when the input data satisfies another set of criteria, etc.).

Either during or after performing the function of defining a particular score threshold that is to be utilized by the data science model for purposes of making classification decisions based on the model score output by the selected version of the post-processed model object, the computing platform may also be configured to evaluate and verify the bias and/or performance of the data science model comprising the selected version of the post-processed model object and the defined score threshold. For instance, the computing platform may be configured to evaluate and verify the bias of the data science model using metrics that quantify the bias of the data science model in terms of any of (i) statistical parity (e.g., a difference in the likelihood of a favorable classification decision being made for the protected subpopulation versus the non-protected subpopulation), (ii) equalized odds (e.g., a difference in misclassification error rates for the protected subpopulation versus the non-protected subpopulation with respect to all classification decisions made by the data science model), and/or (iii) equalized opportunity (e.g., a difference in misclassification error rates for the protected subpopulation versus the non-protected subpopulation with respect to favorable classification decisions only), among other possibilities. Further, the computing platform may be configured to evaluate and verify the performance of the data science model using metrics that quantify the performance of the data science model in terms of accuracy, balanced accuracy, and/or top-capture rate, among other possibilities.

For instance, according to one possible implementation, the computing platform may be configured to generate a set of bias and/or performance metrics for some set of candidate score thresholds that could be utilized by the data science model for purposes of making classification decisions based on the model score output by the selected version of the post-processed model object, and the computing platform may then utilize that set of bias and/or performance metrics to help facilitate the function of defining the particular score threshold for the data science model (e.g., by applying certain threshold defining logic to the bias and/or performance metrics).

The function of defining a particular score threshold that is to be utilized by the data science model for purposes of making classification decisions based on the model score output by the selected version of the post-processed model object may take various other forms as well.

At block 210, the computing platform may deploy the data science model comprising the updated model object (i.e., the selected version of the post-processed model object) and perhaps also the defined score threshold, if appropriate. For instance, in the context of the example computing platform 102 of FIG. 1, deploying the data science model comprising the updated model object and perhaps also the defined score threshold may involve configuring the computing platform's data analytics subsystem 102*d* to begin applying the data science model to data related to individuals within a population and thereby rendering a particular type of decision with respect to those individuals, such as a decision of whether to extend a service being offered by the organization to an individual (e.g., a financial service such as a loan, a credit card account, a bank account, etc.), a decision of whether to target an individual for marketing of a good and/or service that is offered by the organization, and/or a decision of what terms to extend an individual within a population for a service being offered by the organization, among various other possibilities.

While the disclosed process for creating a data science model having reduced bias is primarily discussed above in the context of a model object for a binary classification model that is configured to output one of two possible classification decisions (e.g., a favorable decision or an unfavorable decision), it should also be understood that the disclosed process may be applied to other types of data science models as well.

For example, the disclosed process may be utilized to create a multi-class classification model comprising a model object that is configured to output scores for multiple different classes. In such an example, the initial model object's bias, the input variables' bias contributions, and the post-processed model object's bias and performance may be evaluated with respect to a model output that takes the form of a vector of multiple model scores, rather than a single model score. One way this could be done would be to identify which of the model scores within the vector are associated with a favorable decision and then aggregate the identified model scores together in some manner (e.g., by summing the model scores together, perhaps using weights) so as to treat those model scores as a single, aggregated model score for the favorable decision, while treating all other model scores as a single, aggregated model score for the unfavorable decision. Under this approach, the vector of multiple model scores is transformed into a single, aggregated model score that is analogous to the single-value model score that is output by model object discussed above, and the evaluation of the initial model object's bias, the input variables' bias contributions, and the post-processed model object's bias and performance may then be carried out using the same techniques described above. However, other approaches for evaluating the initial model object's bias, the input variables' bias contributions, and the post-processed model object's bias and performance with respect to a model output that takes the form of a vector of multiple model scores may be utilized as well, including but not limited to approaches that perform multi-dimensional evaluations of model score distributions.

As another example, the disclosed process may be utilized to create a regression model, which may comprise a model object that is similar to the model object for a classification model except that the value output by the model object of a regression model may take a form other than "score" that indicates a likelihood value—such as a value of some numeric data variable of interest. In this respect, the same techniques described above for evaluating the initial model object's bias, the input variables' bias contributions, and the post-processed model object's bias and performance with respect to a model object that outputs a score may likewise be applied to a model object that outputs some other type of numeric value.

Several other variations and extensions of the process for creating a data science model having reduced bias illustrated in FIG. 2 may be possible as well.

Figure 10:
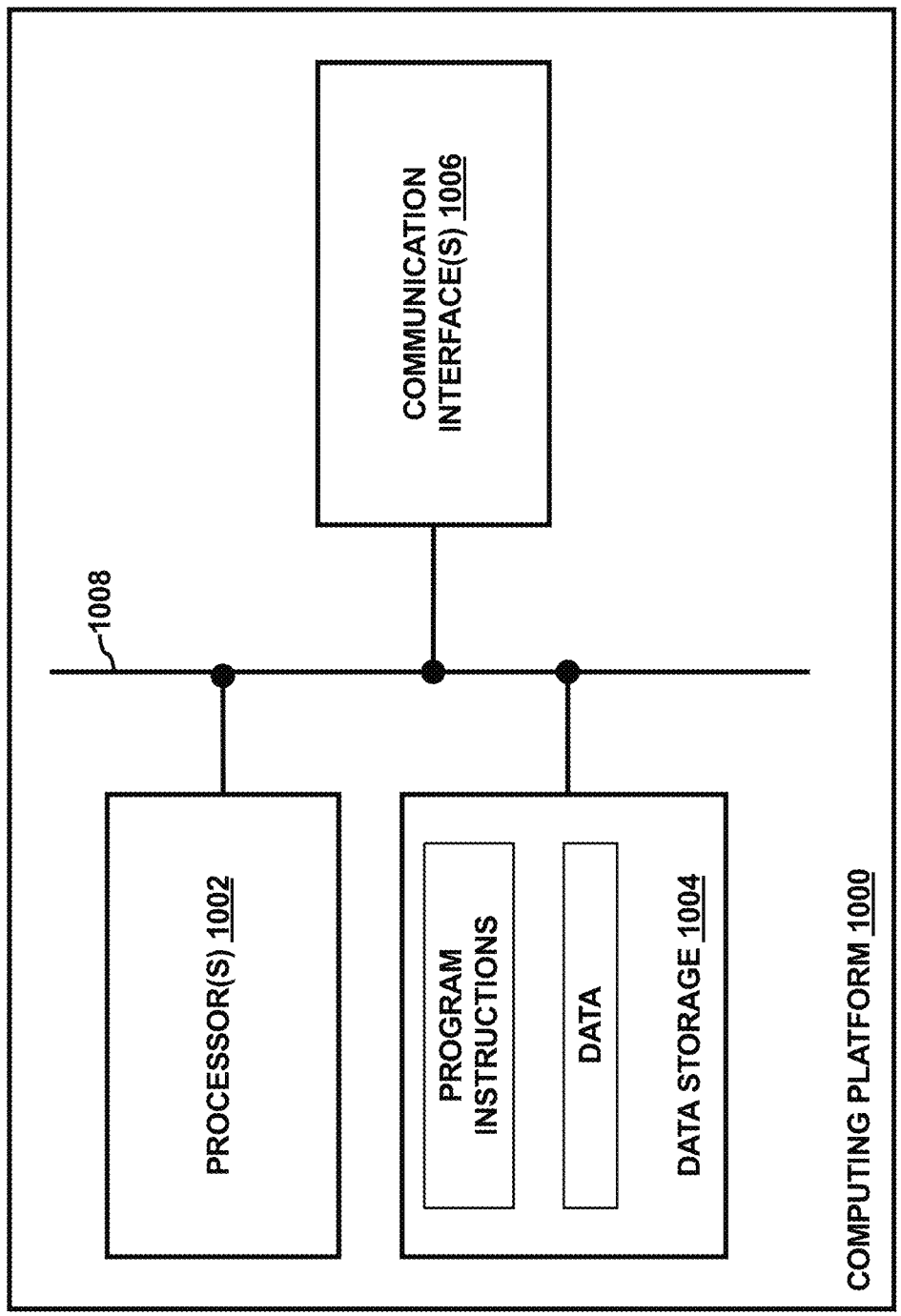
FIG. 10 is a simplified block diagram that illustrates some structural components of an example computing platform.

Turning now to FIG. 10, a simplified block diagram is provided to illustrate some structural components that may be included in an example computing platform 1000 that may be configured perform some or all of the functions discussed herein for creating a data science model in accordance with the present disclosure. At a high level, computing platform 1000 may generally comprise any one or more computer systems (e.g., one or more servers) that collectively include one or more processors 1002, data storage 1004, and one or more communication interfaces 1006, all of which may be communicatively linked by a communication link 1008 that may take the form of a system bus, a communication network such as a public, private, or hybrid cloud, or some other connection mechanism. Each of these components may take various forms.

For instance, the one or more processors 1002 may comprise one or more processor components, such as one or more central processing units (CPUs), graphics processing unit (GPUs), application-specific integrated circuits (ASICs), digital signal processor (DSPs), and/or a programmable logic devices such as a field programmable gate arrays (FPGAs), among other possible types of processing components. In line with the discussion above, it should also be understood that the one or more processors 1002 could comprise processing components that are distributed across a plurality of physical computing devices connected via a network, such as a computing cluster of a public, private, or hybrid cloud.

In turn, data storage 1004 may comprise one or more non-transitory computer-readable storage mediums, examples of which may include volatile storage mediums such as random-access memory, registers, cache, etc. and non-volatile storage mediums such as read-only memory, a hard-disk drive, a solid-state drive, flash memory, an optical-storage device, etc. In line with the discussion above, it should also be understood that data storage 1004 may comprise computer-readable storage mediums that are distributed across a plurality of physical computing devices connected via a network, such as a storage cluster of a public, private, or hybrid cloud that operates according to technologies such as AWS for Elastic Compute Cloud, Simple Storage Service, etc.

As shown in FIG. 10, data storage 1004 may be capable of storing both (i) program instructions that are executable by processor 1002 such that the computing platform 1000 is configured to perform any of the various functions disclosed herein (including but not limited to any the functions described above with reference to FIGS. 2-8), and (ii) data that may be received, derived, or otherwise stored by computing platform 1000.

The one or more communication interfaces 1006 may comprise one or more interfaces that facilitate communication between computing platform 1000 and other systems or devices, where each such interface may be wired and/or wireless and may communicate according to any of various communication protocols, examples of which may include Ethernet, Wi-Fi, serial bus (e.g., Universal Serial Bus (USB) or Firewire), cellular network, and/or short-range wireless protocols, among other possibilities.

Although not shown, the computing platform 100 may additionally include or have an interface for connecting to one or more user-interface components that facilitate user interaction with the computing platform 1000, such as a keyboard, a mouse, a trackpad, a display screen, a touch-sensitive interface, a stylus, a virtual-reality headset, and/or one or more speaker components, among other possibilities.

It should be understood that computing platform 1000 is one example of a computing platform that may be used with the embodiments described herein. Numerous other arrangements are possible and contemplated herein. For instance, other computing systems may include additional components not pictured and/or more or less of the pictured components.

CONCLUSION

This disclosure makes reference to the accompanying figures and several example embodiments. One of ordinary skill in the art should understand that such references are for the purpose of explanation only and are therefore not meant to be limiting. Part or all of the disclosed systems, devices, and methods may be rearranged, combined, added to, and/or removed in a variety of manners without departing from the true scope and spirit of the present invention, which will be defined by the claims.

Further, to the extent that examples described herein involve operations performed or initiated by actors, such as "humans," "curators," "users" or other entities, this is for purposes of example and explanation only. The claims should not be construed as requiring action by such actors unless explicitly recited in the claim language.

We claim:

1. A computing platform comprising:
   at least one network interface for communicating over at least one data network;
   at least one processor;
   at least one non-transitory computer-readable medium; and
   program instructions stored on the at least one non-transitory computer-readable medium that, when executed by the at least one processor, cause the computing platform to:
   train an initial model object for a data science model using a machine learning process, wherein the initial model object functions to receive values for a set of input variables and generate an output value;
   based on an evaluation of the initial model object's bias, determine that the initial model object exhibits a threshold level of bias with respect to at least one given attribute; and
   after determining that the initial model object exhibits the threshold level of bias, produce an updated version of the initial model object having mitigated bias by:
   based on an evaluation of the initial model object's set of input variables, identifying a subset of the initial model object's set of input variables that are to be replaced by transformations;
   producing a post-processed model object by replacing each respective input variable in the identified subset with a respective transformation of the respective input variable that has one or more unknown parameters, wherein the respective transformation of each respective input variable in the identified subset comprises one of (i) a first type of transformation that compresses or expands the respective input variable in a linear and symmetric manner, (ii) a second type of transformation that compresses or expands the respective input variable in a linear and asymmetric manner, (iii) a third type of transformation that compresses or expands the respective input variable in a non-linear and symmetric manner, or (iv) a fourth type of transformation that compresses or expands the respective input variable in a non-linear and asymmetric manner;
   producing a parameterized family of the post-processed model object; and
   selecting, from the parameterized family of the post-processed model object, one given version of the post-processed model object to use as the updated version of the initial model object for the data science model.

2. The computing platform of claim 1, wherein the threshold level of bias with respect to the at least one given attribute comprises a threshold level of bias with respect to a pair of subpopulations defined based on the given attribute that comprises a protected subpopulation and a non-protected subpopulation.

3. The computing platform of claim 2, wherein the evaluation of the initial model object's bias involves:
   accessing a historical dataset comprising a first set of historical data records for individuals belonging the protected subpopulation and a second set of historical data records for individuals belonging the non-protected subpopulation;
   inputting the first set of historical data records into the initial model object and thereby generating a first set of model scores for the protected subpopulation;
   inputting the second set of historical data records into the initial model object and thereby generating a second set of model scores for the non-protected subpopulation; and
   based on the first and second sets of model scores, quantifying the bias exhibited by the initial model object for the protected and non-protected subpopulations.

4. The computing platform of claim 3, wherein quantifying the bias exhibited by the initial model object for the protected and non-protected subpopulations comprises:
   determining at least one of (i) a positive bias metric that quantifies a portion of the initial model object's bias that favors the non-protected subpopulation or (ii) a negative bias metric that quantifies a portion of the initial model object's bias that favors the protected subpopulation.

5. The computing platform of claim 2, wherein the evaluation of the initial model object's set of input variables involves:
   based on an evaluation of dependencies between the initial model object's set of input variables, dividing the initial model object's set of input variables into a set of variable groups that each comprises one or more input variables; and
   quantifying a respective bias contribution of each respective variable group in defined set of variable groups using an explainability technique and a historical dataset comprising a first set of historical data records for individuals belonging the protected subpopulation and a second set of historical data records for individuals belonging the non-protected subpopulation.

6. The computing platform of claim 5, wherein quantifying the respective bias contribution of each respective variable group comprises:
   for each respective variable group, determining at least one of (i) a respective positive bias contribution metric that quantifies the respective variable group's contribution to either increasing a bias favoring the non-protected subpopulation or decreasing a bias favoring the protected subpopulation or (ii) a respective negative bias contribution metric that quantifies the respective variable group's contribution to either increasing a bias favoring the protected subpopulation or decreasing a bias favoring the non-protected subpopulation.

7. The computing platform of claim 1, wherein producing the post-processed model object by replacing each respective input variable in the identified subset with the respective transformation of the respective input variable comprises:
   replacing each respective input variable in the identified subset with a respective transformation of the respective input variable that is selected based on a determination of the respective input variable's contribution to the initial model object's bias.

8. The computing platform of claim 1, wherein producing the post-processed model object further comprises calibrating the post-processed model object to align a scale of post-processed model object's output with a scale of the initial model object's output.

9. The computing platform of claim 1, wherein producing the parameterized family of the post-processed model object comprises:
   using a Bayesian optimization technique that functions to evaluate a bias and a performance of different versions of the post-processed model object that are produced by using different combinations of values for the unknown parameters included within the post-processed model object and thereby producing a parameterized family of the post-processed model object based on versions of the post-processed model object that form an efficient frontier for a tradeoff between the post-processed model object's bias and the post-processed model object's performance.

10. The computing platform of claim 9, wherein producing the parameterized family of the post-processed model object further comprises:
after producing the parameterized family of the post-processed model object using the Bayesian optimization technique, expanding the parameterized family of the post-processed model object to include additional versions of the post-processed model object.

11. The computing platform of claim 10, wherein expanding the parameterized family of the post-processed model object to include additional versions of the post-processed model object comprises:
constructing combined versions of the post-processed model object from respective pairs of versions of the post-processed model object that are in the parameterized family of the post-processed model object produced using the Bayesian optimization technique.

12. The computing platform of claim 1, wherein the data science model comprises a classification model, wherein the initial model object's output value comprises a score for use in making a classification decision, and wherein the computing platform further comprises program instructions stored on the at least one non-transitory computer-readable medium that, when executed by the at least one processor, cause the computing platform to:
define at least one score threshold that is to be utilized by the data science model for use in making classification decisions based on the score output by the updated version of the initial model object.

13. The computing platform of claim 1, wherein the identified subset of the initial model object's set of input variables that are to be replaced by transformations consists of input variables that behave in a numerical manner.

14. The computing platform of claim 13, wherein the identified subset of the initial model object's set of input variables comprises a first subset of the initial model object's set of input variables, and wherein producing the post-processed model object further comprises:
identifying a second subset of the initial model object's set of input variables for which to incorporate additional compensation into the post-processed model object, wherein the second subset of the initial model object's set of input variables consists of input variables that behave in a categorical manner; and
incorporating, into the post-processed model object, a respective compensation function for each respective input variable in the second subset of the initial model object's set of input variables that serves to compensate for the respective input variable's bias contribution.

15. A non-transitory computer-readable medium comprising program instructions that, when executed by at least one processor, cause a computing platform to:
train an initial model object for a data science model using a machine learning process, wherein the initial model object functions to receive values for a set of input variables and generate an output value;
based on an evaluation of the initial model object's bias, determine that the initial model object exhibits a threshold level of bias with respect to at least one given attribute; and after determining that the initial model object exhibits the threshold level of bias, produce an updated version of the initial model object having mitigated bias by:
based on an evaluation of the initial model object's set of input variables, identifying a subset of the initial model object's set of input variables that are to be replaced by transformations;
producing a post-processed model object by replacing each respective input variable in the identified subset with a respective transformation of the respective input variable that has one or more unknown parameters, wherein the respective transformation of each respective input variable in the identified subset comprises one of (i) a first type of transformation that compresses or expands the respective input variable in a linear and symmetric manner, (ii) a second type of transformation that compresses or expands the respective input variable in a linear and asymmetric manner, (iii) a third type of transformation that compresses or expands the respective input variable in a non-linear and symmetric manner, or (iv) a fourth type of transformation that compresses or expands the respective input variable in a non-linear and asymmetric manner;
producing a parameterized family of the post-processed model object; and
selecting, from the parameterized family of the post-processed model object, one given version of the post-processed model object to use as the updated version of the initial model object for the data science model.

16. The non-transitory computer-readable medium of claim 15, wherein the threshold level of bias with respect to the at least one given attribute comprises a threshold level of bias with respect to a pair of subpopulations defined based on the given attribute that comprises a protected subpopulation and a non-protected subpopulation.

17. The non-transitory computer-readable medium of claim 16, wherein the evaluation of the initial model object's bias involves:
accessing a historical dataset comprising a first set of historical data records for individuals belonging the protected subpopulation and a second set of historical data records for individuals belonging the non-protected subpopulation;
inputting the first set of historical data records into the initial model object and thereby generating a first set of model scores for the protected subpopulation;
inputting the second set of historical data records into the initial model object and thereby generating a second set of model scores for the non-protected subpopulation; and
based on the first and second sets of model scores, quantifying the bias exhibited by the initial model object for the protected and non-protected subpopulations.

18. The non-transitory computer-readable medium of claim 17, wherein quantifying the bias exhibited by the initial model object for the protected and non-protected subpopulations comprises:
determining at least one of (i) a positive bias metric that quantifies a portion of the initial model object's bias that favors the non-protected subpopulation or (ii) a negative bias metric that quantifies a portion of the initial model object's bias that favors the protected subpopulation.

19. The non-transitory computer-readable medium of claim 16, wherein the evaluation of the initial model object's set of input variables involves:

based on an evaluation of dependencies between the initial model object's set of input variables, dividing the initial model object's set of input variables into a set of variable groups that each comprises one or more input variables; and quantifying a respective bias contribution of each respective variable group in defined set of variable groups using an explanability technique and a historical dataset comprising a first set of historical data records for individuals belonging the protected subpopulation and a second set of historical data records for individuals belonging the non-protected subpopulation.

20. The non-transitory computer-readable medium of claim 19, wherein quantifying the respective bias contribution of each respective variable group comprises:

for each respective variable group, determining at least one of (i) a respective positive bias contribution metric that quantifies the respective variable group's contribution to either increasing a bias favoring the non-protected subpopulation or decreasing a bias favoring the protected subpopulation or (ii) a respective negative bias contribution metric that quantifies the respective variable group's contribution to either increasing a bias favoring the protected subpopulation or decreasing a bias favoring the non-protected subpopulation.

21. The non-transitory computer-readable medium of claim 15, wherein producing the post-processed model object by replacing each respective input variable in the identified subset with the respective transformation of the respective input variable comprises:

replacing each respective input variable in the identified subset with a respective transformation of the respective input variable that is selected based on a determination of the respective input variable's contribution to the initial model object's bias.

22. The non-transitory computer-readable medium of claim 15, wherein producing the post-processed model object further comprises calibrating the post-processed model object to align a scale of post-processed model object's output with a scale of the initial model object's output.

23. The non-transitory computer-readable medium of claim 15, wherein producing the parameterized family of the post-processed model object comprises:

using a Bayesian optimization technique that functions to evaluate a bias and a performance of different versions of the post-processed model object that are produced by using different combinations of values for the unknown parameters included within the post-processed model object and thereby producing a parameterized family of the post-processed model object based on versions of the post-processed model object that form an efficient frontier for a tradeoff between the post-processed model object's bias and the post-processed model object's performance.

24. The non-transitory computer-readable medium of claim 23, wherein producing the parameterized family of the post-processed model object further comprises:

after producing the parameterized family of the post-processed model object using the Bayesian optimization technique, expanding the parameterized family of the post-processed model object to include additional versions of the post-processed model object.

25. The non-transitory computer-readable medium of claim 24, wherein expanding the parameterized family of the post-processed model object to include additional versions of the post-processed model object comprises:

constructing combined versions of the post-processed model object from respective pairs of versions of the post-processed model object that are in the parameterized family of the post-processed model object produced using the Bayesian optimization technique.

26. The non-transitory computer-readable medium of claim 15, wherein the data science model comprises a classification model, wherein the initial model object's output value comprises a score for use in making a classification decision, and wherein the non-transitory computer-readable medium further comprises program instructions that, when executed by at least one processor, cause the computing platform to:

define at least one score threshold that is to be utilized by the data science model for use in making classification decisions based on the score output by the updated version of the initial model object.

27. The non-transitory computer-readable medium of claim 15, wherein the identified subset of the initial model object's set of input variables that are to be replaced by transformations comprises a first subset of the initial model object's set of input variables consisting of input variables that behave in a numerical manner, and wherein producing the post-processed model object further comprises:

identifying a second subset of the initial model object's set of input variables for which to incorporate additional compensation into the post-processed model object, wherein the second subset of the initial model object's set of input variables consists of input variables that behave in a categorical manner; and incorporating, into the post-processed model object, a respective compensation function for each respective input variable in the second subset of the initial model object's set of input variables that serves to compensate for the respective input variable's bias contribution.

28. A computer-implemented method comprising:

training an initial model object for a data science model using a machine learning process, wherein the initial model object functions to receive values for a set of input variables and generate an output value;

based on an evaluation of the initial model object's bias, determining that the initial model object exhibits a threshold level of bias with respect to at least one given attribute; and after determining that the initial model object exhibits the threshold level of bias, producing an updated version of the initial model object having mitigated bias by:

based on an evaluation of the initial model object's set of input variables, identifying a subset of the initial model object's set of input variables that are to be replaced by transformations;

producing a post-processed model object by replacing each respective input variable in the identified subset with a respective transformation of the respective input variable that has one or more unknown parameters, wherein the respective transformation of each respective input variable in the identified subset comprises one of (i) a first type of transformation that compresses or expands the respective input variable in a linear and symmetric manner, (ii) a second type of transformation that compresses or expands the respective input variable in a linear and asymmetric manner, (iii) a third type of transformation that compresses or expands the respective input variable in a non-linear and symmetric manner, or (iv) a fourth type of transformation that compresses or expands the respective input variable in a non-linear and asymmetric manner;

producing a parameterized family of the post-processed model object; and selecting, from the parameterized family of the post-processed model object, one given version of the post-processed model object to use as the updated version of the initial model object for the data science model.

\* \* \* \* \*